United States Patent
Oteri et al.

(10) Patent No.: US 12,451,948 B2
(45) Date of Patent: *Oct. 21, 2025

(54) MULTIDIMENSIONAL BEAM REFINEMENT PROCEDURES AND SIGNALING FOR MMWAVE WLANS

(71) Applicant: InterDigital Patent Holdings, Inc., Wilmington, DE (US)

(72) Inventors: Oghenekome Oteri, San Diego, CA (US); Hanqing Lou, Syosset, NY (US); Alphan Sahin, Westbury, NY (US); Rui Yang, Greenlawn, NY (US); Cen Lin, Irvine, CA (US); Xiaofei Wang, North Caldwell, NJ (US); Li-Hsiang Sun, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,135

(22) Filed: May 9, 2023

(65) Prior Publication Data

US 2023/0275642 A1 Aug. 31, 2023

Related U.S. Application Data

(63) Continuation of application No. 17/230,473, filed on Apr. 14, 2021, now Pat. No. 11,689,272, which is a
(Continued)

(51) Int. Cl.
*H04B 7/06* (2006.01)

(52) U.S. Cl.
CPC ....... *H04B 7/06958* (2023.05); *H04B 7/0636* (2013.01); *H04B 7/0645* (2013.01); *H04B 7/0697* (2013.01)

(58) Field of Classification Search
None
See application file for complete search history.

(56) References Cited

U.S. PATENT DOCUMENTS

| 8,542,589 | B2 | 9/2013 | Surineni et al. |
| 10,985,826 | B2 * | 4/2021 | Oteri .................... H04B 7/0645 |

(Continued)

FOREIGN PATENT DOCUMENTS

| CN | 101305531 A | 11/2008 |
| CN | 101461193 A | 6/2009 |

(Continued)

OTHER PUBLICATIONS

IEEE 802.11-17/0919R0 , "Resolution to 11ay related CIDs", Claudio da Silva (Intel), IEEE, the Internet URL:https:/mentor.ieee. org/802.11/dcn/17/11-17-0919-00-00ay-resolution-to-11ay-related-cids.docx, Jun. 20, 2017, 8 pages.

(Continued)

*Primary Examiner* — Christopher R Crompton
(74) *Attorney, Agent, or Firm* — Flaster Greenberg P.C.

(57) ABSTRACT

Systems and methods for multidimensional beam refinement procedures and signaling for millimeter wave WLANs. In some embodiments, there are multi-dimensional enhanced beam refinement protocol MAC and PHY frame designs that extend the MAC packet and the PPDU format with or without backwards compatibility. The multiple dimensions may be supported jointly or separately. In other embodiments, the increased data signaled in the eBRP frame designs may be more efficiently signaled with reduced BRP frame sizes, such as through a training type dependent BRP minimum duration selection procedure or use of null data packet BRP frames. In further embodiments, the maximum duration of the interframe spacing between BPR packets may be varied to improve the efficiency of BRP operation.

28 Claims, 36 Drawing Sheets

Related U.S. Application Data continuation of application No. 16/346,619, filed as application No. PCT/US2017/059765 on Nov. 2, 2017, now Pat. No. 10,985,826.

(60) Provisional application No. 62/500,421, filed on May 2, 2017, provisional application No. 62/445,642, filed on Jan. 12, 2017, provisional application No. 62/417,145, filed on Nov. 3, 2016.

(56) References Cited

U.S. PATENT DOCUMENTS

| | | | | |
|---|---|---|---|---|
| 11,689,272 | B2* | 6/2023 | Oteri | H04B 7/0695 370/342 |
| 2008/0045153 | A1 | 2/2008 | Surineni et al. | |
| 2008/0232278 | A1 | 9/2008 | Brunel et al. | |
| 2010/0215027 | A1 | 8/2010 | Liu et al. | |
| 2012/0287797 | A1 | 11/2012 | Basson et al. | |
| 2013/0070668 | A1 | 3/2013 | Merlin et al. | |
| 2013/0089000 | A1 | 4/2013 | Hansen et al. | |
| 2014/0029453 | A1 | 1/2014 | Trainin et al. | |
| 2014/0033898 | A1 | 2/2014 | Brawley | |
| 2014/0098744 | A1 | 4/2014 | Yucek et al. | |
| 2015/0223096 | A1 | 8/2015 | Trainin et al. | |
| 2015/0289147 | A1* | 10/2015 | Lou | H04B 7/0634 370/329 |
| 2015/0349862 | A1 | 12/2015 | Yang et al. | |
| 2016/0119043 | A1 | 4/2016 | Rajagopal et al. | |
| 2018/0007607 | A1 | 1/2018 | Cordeiro et al. | |
| 2018/0054245 | A1 | 2/2018 | Trainin et al. | |
| 2022/0158790 | A1 | 5/2022 | Da Silva et al. | |

FOREIGN PATENT DOCUMENTS

| | | |
|---|---|---|
| CN | 103052085 A | 4/2013 |
| JP | 2003022653 A | 1/2003 |
| JP | 2009540688 A | 11/2009 |
| JP | 2016504804 A | 2/2016 |
| KR | 20110025883 A | 3/2011 |
| KR | 2016-0049461 A | 5/2016 |
| WO | WO 2017044420 A1 | 3/2017 |

OTHER PUBLICATIONS

Third Generation Partnership Project, R1-1609139, "Overview of NR Unlicensed and Shared Spectrums", 3GPP TSG RAN WG1 Meeting #86bis Lisbon, Portugal, Oct. 10-14, 2016, 4 pages.

Hansen, Christopher: "BRP Comment Resolution for CID 125", IEEE 802.11-11/0078r1, Jan. 2011, 7 pages.

Kome Oteri et al: "Further Details on Multi-Stage, Multi-Resolution Beamforming Training in 802.11ay" IEEE 302.11-1611447r1, Nov. 8, 2016, 19 pages.

Part 11: Wireless LAN Medium Access Control (MAC) and Physical Layer (PHY) Specifications Amendment 3: Enhancements for Very High Throughput in the 60 GHz Band, IEEE Standards Association; 802.11ad-2012, Dec. 28, 2012, 628 pages.

IEEE 802.11 TGay Use Cases, IEEE 802.11-2015/0625r2, May 2015, 21 pages.

Agilent Technologies, Wireless LAN at 60 GHz—IEEE 802.11ad Explained, IEEE 802.11ad-2012 PHY, 2012, 28 pages.

Ahmed Alkhateeb et al., MIMO Precoding and Combining Solutions for Millimeter-Wave Systems, IEEE communications Magazine, Dec. 2014, 10 pages.

International Search Report, International Patent Application No. PCT/US2017/059765, Apr. 9, 2018, 9 pages.

Part 11: Wireless LAN Medium Access Control (MAC) and Physical Layer (PHY) Specifications, IEEE Standards Association; 802.11-2012, Mar. 29, 2012, 2793 pages.

Sub 1 GHz license-exempt PAR and 5C, IEEE 802.11-10/0001r13, Jul. 2010, 7 pages.

MAC and PHY Proposal for 802.11af, IEEE Standard 802.11-10/0258r0, Mar. 2010, 23 pages.

Telecommunications and information exchange between systems—Local and metropolitan area networks—Specific-requirements, Part 11: Wireless LAN Medium Access Control (MAC) and Physical Layer (PHY) specifications, 4mendment 4: Enhancements for Very High Throughput for Operation in Bands below 6 GHz, IEEE Standards Association; 802.11ac-2013, Dec. 11, 2013, 425 pages.

"PHY/MAC Complete Proposal Specification", Wireless LANs IEEE 802.11-10/0433r2, May 2010, 335 pages.

"NT-12 on Beamforming (BRP)", IEEE 802.11-100450r3, May 2010, 34 pages.

IEEE P802.11acTM/D1.0: Information Technology, Telecommunications and Information Exchange Between Systems, Local and Metropolitan Area Networks, Specific Requirements, Part 11, Wireless LAN Medium Access Control (MAC) and Physical Layer (PHY) specifications. Amendment 5: Enhancements for Very High Throughput for Operation in Bands below 6 GHz, May 2011, 263 pages.

* cited by examiner

| [B0] | [B8][B9] | [B10][B11] | [B15] | [B16] | [B17] | [B23] |
|---|---|---|---|---|---|---|
| TOTAL SECTORS IN ISS | | NUMBER OF RX DMG ANTENNAS | RESERVED | POLL REQUIRED | RESERVED | |

OF BITS: 9, 2, 5, 1, 7

SSW-FEEDBACK-FIELD FORMAT
(WHEN TRANSMITTED AS PART OF AN ISS)

FIG. 6A

| [B0] | [B5][B6] | [B7][B8] | [B15] | [B16] | [B17] | [B23] |
|---|---|---|---|---|---|---|
| SECTOR SELECT | | DMG ANTENNA SELECT | SNR REPORT | POLL REQUIRED | RESERVED | |

OF BITS: 6, 2, 8, 1, 7

SSW-FEEDBACK-FIELD FORMAT
(WHEN NOT TRANSMITTED AS PART OF AN ISS)

FIG. 6B

| L-STF | L-CEF | L-Header | EDMG-Header-A | EDMG-STF | EDMG-CEF | EDMG-Header-B | Data | AGC | TRN |

FIG. 8

| Dimension 1 | BRP Request 1 1402-1 | DMG Beam Refinement 1 1404-1 | Dimension 2 | BRP Request 2 1402-2 | DMG Beam Refinement 2 1404-2 |
|---|---|---|---|---|---|

FIG. 14

| L-RX | TX TRN-REQ | MID-REQ | BC-REQ | MID-GRANT | BC-GRANT | Chan-FBCK-CAP | Tx Sector ID | Other_AID | TX Antenna ID | Dimension ID |
|---|---|---|---|---|---|---|---|---|---|---|
| L-RX | TX TRN-REQ | MID-REQ | BC-REQ | MID-GRANT | BC-GRANT | Chan-FBCK-CAP | Tx Sector ID | Other_AID | TX Antenna ID | Tx Rx beam ID |

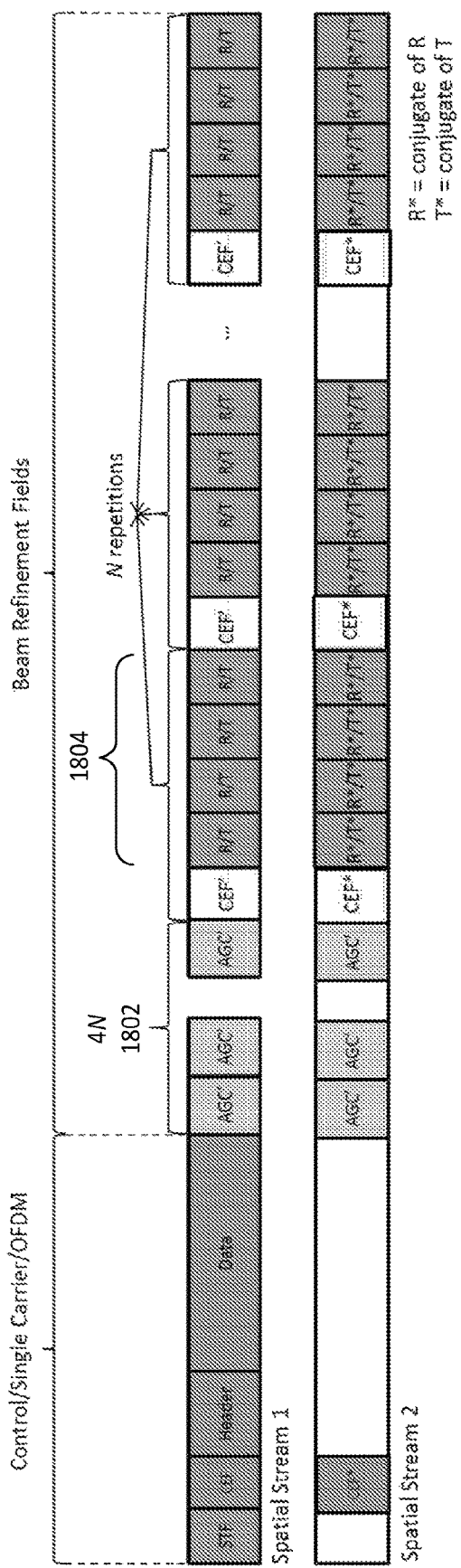
FIG. 18
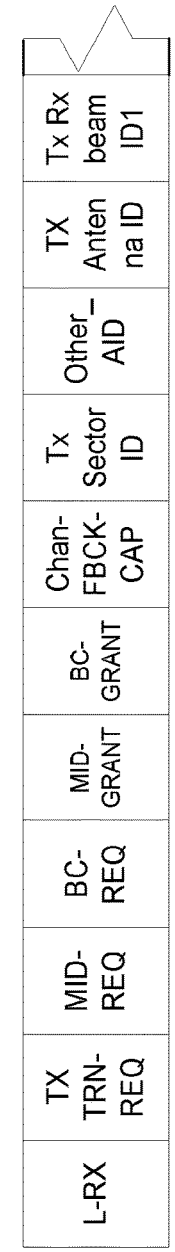
FIG. 19

| # of FBCK = 2 | Element ID | Length | Initiator | RX-train-response | TX-TRN-OK | TXSS-FBCK-REQ:1 |

| BS-FBCK:1 | BS-FBCK Antenna ID:1 | Tx-rx beam ID:2 | BS-FBCK:2 | BS-FBCK Antenna ID:2 | Tx-rx beam ID:2 | FBCK-REQ | FBCK-TYPE | MID Extension | Capability Req | Reserved |

Overwritten with BRP information

Overwritten with BRP information          Overwritten with user specific BRP information

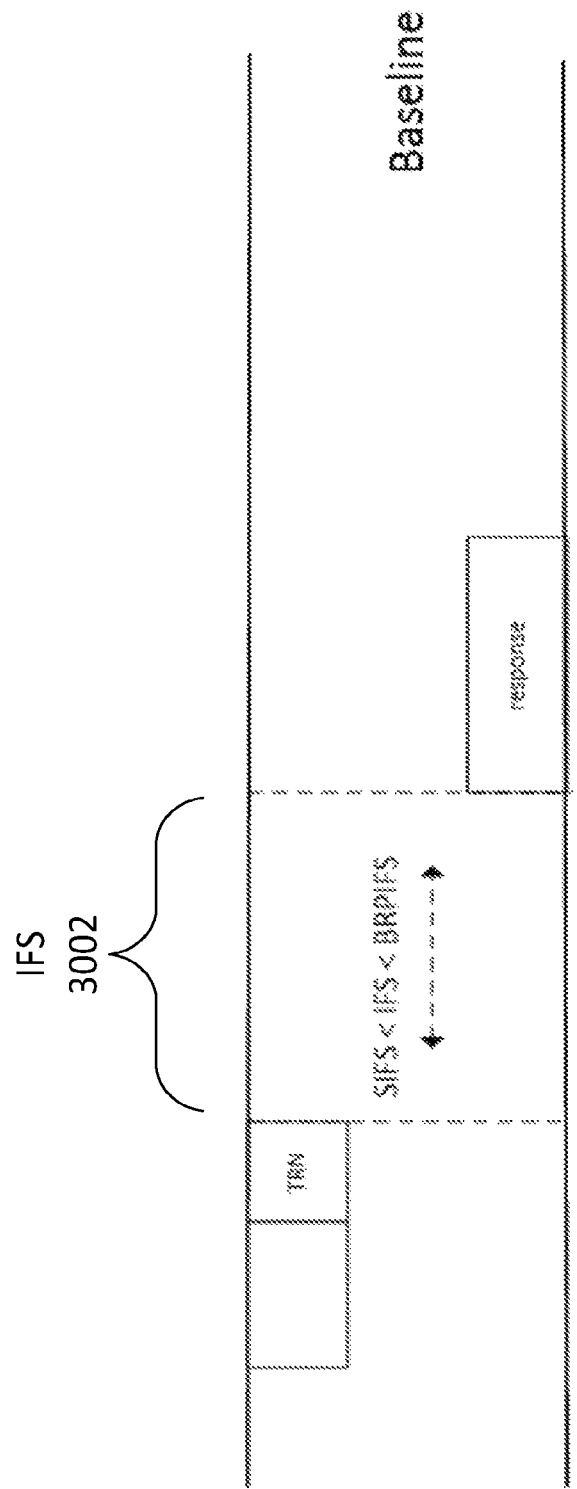

US 12,451,948 B2

MULTIDIMENSIONAL BEAM REFINEMENT PROCEDURES AND SIGNALING FOR MMWAVE WLANS

CROSS REFERENCE TO RELATED APPLICATIONS

This application is a continuation of U.S. Non-Provisional application Ser. No. 17/230,473, filed Apr. 14, 2021, which is a continuation of U.S. Non-Provisional application Ser. No. 16/346,619, filed May 1, 2019, which issued as U.S. Pat. No. 10,985,826 on Apr. 20, 2021, which is a National Stage entry under 35 U.S.C. § 371 of Patent Cooperation Treaty Application PCT/US17/59765, filed Nov. 2, 2017, which claims the benefit of U.S. Provisional Application No. 62/500,421, filed May 2, 2017, U.S. Provisional Application No. 62/445,642, filed Jan. 12, 2017, and U.S. Provisional Application No. 62/417,145, filed Nov. 3, 2016, the entire contents of each of which are incorporated by reference herein.

BACKGROUND

Overview of WLAN System.

A WLAN in Infrastructure Basic Service Set (BSS) mode has an Access Point (AP/PCP) for the BSS and one or more stations (STAs) associated with the AP/PCP. The AP/PCP typically has access or interface to a Distribution System (DS) or another type of wired/wireless network that carries traffic in and out of the BSS. Traffic to STAs that originates from outside the BSS arrives through the AP/PCP and is delivered to the STAs. Traffic originating from STAs to destinations outside the BSS is sent to the AP/PCP to be delivered to the respective destinations. Traffic between STAs within the BSS may also be sent through the AP/PCP where the source STA sends traffic to the AP/PCP and the AP/PCP delivers the traffic to the destination STA. Such traffic between STAs within a BSS is really peer-to-peer traffic. Such peer-to-peer traffic may also be sent directly between the source and destination STAs with a direct link setup (DLS) using an 802.11e DLS or an 802.11z tunneled DLS (TDLS). A WLAN using an Independent BSS (IBSS) mode has no AP/PCP, and/or STAs, communicating directly with each other. This mode of communication is referred to as an "ad-hoc" mode of communication.

Using the 802.11ac infrastructure mode of operation, the AP/PCP may transmit a beacon on a fixed channel, usually the primary channel. This channel may be 20 MHz wide, and is the operating channel of the BSS. This channel is also used by the STAs to establish a connection with the AP/PCP. The fundamental channel access mechanism in an 802.11 system is Carrier Sense Multiple Access with Collision Avoidance (CSMA/CA). In this mode of operation, every STA, including the AP/PCP, will sense the primary channel. If the channel is detected to be busy, the STA backs off. Hence only one STA may transmit at any given time in a given BSS.

In 802.11n (see, IEEE Standard 802.11™-2012: Wireless LAN Medium Access Control (MAC) and Physical Layer (PHY) Specifications), High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac (see, IEEE Std 802.11ad™-2012: Part 11: Wireless LAN Medium Access Control (MAC) and Physical Layer (PHY) Specifications Amendment 3: Enhancements for Very High Throughput in the 60 GHz Band), Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, this may also be referred to as an 80+80 configuration. For the 80+80 configuration, the data, after channel encoding, is passed through a segment parser that divides it into two streams. IFFT, and time domain, processing are done on each stream separately. The streams are then mapped on to the two channels, and the data is transmitted. At the receiver, this mechanism is reversed, and the combined data is sent to the MAC.

Sub 1 GHz modes of operation are supported by 802.11af (see, IEEE 802.11-10/0258r0, MAC and PHY Proposal for 802.11af, March 2010), and 802.11ah (see, IEEE 802.11-10/0001r13, Sub 1 GHz license-exempt PAR and 5C, July 2010). For these specifications, the channel operating bandwidths and carriers are reduced relative to those used in 802.11n and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. A possible use case for 802.11ah is support for Meter Type Control (MTC) devices in a macro coverage area. MTC devices may have limited capabilities including only support for limited bandwidths, but also include a requirement for a very long battery life.

WLAN systems which support multiple channels and channel widths, such as 802.11n, 802.11ac, 802.11af, and 802.11ah, include a channel which is designated as the primary channel. The primary channel may, but does not necessarily, have a bandwidth equal to the largest common operating bandwidth supported by all STAs in the BSS. The bandwidth of the primary channel is therefore limited by the STA, of all STAs in operating in a BSS, which supports the smallest bandwidth operating mode. In the example of 802.11ah, the primary channel may be 1 MHz wide if there are STAs (e.g., MTC type devices) that only support a 1 MHz mode even if the AP/PCP, and other STAs in the BSS, may support a 2 MHz, 4 MHz, 8 MHz, 16 MHz, or other channel bandwidth operating modes. All carrier sensing, and NAV settings, depend on the status of the primary channel; i.e., if the primary channel is busy, for example, due to a STA supporting only a 1 MHz operating mode is transmitting to the AP/PCP, then the entire available frequency bands are considered busy even though majority of it stays idle and available.

In the United States, the available frequency bands which may be used by 802.11ah are from 902 MHz to 928 MHz. In Korea it is from 917.5 MHz to 923.5 MHz; and in Japan, it is from 916.5 MHz to 927.5 MHz. The total bandwidth available for 802.11ah is 6 MHz to 26 MHz depending on the country code.

To improve spectral efficiency 802.11ac has introduced the concept for downlink Multi-User MIMO (MU-MIMO) transmission to multiple STA's in the same symbol's time frame, e.g., during a downlink OFDM symbol. The potential for the use of downlink MU-MIMO is also currently considered for 802.11ah. It is important to note that since downlink MU-MIMO, as it is used in 802.11ac, uses the same symbol timing to multiple STA's interference of the waveform transmissions to multiple STA's is not an issue. However, all STA's involved in MU-MIMO transmission with the AP/PCP must use the same channel or band, this limits the operating bandwidth to the smallest channel bandwidth that is supported by the STA's which are included in the MU-MIMO transmission with the AP/PCP. 802.11ad.

802.11 ad is an amendment to the WLAN standard, which specifies the MAC and PHY layers for very high throughput (VHT) in the 60 GHz band.

802.11ad has the following important features
Support data rates up to 7 Gbits/s
Support three different modulation modes
   Control PHY with single carrier and spread spectrum
   Single Carrier PHY
   OFDM PHY
Use 60 GHz unlicensed band, which is available globally.
   At 60 GHz, the wavelength is 5 mm, which makes compact and antenna or antenna arrays possible. Such an antenna can create narrow RF beams at both transmitter and receiver, which effectively increase the coverage range and reduce the interference.
The frame structure of 802.11ad facilitates a mechanism for beamforming training (discovery and tracking). The beamforming training protocol comprises of two components: a sector level sweep (SLS) procedure, and a beam refinement protocol (BRP) procedure. The SLS procedure is used for transmit beamforming training; the BRP procedure enables receive beamforming training, and iterative refinement of both the transmit and receive beams.

MIMO transmissions, including both SU-MIMO and MU-MIMO, are not supported by 802.11ad.

802.11ad PPDU Formats. 802.11ad supports three PPDU formats, which are Control PHY, Single Carrier (SC) PHY, and OFDM PHY PPDUs. The PPDU formats, as defined in IEEE Std 802.11ad™-2012: Part 11: Wireless LAN Medium Access Control (MAC) and Physical Layer (PHY) Specifications Amendment 3: Enhancements for Very High Throughput in the 60 GHz Band, are shown in FIG. 1. FIG. 1 illustrates a control format 12, a single carrier format 14, and an OFDM format 16.

802.11ad Control PHY. Control PHY is defined in 802.11ad as the lowest data rate transmission. Frames which are transmitted before beamforming training may use Control PHY PPDU. For 802.11ad, the transmission block diagram of Control PHY is shown in FIG. 2.

Sector Level Sweep. An exemplary SLS training procedure is shown in FIG. 3. SLS training may be performed using a Beacon frame or SSW frame. When the Beacon frame is utilized, the AP repeats the Beacon frame with multiple beams/sectors within each Beacon interval (BI) and multiple STAs can perform BF training simultaneously. However, due to the size of Beacon frame, it is no guarantee that the AP can sweep all the sectors/beams within one BI. Thus, an STA may need to wait for multiple BIs to complete ISS training, and latency may be an issue. An SSW frame may be utilized for point-to-point BF training. An SSW frame may be transmitted using control PHY, and the frame format is shown in FIG. 4. The SSW field is defined in FIG. 4 with the field format defined in FIG. 5. The SSW Feedback field is given in FIGS. 6A and 6B.

Beam Refinement Protocol (BRP). Beam refinement is a process where a STA can improve its antenna configuration (or antenna weight vectors) both for transmission and reception. In the beam refinement procedure, BRP packets are used to train the receiver and transmitter antenna. There are two types of BRP packets: BRP-RX packets and BRP-TX packets. BRP packet may be carried by a directional multi-gigabit (DMG) physical layer (PHY) protocol data unit (PPDU) followed by a training field containing an AGC field and a transmitter or receiver training field as shown in FIG. 7.

A value of N in FIG. 7 is the Training Length given in the header filed, which indicates that the AGC has 4N subfields and that the TRN-R/T field has 5N subfields. The CE subfield is the same as the one in the preamble described in the previous section. All subfields in the beam training field are transmitted using rotated π/2-BPSK modulation.

BRP MAC frame is an Action No ACK frame, which has the following fields:
   Category
   Unprotected DMG Action
   Dialog Token
   BRP Request field
   DMG Beam Refinement element
   Channel Measurement Feedback element 1
   . . .
   Channel Measurement Feedback element k
802.11ay (TGay).

Requirements of 802.11ay. Task Group ay (TGay), approved by IEEE in March 2015, is expected to develop an amendment that defines standardized modifications to both the IEEE 802.11 physical layers (PHY) and the IEEE 802.11 medium access control layer (MAC) that enables at least one mode of operation capable of supporting a maximum throughput of at least 20 gigabits per second (measured at the MAC data service access point), while maintaining or improving the power efficiency per station. This amendment also defines operations for license-exempt bands above 45 GHz while ensuring backward compatibility and coexistence with legacy directional multi-gigabit stations (defined by IEEE 802.11 ad-2012 amendment) operating in the same band.

Although much higher maximum throughput than that of 802.11ad is the primary goal of TGay, some members of the group also proposed to include mobility and outdoor support. More than ten different use cases are proposed and analyzed in terms of throughput, latency, operation environment and applications (see, IEEE 802.11-2015/0625r2, "IEEE 802.11 TGay Use Cases", Huawei, et. al).

Since 802.11ay will operate in the same band as legacy standards, it is required that the new technology will ensure backward compatibility and coexistence with legacies in the same band.

802.11ay PPDU Format. It has been agreed that 802.11ay PPDU contain legacy part and EDMG part. The detailed PPDU format is shown in FIG. 8.

The legacy short training field (L-STF), legacy channel estimation field (L-CEF), L-Header and EDMG-Header-A fields are transmitted using SC mode for backward compatibility. It was agreed in the IEEE January 2016 meeting that
   For a control mode PPDU, the reserved bits 22 and 23 shall be both set to 1 to indicate the presence of the EDMG-Header-A field.
   For a SC mode PPDU or an OFDM mode PPDU, the reserved bit 46 shall be set to 1 to indicate the presence of the EDMG-Header-A field.

Millimeter Wave Precoding. Precoding at millimeter wave frequencies may be digital, analog or a hybrid of digital and analog (see, MIMO Precoding and Combining Solutions for mmWave Systems: Alkahteeb, Mo., Gonzalez-Prelcic, Heath, 2014).

Digital precoding: Digital precoding is precise and can be combined with equalization. It enables single user (SU), multi-user (MU), and multi-cell precoding, and is typically used in sub 6 GHz, for example in IEEE 802.11n and beyond and in 3GPP LTE and beyond. However, in millimeter wave frequencies, the presence of a limited number of RF chains compared with antenna elements and the sparse nature of the channel complicates the use of digital beamforming.

Analog Beamforming: Analog beamforming overcomes limited number of RF chains issue by using analog phase shifters on each antenna element. It is used in IEEE 802.11ad during the Sector Level Sweep (which identifies the best sector), Beam Refinement (which refines the sector to an antenna beam), and beam tracking (which adjusts the sub-beams over time to account for any change in the channel) procedures. Analog beamforming is also used in IEEE 802.15.3. In this case a binary search beam training algorithm using a layered multi-resolution beamforming codebook is used. Analog beamforming is typically limited to single stream transmission.

Hybrid beamforming: In hybrid beamforming, the pre-coder is divided between analog and digital domains. Each domain has precoding and combining matrices with different structural constraints, e.g., constant modulus constraint for combining matrices in the analog domain. This design results in a compromise between hardware complexity and system performance. Hybrid beamforming may be able to achieve digital precoding performance due to sparse nature of channel and support multi-user/multi-stream multiplexing. However, it is limited by number of RF chains. This may not be an issue as mmWave channels are sparse in the angular domain so this limitation may not be as important.

Multi-Antenna Analogue beamforming methods for 802.11ad+. Based on issues the analog beamforming found in IEEE 802.11ad, analog beamforming methods for 802.11ad+/802.11ay have been proposed in U.S. Utility patent application Ser. No. 14/441,237, filed May 7, 2015, titled, Beamforming Methods and Procedures in mmW WLAN Systems. Disclosed embodiments included the following:

Spatial diversity with beam switching.
Spatial diversity with a single beam.
Weighted multipath beamforming training.
Beam division multiple access.
Single user spatial multiplexing.
Reduced beamforming training overhead.

In the above disclosure, two architectures were proposed, the first with all physical antennas (PAs) excited by all the weights (shown in FIG. 9), while the second has different PAs excited by separate weights (shown in FIG. 10).

In various embodiments, the present disclosure relates to combinations of analog and digital precoding (hybrid mmWave precoding) to enable multi-stream/multi-user transmission.

SUMMARY

Systems and methods described herein are provided for multidimensional beam refinement procedures and signaling for millimeter wave WLANs.

BRP MAC Packet for M-Dimensional Transmission. The current BRP MAC in 11ad is designed to setup, beam refinement and feedback for the single beam transmission that exists in 802.11ad. In FIG. 11, a MAC packet 1102 includes the BRP Request Field 1104 and the DMG Beam Refinement Element 1106. The supporting PHY layer PPDU used to estimate the best beam in a BRP procedure is designed for single beam transmission (as shown in FIG. 12). The elements of this PPDU include an AGC field, a Channel Estimation Field, and a TRN field for the single Tx-Rx antenna pair and signal channel. For multi-dimensional BRP (where the dimensions may be multiple transmit-receive beam pairs, multiple polarizations or multiple channels), methods to extend the MAC packet and the PPDU format with or without backwards compatibility are disclosed herein. The multiple dimensions may be supported jointly or separately.

BRP MAC Packet Overhead. With the increase in the amount of data needed to be signaled in the BRP MAC packet due to an increase in the number of antennas and beams for the M-dimensional transmissions described above, a more efficient BRP packet is set forth herein to reduce the overhead.

BRP IFS. In 802.11ad, the interframe spacing between a BRP frame and its response is set to a value greater than or equal to the short interframe space (SIFS) and less than or equal to beam refinement protocol inter-frame space (BRPIFS) with the value of BRPIFS fixed. For improved feedback in view of the multi-dimensionality described above, there may be multiple BRP frame exchanges for optimized operation. Methods to improve the efficiency of the BRP operation and to enable the signaling of and/or reduction in the BRPIFS duration are disclosed herein.

BRP IFS and channel access. With the possibility of the interframe spacing being set to BRPIFS=44 usec, STAs that are in sleep mode or that miss the TxOP reservation frame may assume that the channel is unoccupied and interrupt the TxOP. Embodiments are disclosed herein for allowing the IFS to be set to a specific value while allowing for delays in processing.

BRIEF DESCRIPTION OF THE DRAWINGS

A more detailed understanding may be had from the following description, presented by way of example in conjunction with the accompanying drawings, wherein:

FIG. 6A illustrates an exemplary SSW feedback field format when transmitted as part of an ISS.
FIG. 6B illustrates an exemplary SSW feedback field format when not transmitted as part of an ISS.
FIG. 8 illustrates exemplary PPDU formats in 802.11ay.
FIG. 14 illustrates exemplary independent BRP request and DMG beam refinement frames for each dimension using independent eBRP signaling.
FIG. 15 illustrates exemplary independent BRP request fields, as may be incorporated in the frames of FIG. 14.

FIG. 18 illustrates one embodiment of a simultaneous BRP procedure.

FIG. 19 illustrates one embodiment of a joint BRP request field with a fixed number of BRP requests.

FIG. 22 illustrates one embodiment of a joint eDMG beam refinement element.

FIG. 30A illustrates a baseline case in which interframe spacing can vary between a short interframe spacing (SIFS) and a beam refinement protocol interframe spacing (BRPIFS).

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Network Architecture.

Figure 32A:
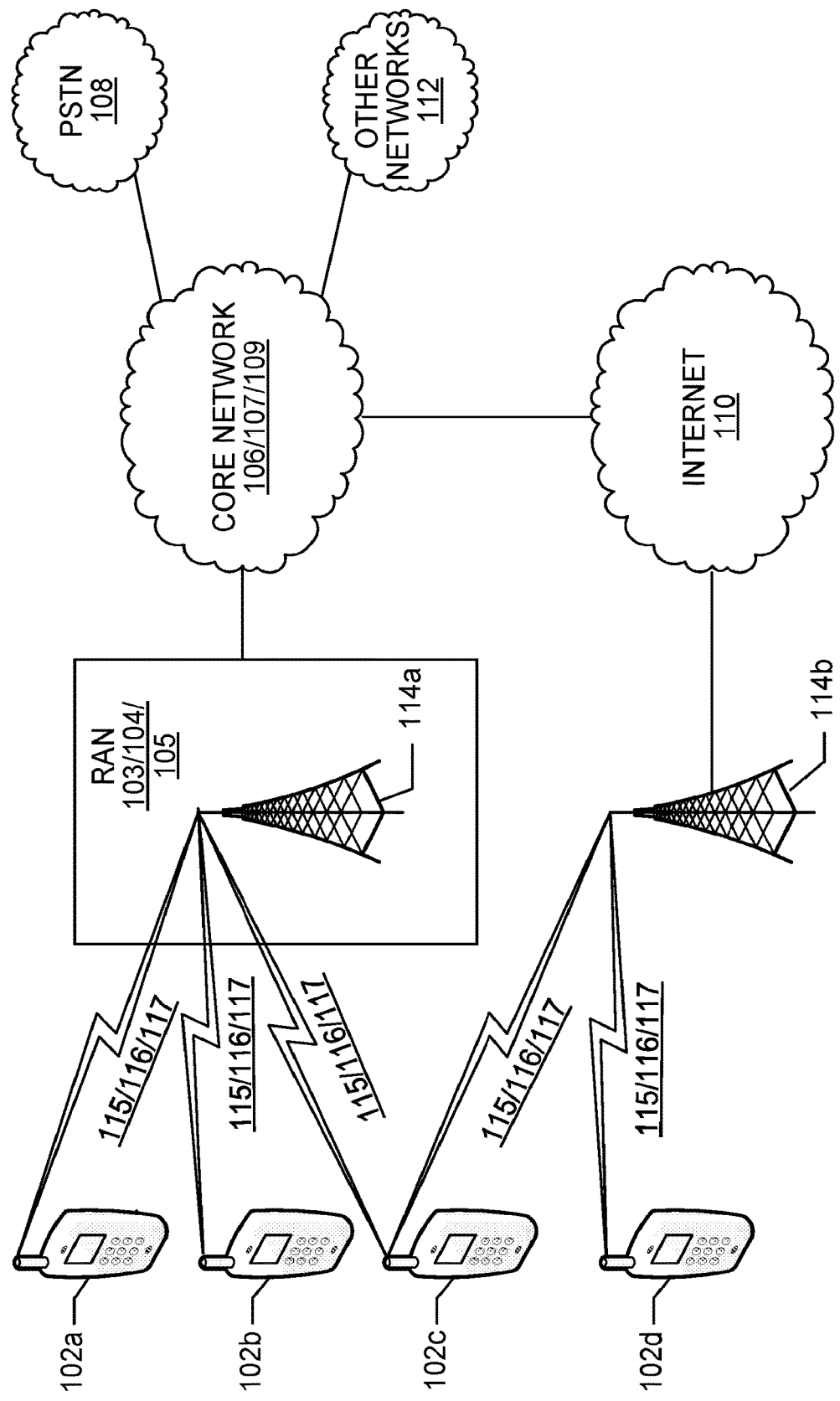
FIG. 32A depicts an example communications system in which one or more disclosed embodiments may be implemented.

The systems and methods disclosed herein may be used with the wireless communication systems described with respect to FIGS. 32A-32F. As an initial matter, these wireless systems will be described. FIG. 32A is a diagram of an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel-access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 32A, the communications system 100 may include WTRUs 102a, 102b, 102c, and/or 102d (which generally or collectively may be referred to as WTRU 102), a RAN 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, and the like). The air interface 115/116/117 may be established using any suitable radio access technology (RAT).

More specifically, as noted above, the communications system 100 may be a multiple access system and may employ one or more channel-access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 32A may be a wireless router, Home Node B, Home eNode B, or access point, as examples, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 32A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. As examples, the core network 106/107/109 may provide call control, billing services, mobile location-based services, pre-paid calling, Internet connectivity, video distribution, and the like, and/or perform high-level security functions, such as user authentication. Although not shown in FIG. 32A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and IP in the TCP/IP Internet protocol suite. The networks 112 may include wired and/or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 32A may be configured to communicate with the base station 114a, which may employ a cellular-based radio technology, and with the base station 114b, which may employ an IEEE 802 radio technology.

Figure 32B:
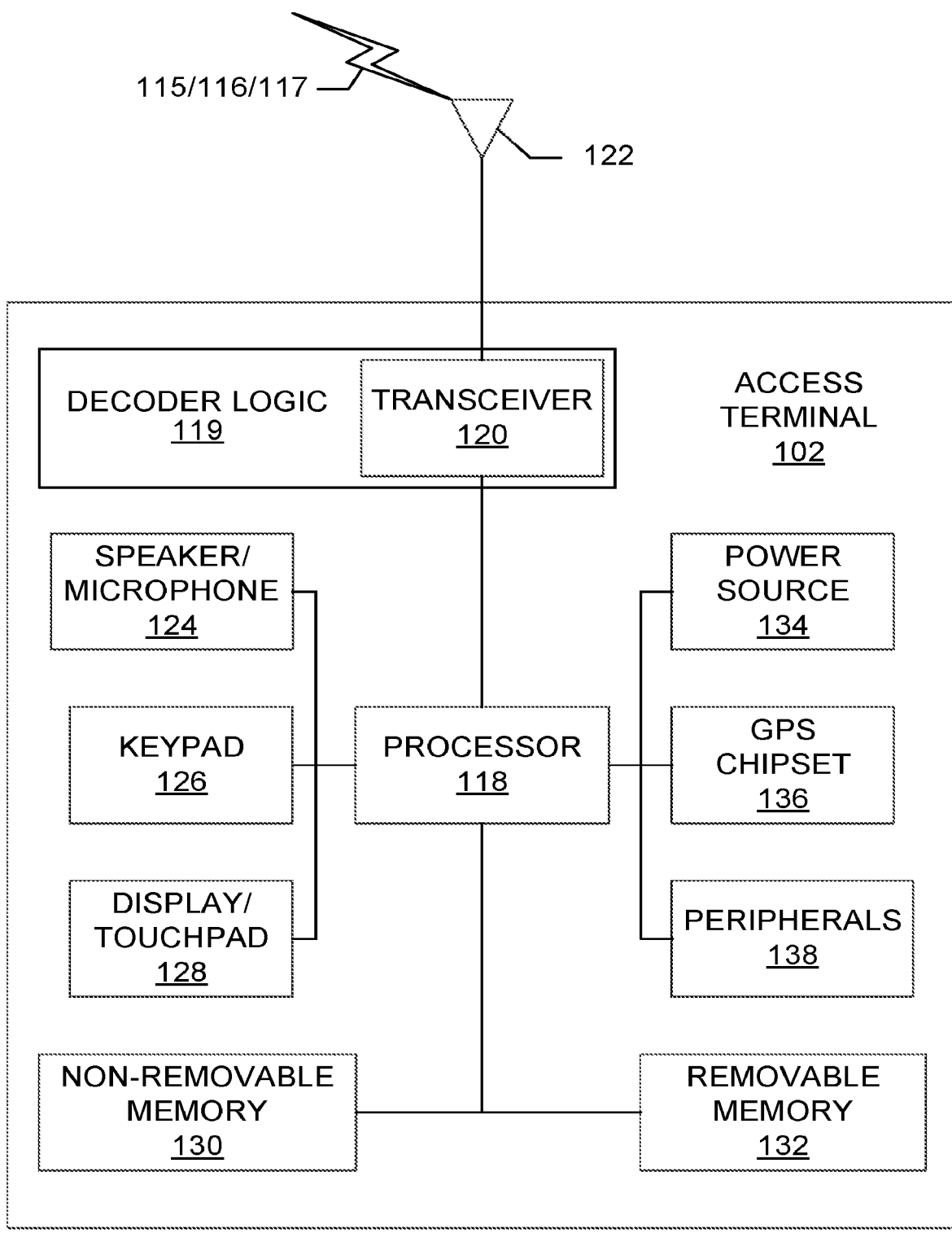
FIG. 32B depicts an example wireless transmit/receive unit (WTRU) that may be used within the communications system of FIG. 32A.

FIG. 32B is a system diagram of an example WTRU 102. As shown in FIG. 32B, the WTRU 102 may include a processor 118, a transceiver 120, a transmit/receive element 122, a speaker/microphone 124, a keypad 126, a display/touchpad 128, a non-removable memory 130, a removable memory 132, a power source 134, a global positioning system (GPS) chipset 136, and other peripherals 138. The transceiver 120 may be implemented as a component of decoder logic 119. For example, the transceiver 120 and decoder logic 119 can be implemented on a single LTE or LTE-A chip. The decoder logic may include a processor operative to perform instructions stored in a non-transitory computer-readable medium. As an alternative, or in addition, the decoder logic may be implemented using custom and/or programmable digital logic circuitry.

It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 32B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 32B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, as examples. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 32B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, as examples.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. As examples, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 32C:
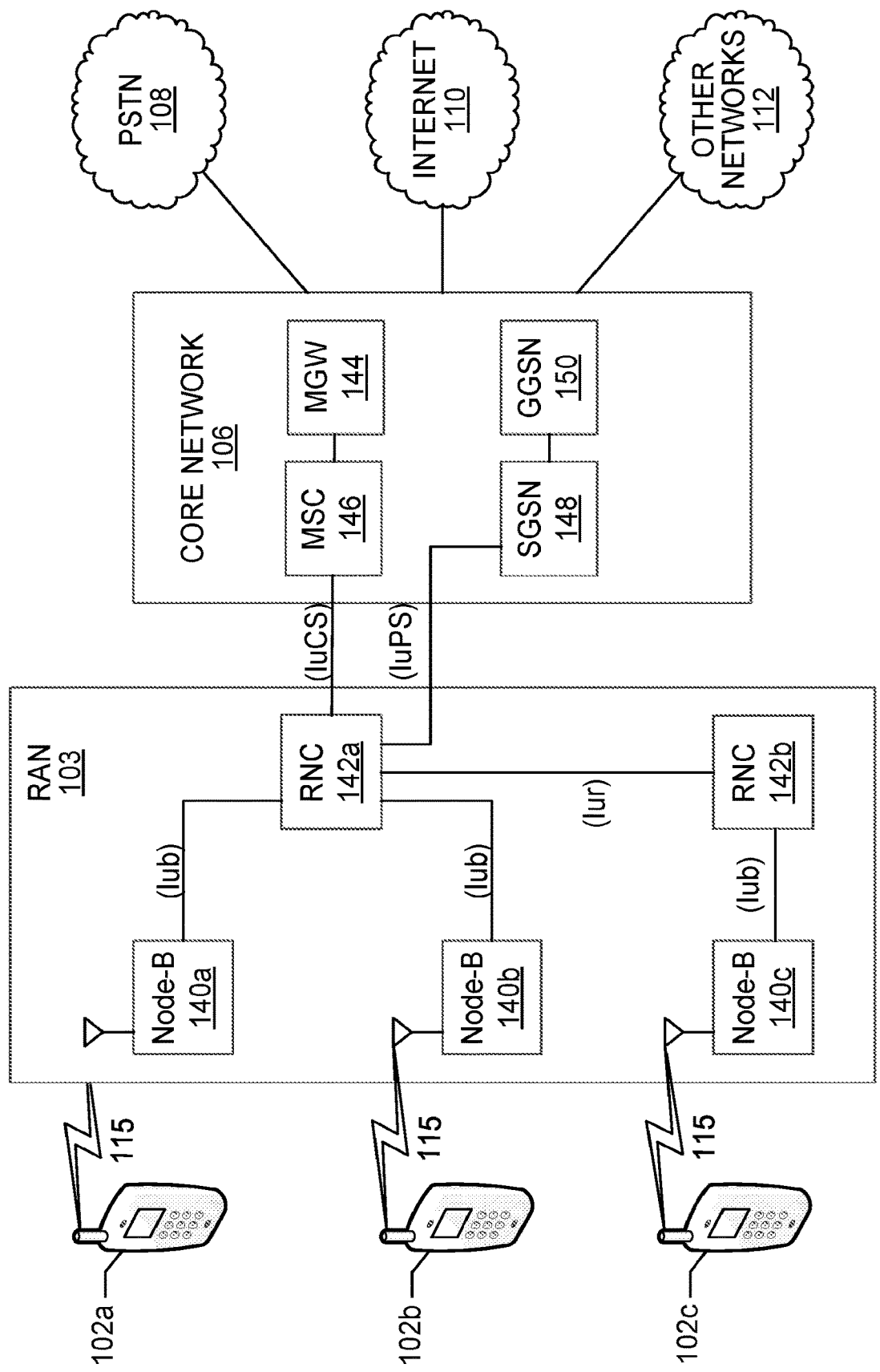
FIG. 32C depicts an example radio access network (RAN) and an example core network that may be used within the communications system of FIG. 32A.

FIG. 32C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 32C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 32C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer-loop power control, load control, admission control, packet scheduling, handover control, macrodiversity, security functions, data encryption, and the like.

The core network 106 shown in FIG. 32C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional landline communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired and/or wireless networks that are owned and/or operated by other service providers.

Figure 32D:
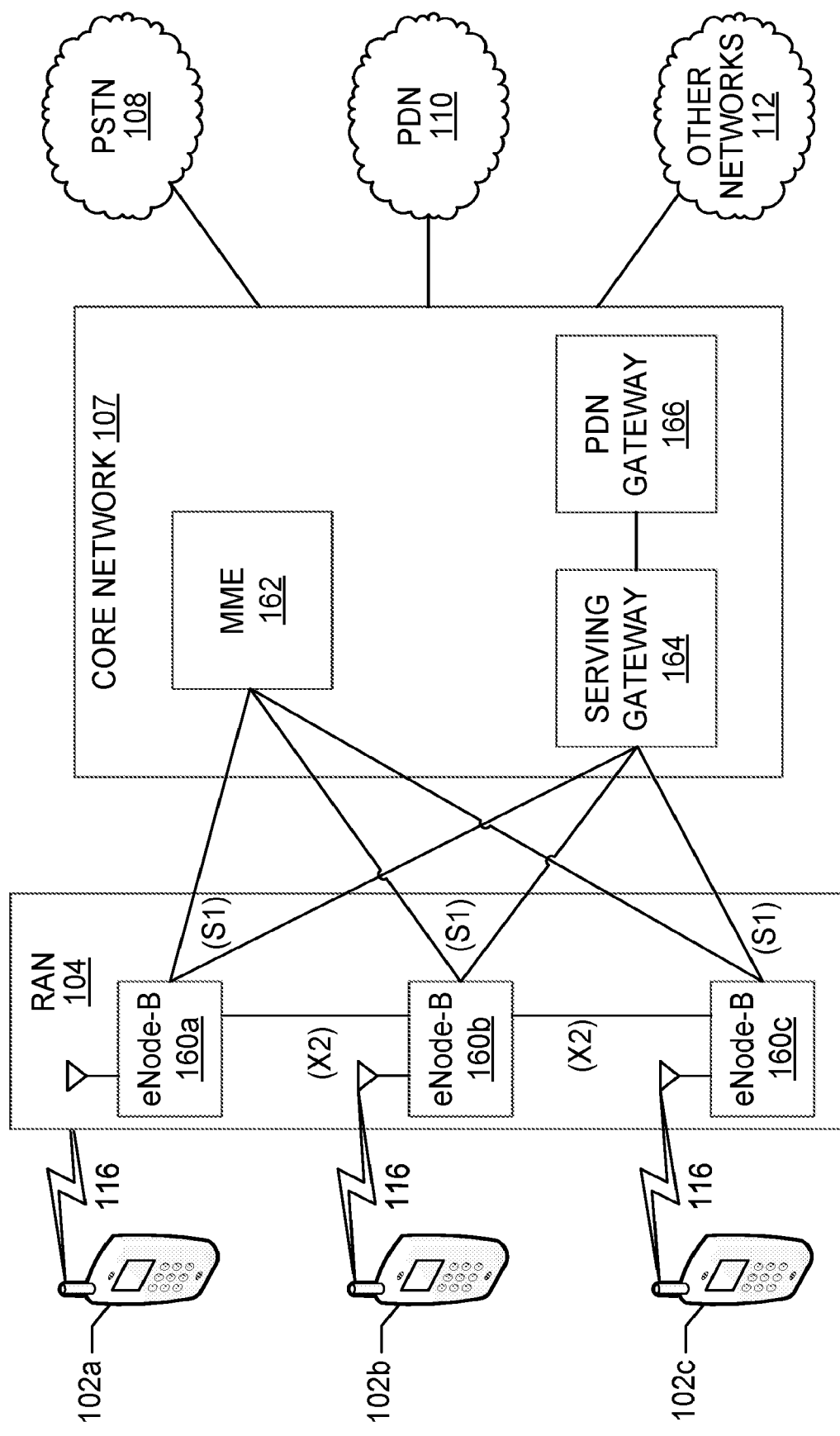
FIG. 32D depicts a second example RAN and a second example core network that may be used within the communications system of FIG. 32A.

FIG. 32D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and receive wireless signals from, the WTRU 102a.

Each of the eNode Bs 160a, 160b, 160c may be associated with a particular cell (not shown) and may be configured to handle radio-resource-management decisions, handover decisions, scheduling of users in the uplink and/or downlink, and the like. As shown in FIG. 32D, the eNode Bs 160a, 160b, 160c may communicate with one another over an X2 interface.

The core network 107 shown in FIG. 32D may include a mobility management entity (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional landline communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired and/or wireless networks that are owned and/or operated by other service providers.

Figure 32E:
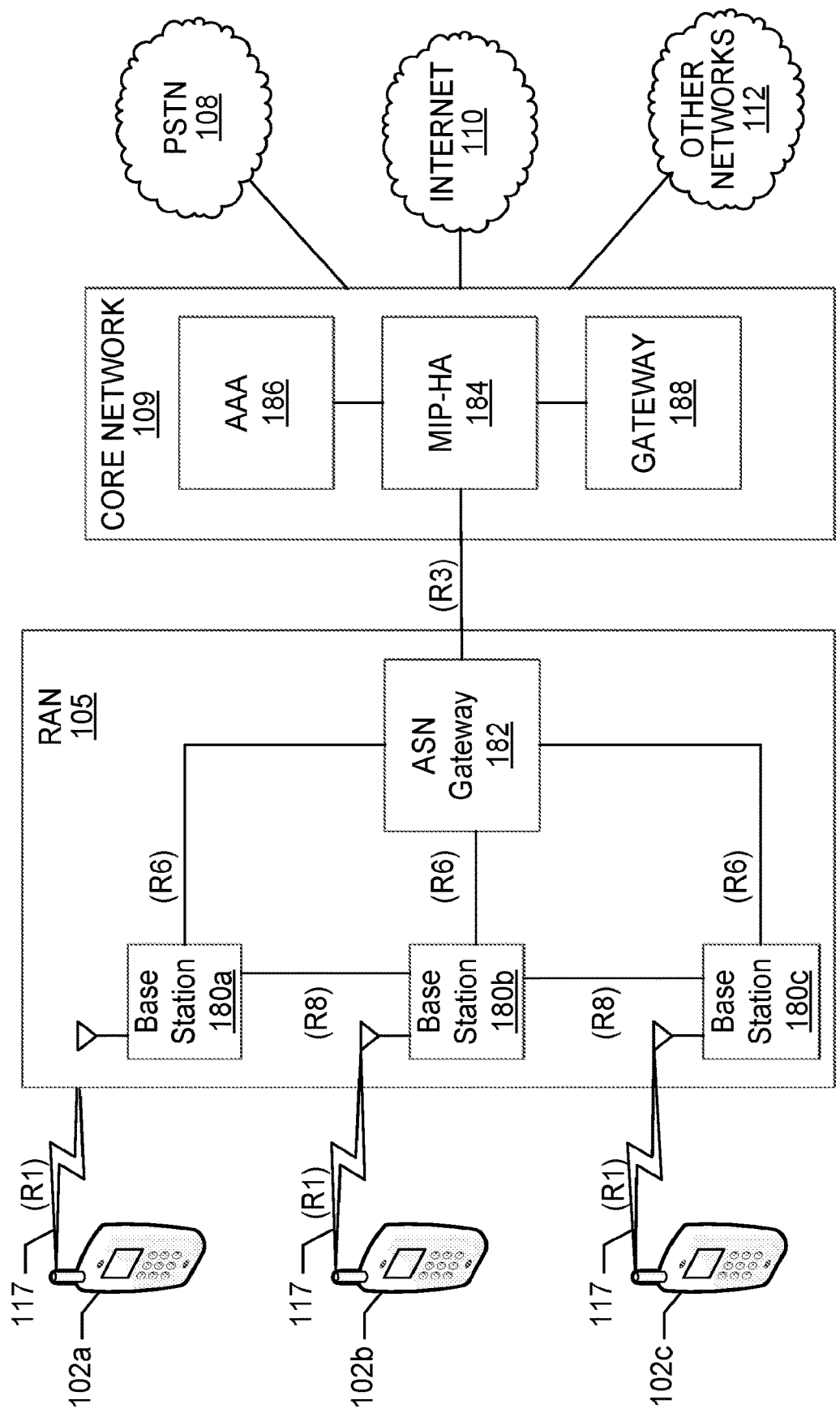
FIG. 32E depicts a third example RAN and a third example core network that may be used within the communications system of FIG. 32A.

FIG. 32E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 32E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility-management functions, such as handoff triggering, tunnel establishment, radio-resource management, traffic classification, quality-of-service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point (not shown), which may be used for authentication, authorization, IP-host-configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 32E, the RAN 105 may be connected to the core network 109. The communication link between the RAN 105 and the core network 109 may defined as an R3 reference point that includes protocols for facilitating data transfer and mobility-management capabilities, as examples. The core network 109 may include a mobile-IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA 184 may be responsible for IP-address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional landline communications devices. In addition, the gateway 188 may provide the WTRUs 102a, 102b, 102c with access to the networks 112, which may include other wired and/or wireless networks that are owned and/or operated by other service providers.

Although not shown in FIG. 32E, it will be appreciated that the RAN 105 may be connected to other ASNs and the core network 109 may be connected to other core networks. The communication link between the RAN 105 the other ASNs may be defined as an R4 reference point (not shown), which may include protocols for coordinating the mobility of the WTRUs 102a, 102b, 102c between the RAN 105 and the other ASNs. The communication link between the core network 109 and the other core networks may be defined as an R5 reference point (not shown), which may include protocols for facilitating interworking between home core networks and visited core networks.

Figure 32F:
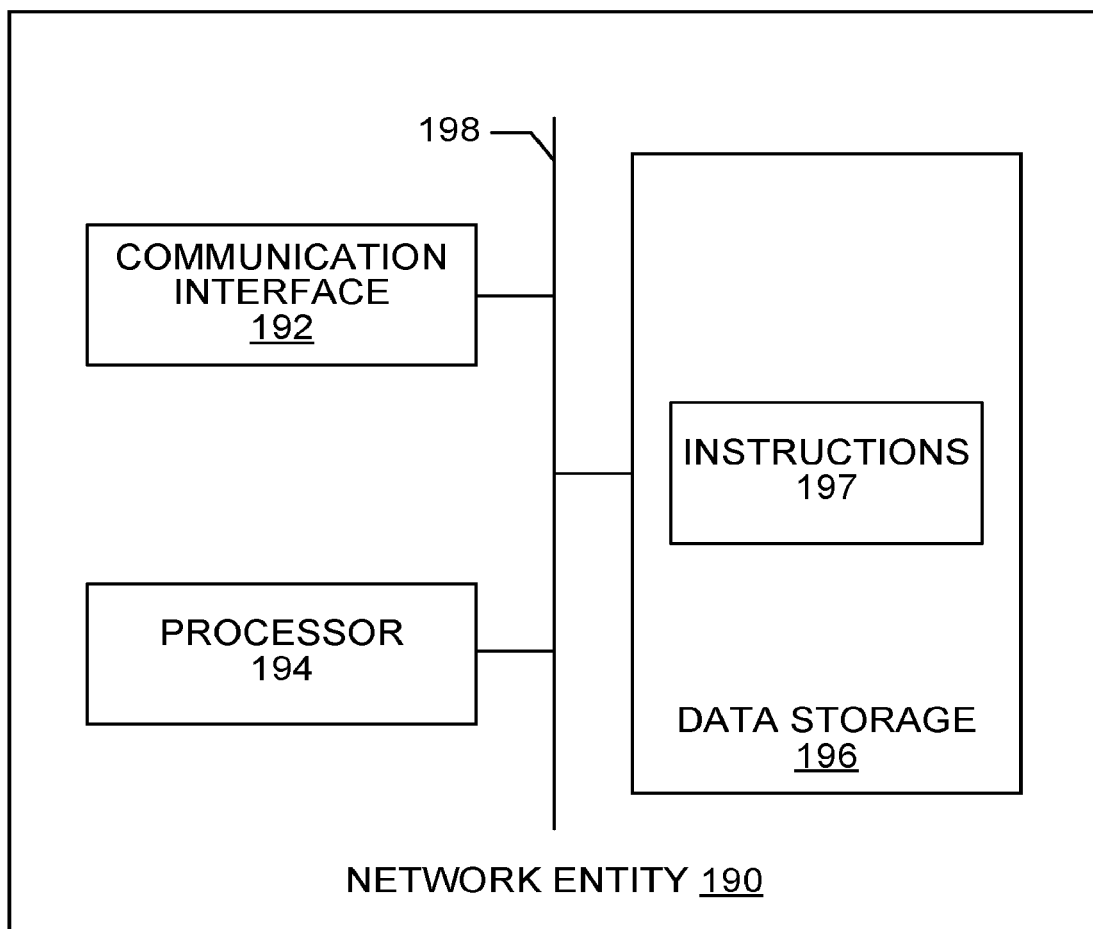
FIG. 32F depicts an exemplary network entity that may be used within the communication system of FIG. 32A.

FIG. 32F depicts an example network entity 190 that may be used within the communication system 100 of FIG. 32A. As depicted in FIG. 32F, network entity 190 includes a communication interface 192, a processor 194, and non-transitory data storage 196, all of which are communicatively linked by a bus, network, or other communication path 198.

Communication interface 192 may include one or more wired communication interfaces and/or one or more wireless-communication interfaces. With respect to wired communication, communication interface 192 may include one or more interfaces such as Ethernet interfaces, as an example. With respect to wireless communication, communication interface 192 may include components such as one or more antennae, one or more transceivers/chipsets designed and configured for one or more types of wireless (e.g., LTE) communication, and/or any other components deemed suitable by those of skill in the relevant art. And further with respect to wireless communication, communication interface 192 may be equipped at a scale and with a configuration appropriate for acting on the network side—as opposed to the client side—of wireless communications (e.g., LTE communications, Wi-Fi communications, and the like). Thus, communication interface 192 may include the appropriate equipment and circuitry (perhaps including multiple transceivers) for serving multiple mobile stations, UEs, or other access terminals in a coverage area.

Processor 194 may include one or more processors of any type deemed suitable by those of skill in the relevant art, some examples including a general-purpose microprocessor and a dedicated DSP.

Data storage 196 may take the form of any non-transitory computer-readable medium or combination of such media, some examples including flash memory, read-only memory (ROM), and random-access memory (RAM) to name but a few, as any one or more types of non-transitory data storage deemed suitable by those of skill in the relevant art could be used. As depicted in FIG. 32F, data storage 196 contains program instructions 197 executable by processor 194 for carrying out various combinations of the various network-entity functions described herein.

In some embodiments, the network-entity functions described herein are carried out by a network entity having a structure similar to that of network entity 190 of FIG. 32F. In some embodiments, one or more of such functions are carried out by a set of multiple network entities in combination, where each network entity has a structure similar to that of network entity 190 of FIG. 32F. In various different embodiments, network entity 190 is—or at least includes—one or more of (one or more entities in) RAN 103, (one or more entities in) RAN 104, (one or more entities in) RAN 105, (one or more entities in) core network 106, (one or more entities in) core network 107, (one or more entities in) core network 109, base station 114a, base station 114b, Node-B 140a, Node-B 140b, Node-B 140c, RNC 142a, RNC 142b, MGW 144, MSC 146, SGSN 148, GGSN 150, eNode B 160a, eNode B 160b, eNode B 160c, MME 162, serving gateway 164, PDN gateway 166, base station 180a, base station 180b, base station 180c, ASN gateway 182, MIP-HA 184, AAA 186, and gateway 188. And certainly other network entities and/or combinations of network entities could be used in various embodiments for carrying out the network-entity functions described herein, as the foregoing list is provided by way of example and not by way of limitation.

BRP MAC Packet for M-Dimensional Transmission.

Figure 1:
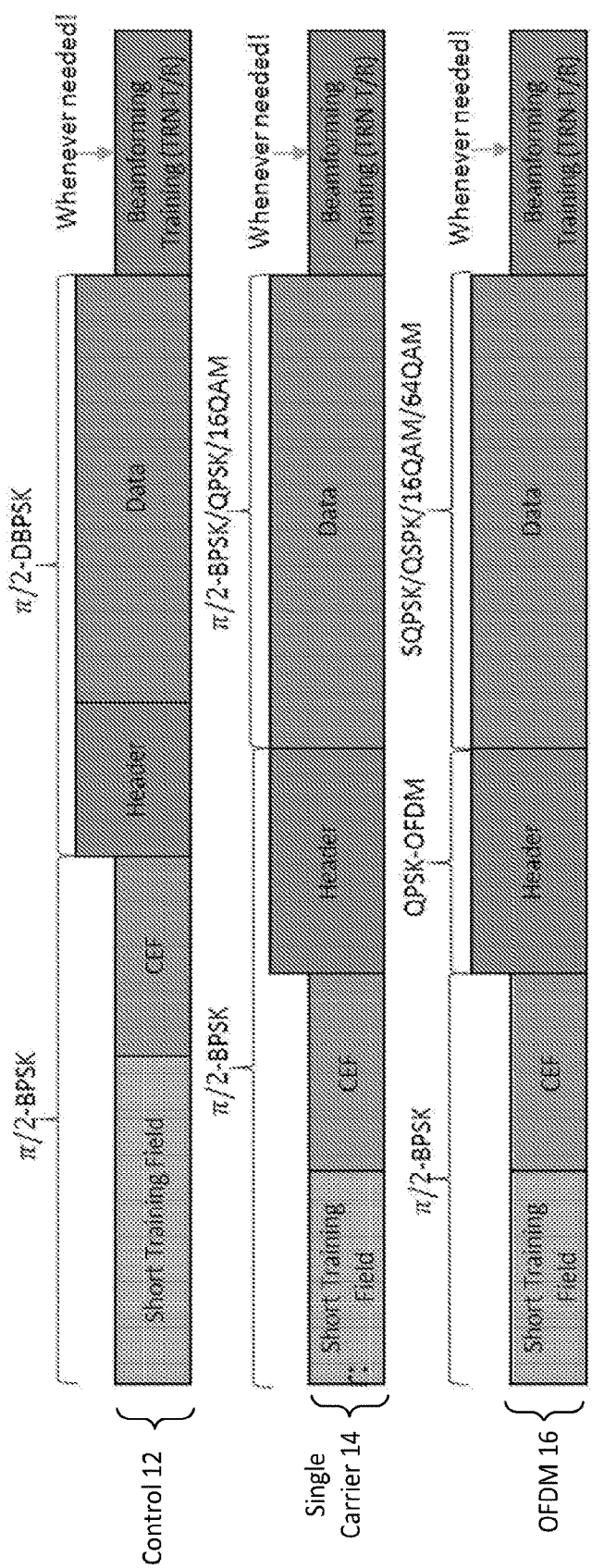
FIG. 1 illustrates exemplary PPDU formats in 802.11ad.
Figure 2:
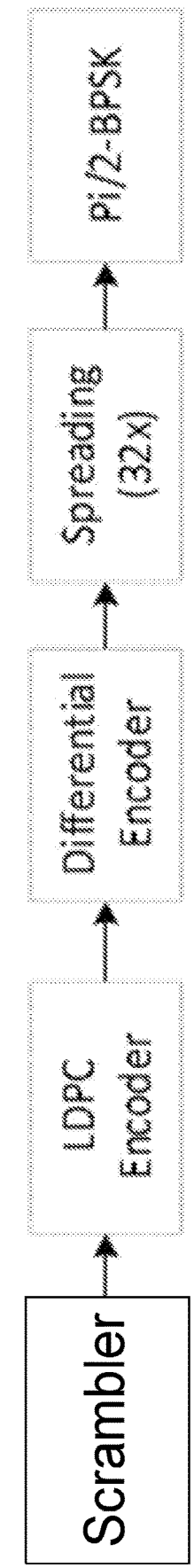
FIG. 2 illustrates an exemplary Control PHY transmission diagram in 802.11ad.
Figure 3:
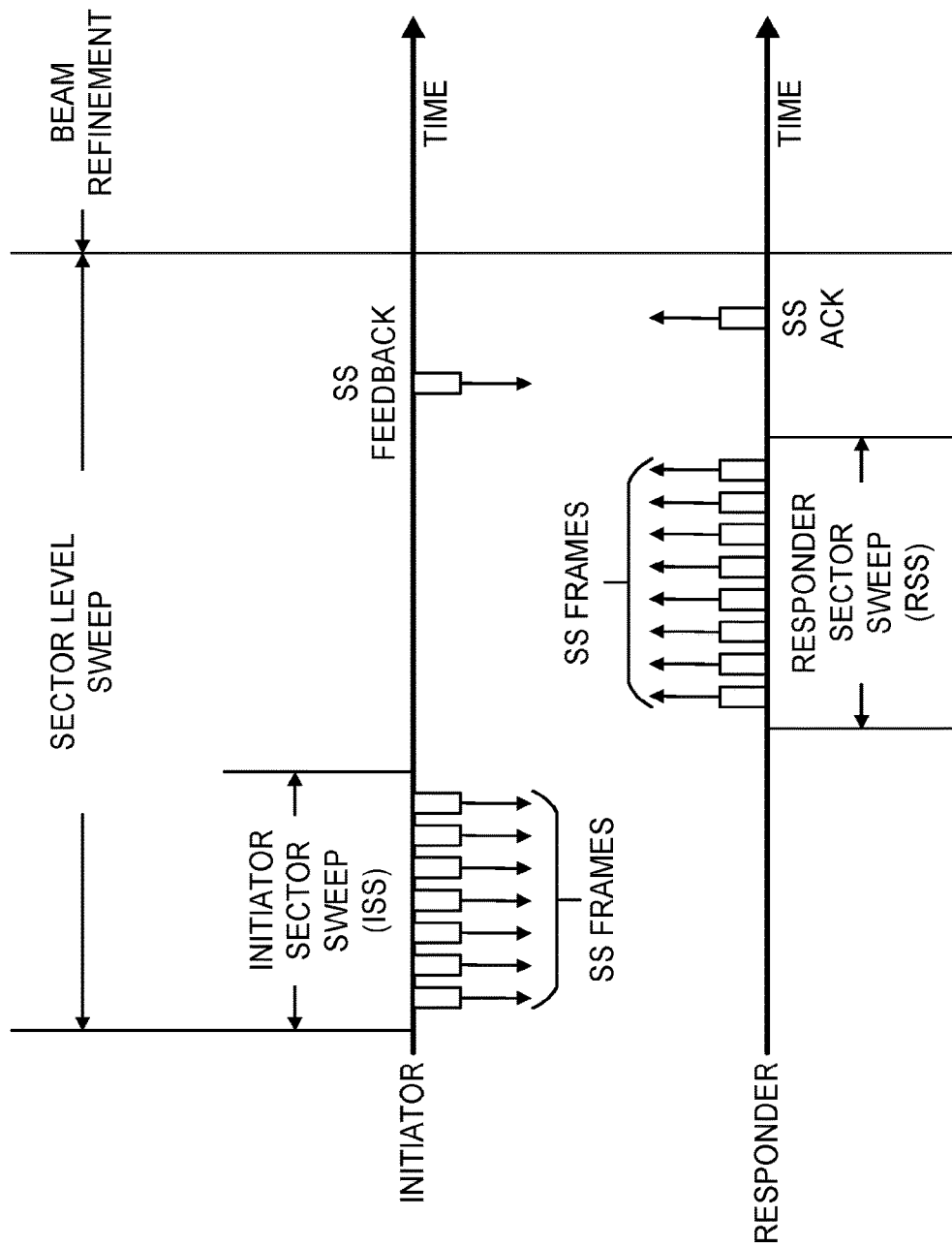
FIG. 3 illustrates an exemplary Sector Level Sweep training procedure.
Figure 4:
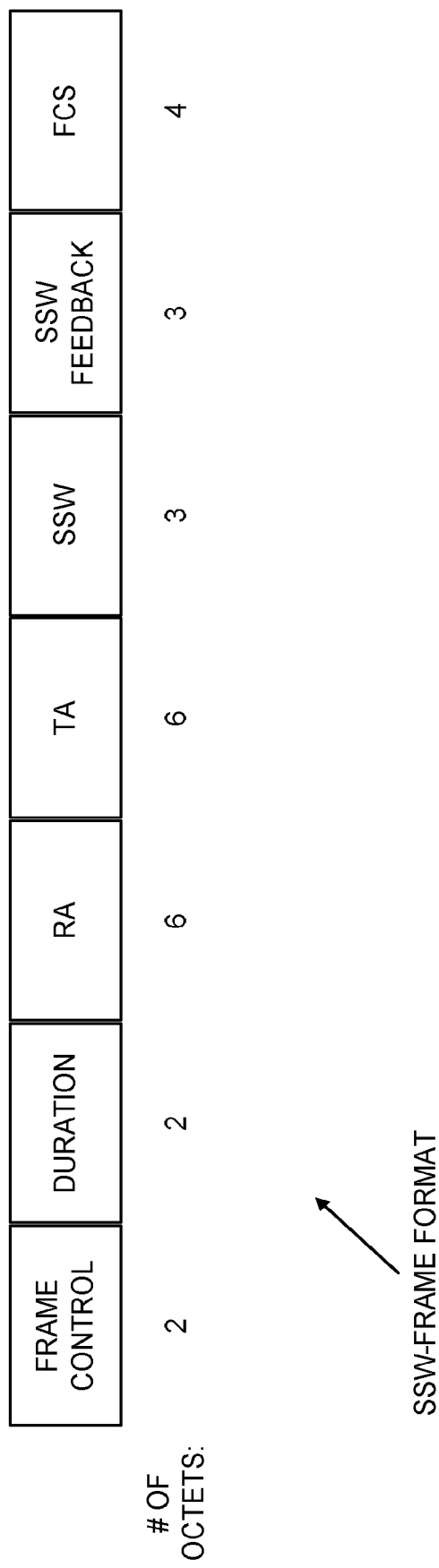
FIG. 4 illustrates an exemplary SSW frame format.
Figure 5:
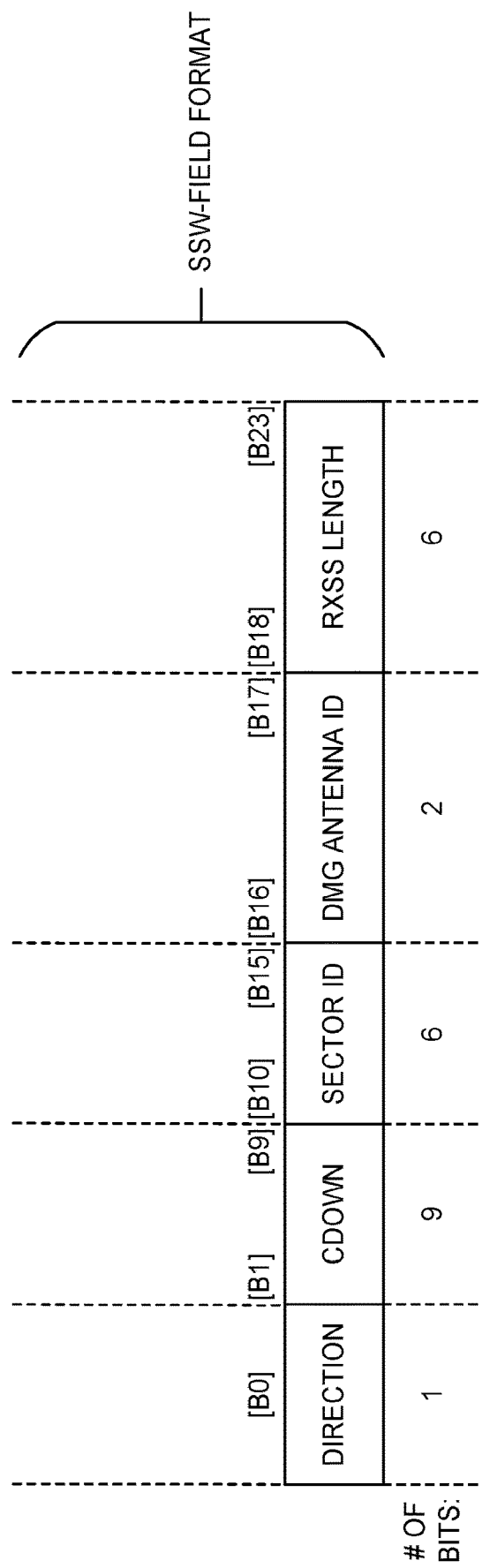
FIG. 5 illustrates an exemplary SSW field format.
Figure 7:
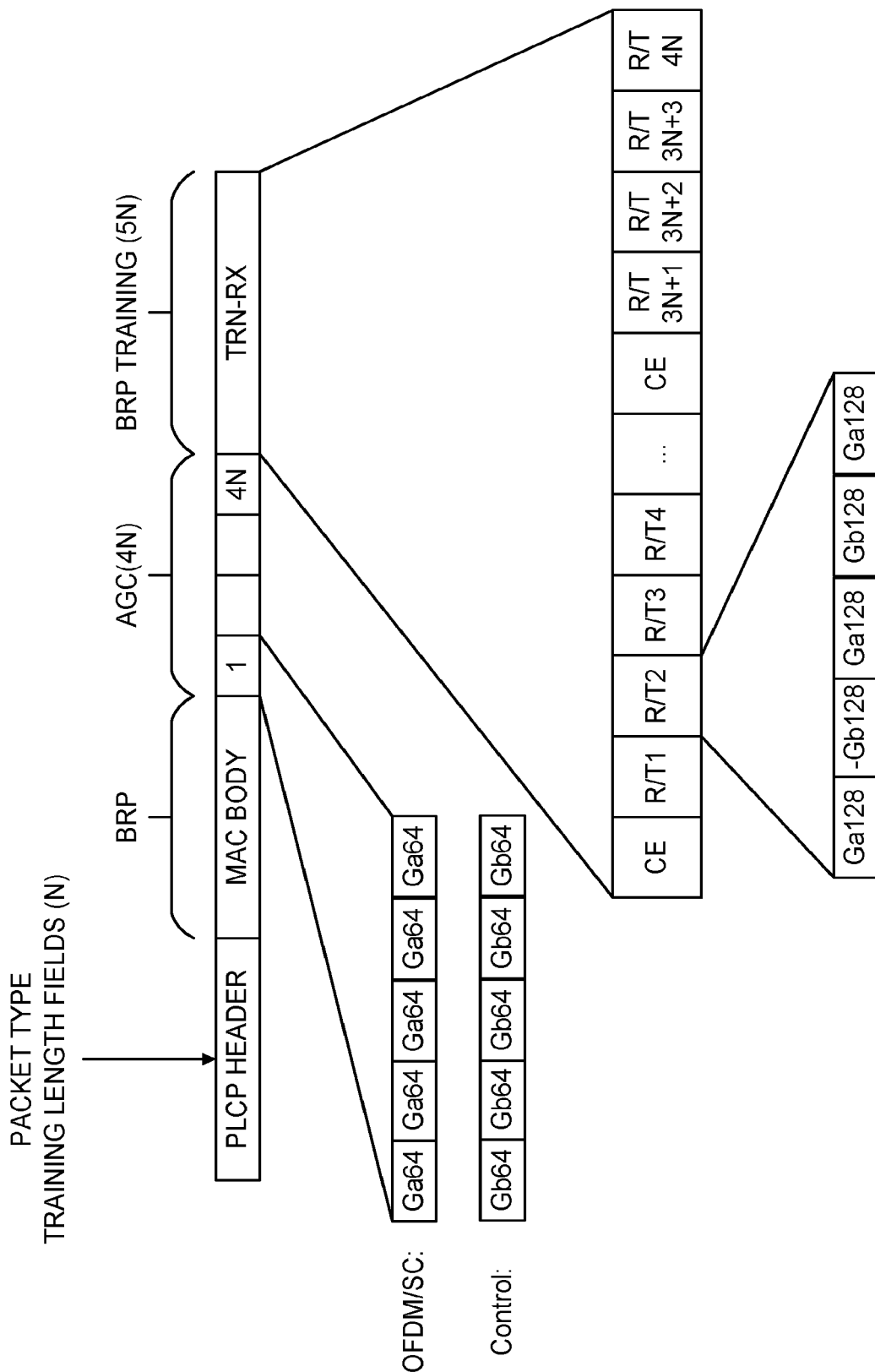
FIG. 7 illustrates an exemplary BRP TRN-RX packet.
Figure 9:
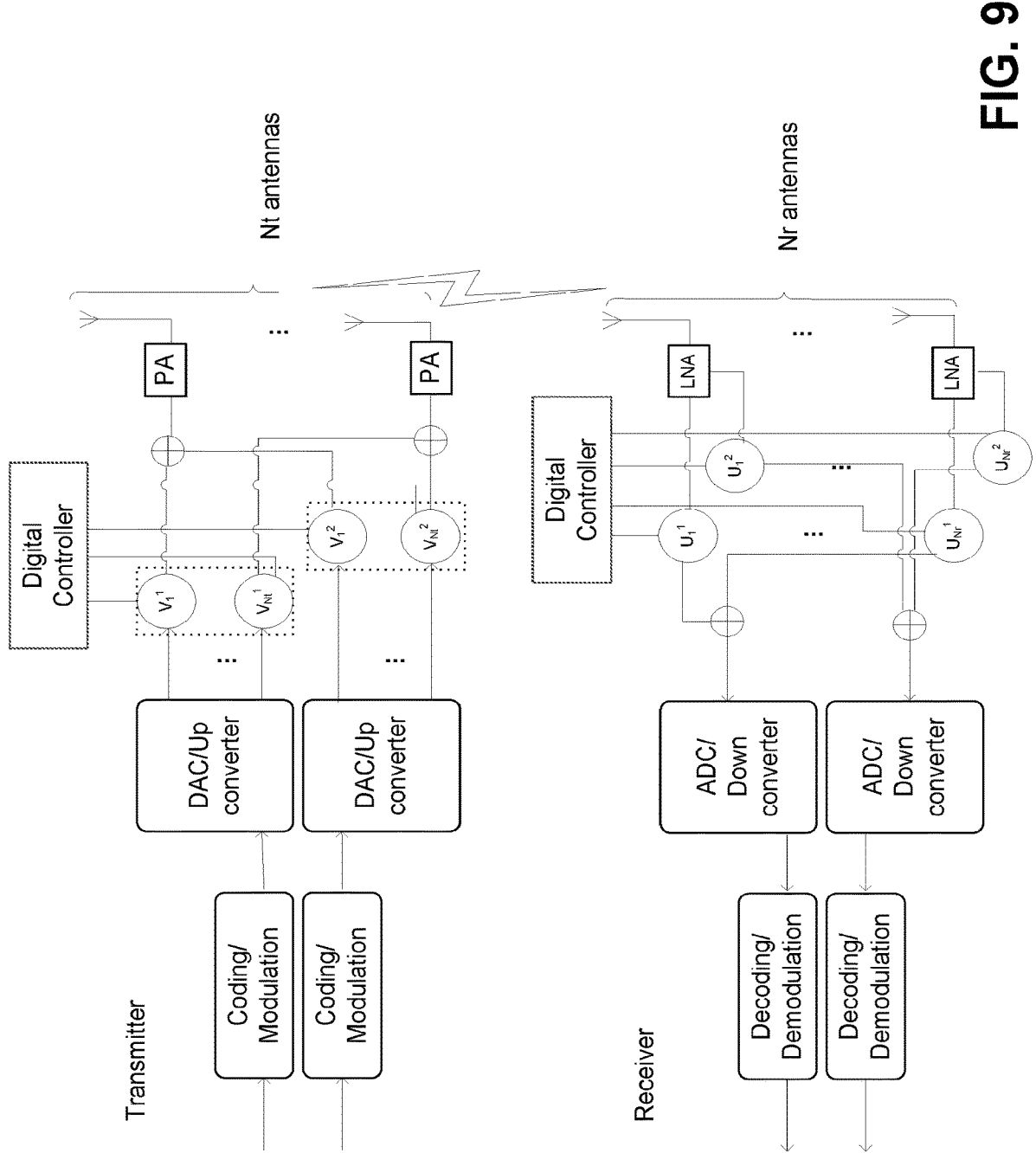
FIG. 9 illustrates an exemplary architecture for beamforming where all physical antennas are excited by all the weights.
Figure 10:
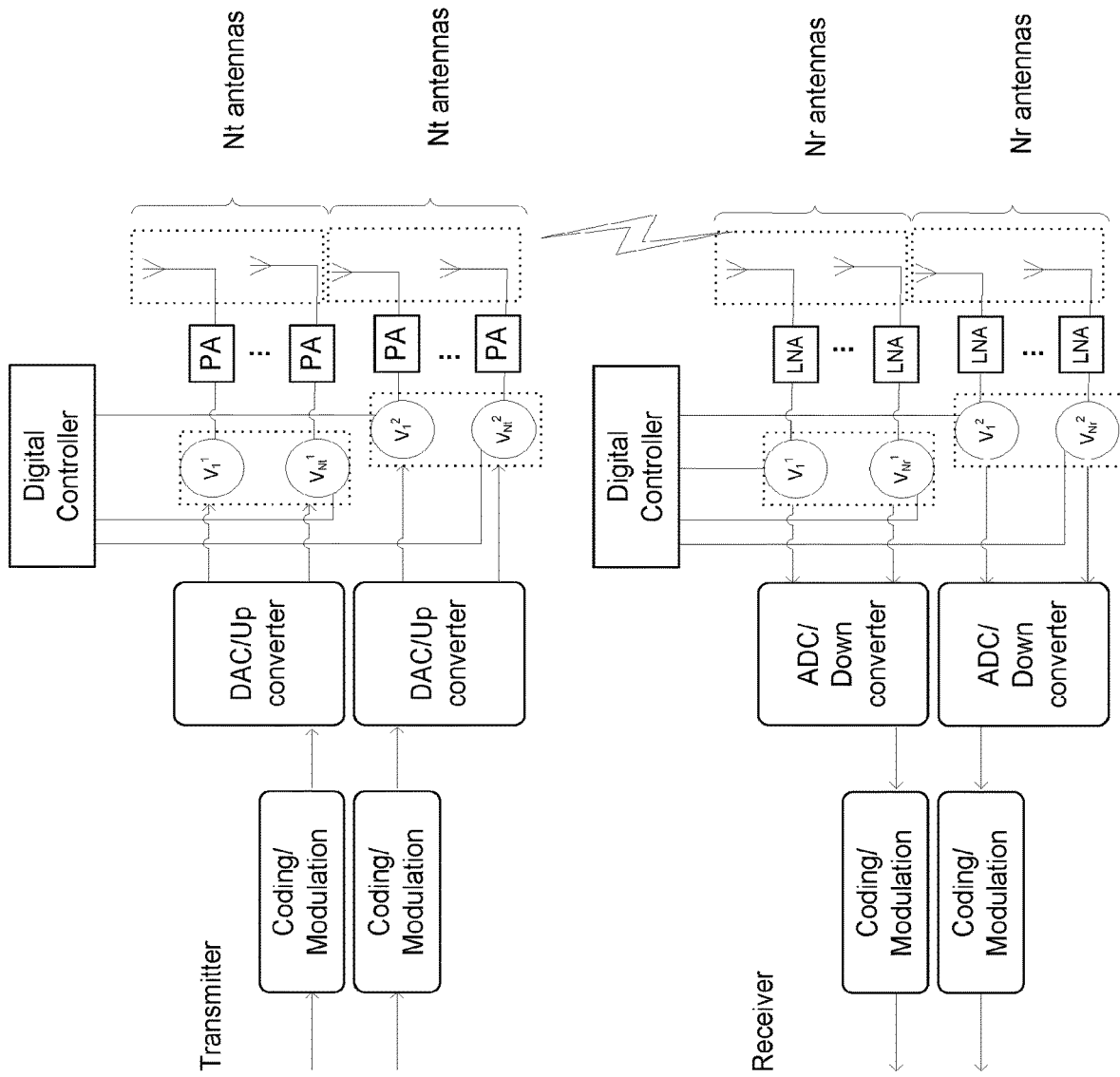
FIG. 10 illustrates an exemplary architecture for beamforming where different physical antennas are excited by separate weights.
Figure 11:
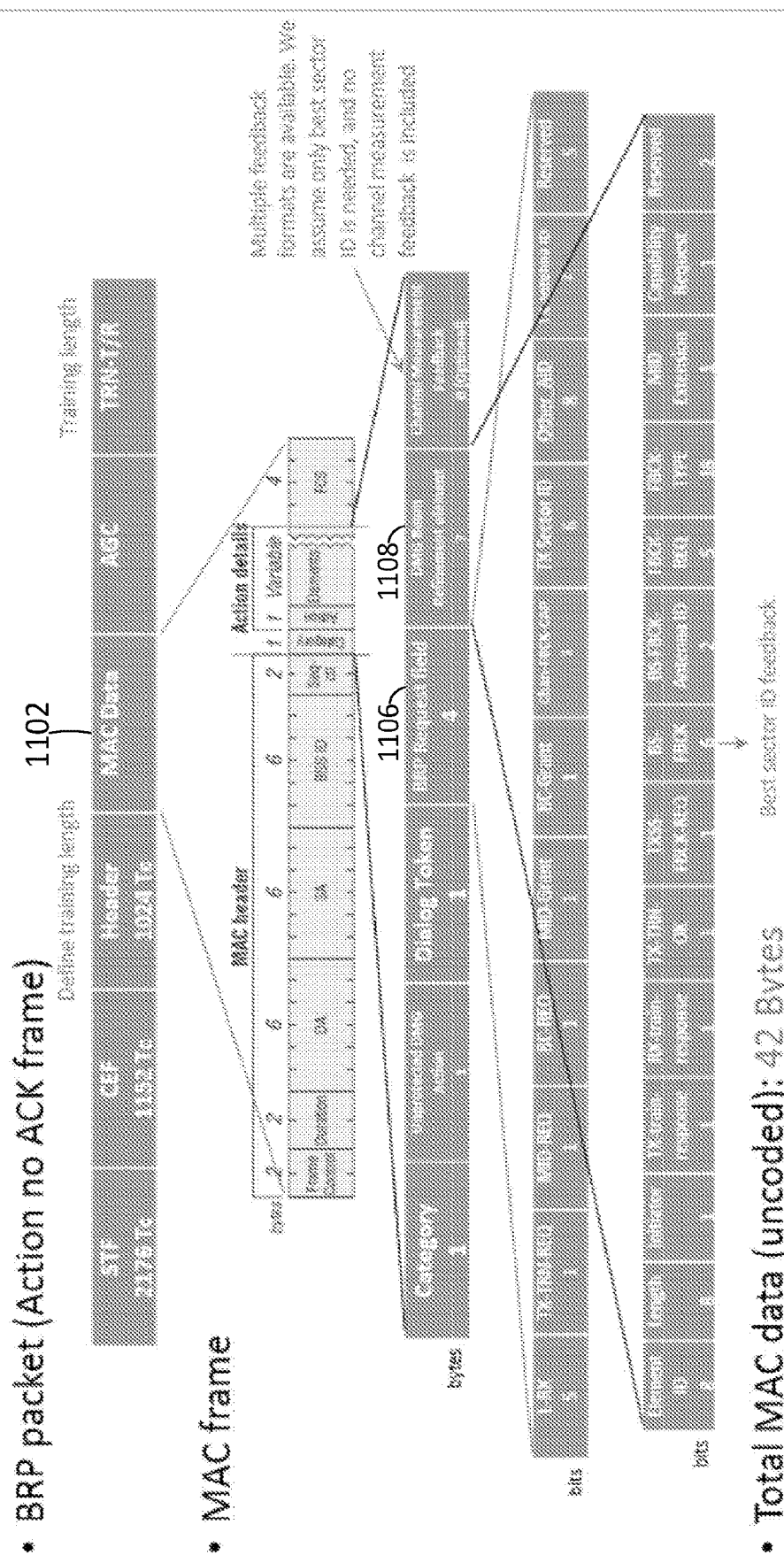
FIG. 11 illustrates an exemplary 802.11ad BRP MAC Packet for single stream transmission.
Figure 12:
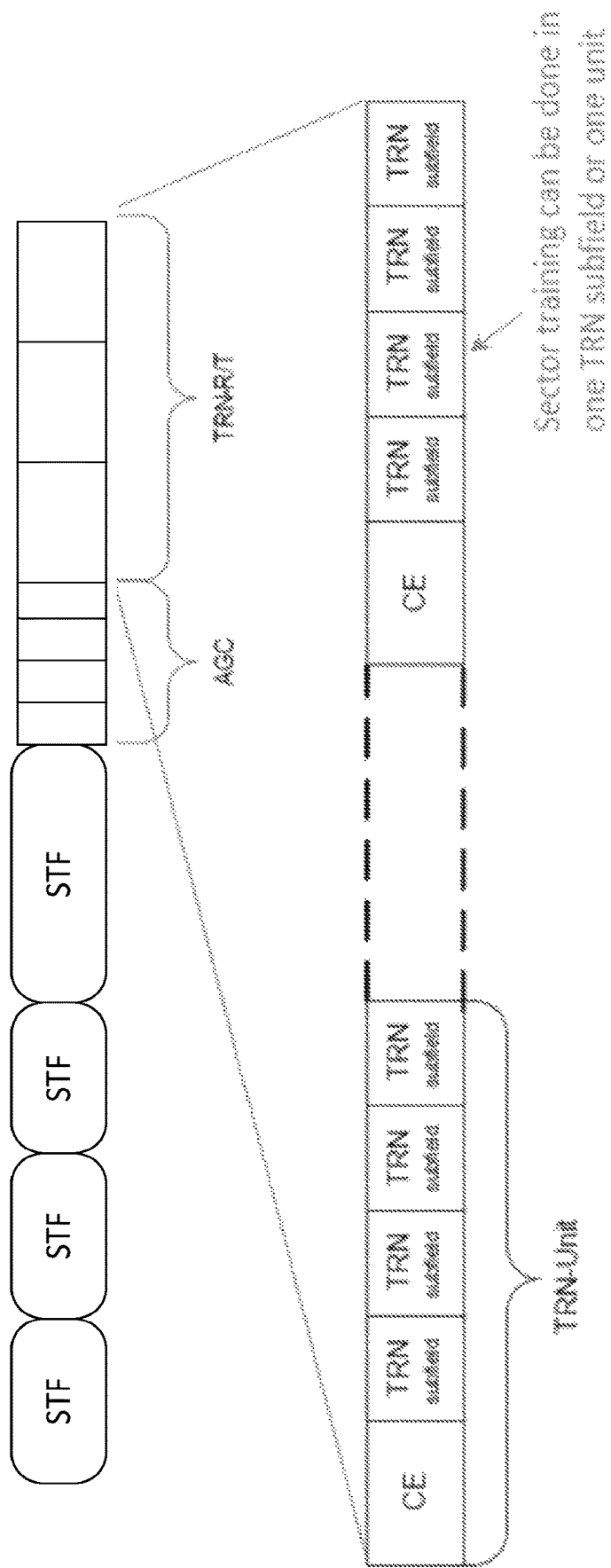
FIG. 12 illustrates an exemplary 802.11ad BRP PPDU for single stream transmission.

The current BRP MAC in 11ad is designed to provide setup, beam refinement and feedback for the single beam transmission that exists in 802.11ad. The MAC packet includes the BRP Request Field and the DMG Beam Refinement Element (see FIG. 11). The supporting PHY layer PPDU used to estimate the best beam in a BRP procedure is designed for single beam transmission (as shown in FIG. 12). The elements of this PPDU include an AGC field, a Channel Estimation Field and a TRN field for the single Tx-Rx antenna pair and signal channel. For multi-dimensional BRP (where the dimensions may be multiple transmit-receive beam pairs, multiple polarizations, or multiple channels, and/or the like), set forth below are methods to extend the MAC packet and the PPDU format with or without backwards compatibility. The multiple dimensions may be supported jointly or separately.

Methods and procedures are set forth in this section to address these problems, and others.

Multi-Dimensional Enhanced Beam Refinement Protocol MAC and PHY Frame Design.

In some embodiments, the design of an Enhanced Beam Refinement Protocol (eBRP) MAC frame (and the associated PHY PPDU) is disclosed to support multi-dimensional BRP procedures. The multi-dimensional BRP procedures may be specified with respect to space, frequency, and/or polarization.

Capability Indication for Multi-Dimensional eBRP Procedure.

To enable negotiation of the eDMG STA capability during the eBRP setup phase, eDMG capability fields are defined that provide indications of the following transmission dimensions:
1) the allowed number of transmit-receive beam pairs,
2) the number of channels that can be aggregated or bonded, and/or
3) the maximum number of spatial streams.

This allows the eDMG STA to negotiate these parameters or dimensions to be used with another STA during the eBRP setup procedure. The number of transmit/receive beam pairs can be greater than the number of streams allowed, e.g., N_beams=4 and Nss=2. The last negotiated parameters used in sector level sweep procedures may include the number of beam-pairs and the number of streams.

BRP Procedure and Signaling for Multi-Dimensional Transmission.

Figure 13:
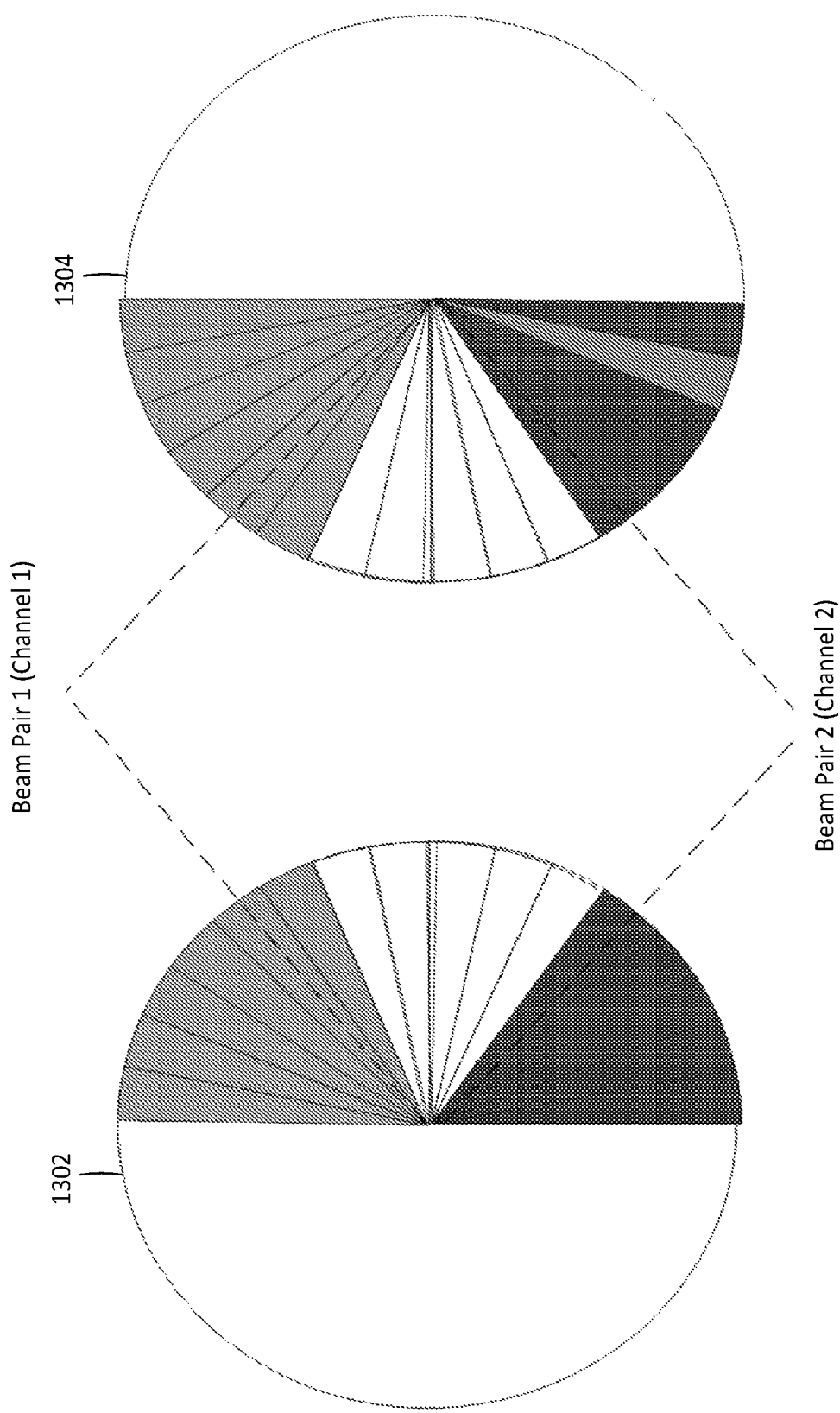
FIG. 13 illustrates an exemplary multiple antenna BRP with two beam pairs for an exemplary initiator and responder.

FIG. 13 shows an exemplary initiator 1302 and responder 1304 with two beam pairs. Beam pair 1 is found based on a sweep in the upper sectors while beam pair 2 is found based on a sweep of the lower sectors. As such, information on the specific beam pair that is being refined may be signaled in an updated eBRP packet.

The eBRP refinement procedure may be signaled and/or executed independently or jointly per dimension. In various embodiments, the eBRP refinement signaling may be coded or transmitted independently per dimension. This signaling may occur in the setup phase or during the refinement procedure. In various embodiments, the eBRP refinement procedure may be performed independently per dimension. In various embodiments, the eBRP refinement signaling may be coded or transmitted jointly per dimension. In various embodiments, the eBRP refinement procedure may be performed jointly per dimension.

Procedures to identify the quality of each dimension (e.g., transmit/receive beam-pair or channel) may be used as input to decide (a) which dimensions are to be updated and (b) whether the dimensions are to be signaled and/or executed independently or jointly.

In mmWave beamforming for single stream WLANs as implemented in 802.11ad, the transmit-receive pair may go through the following procedures:
  Sector Level Sweep (SLS): Identifies the large sectors and enables communication between Tx and Rx at DMG control mode rate or higher.
  Beam Refinement Protocol (BRP): enables receive training and enables iterative refinement of the AWV of both transmitter and receiver at both participating STAs.

The BRP is composed of one or more of the following: a BRP setup, Multiple Sector Identification Detection (MID), Beam Combining (BC), Multiple Sector Identification and Capture (MIDC), Beam Refinement Transaction, and/or the like.

A BRP setup serves to exchange BRP parameters between the initiator and responder. This step is used only when BRP does not immediately follow a SLS.

In MID, a quasi-omni transmit pattern is tested against a number of Antenna Waveform Vectors (AWVs) and identifies the best set of receive antennas for the initiator (I-MID) or responder (R-MID). A quasi-omni pattern is the pattern closest to omni-directional that is available at an eDMG antenna. It may be made up of multiple beams and is non-directional.

BC comprises an exhaustive pairwise test of a set of transmit and receive AWVs.

MIDC combines the MID and BC procedures.

A Beam Refinement Transaction is a set of BRP frames that is composed on request for and responses to AWV tests by the initiator or responder.

For multiple dimensional transmission, one or more of the following modifications disclosed below may be used.

Enhanced Sector Level Sweep (eSLS) may be used to identify the large sectors for each dimension and enables communication between Tx and Rx at eDMG control mode rate or higher. For multiple beam transmission, an eSLS may be used to create multiple Tx/Rx beams. The dimensions may be separated by any of the following: time, eDMG antenna, polarization, frequency, etc. To improve the reliability of the eDMG control mode transmission, the following may be used:
  A beam selection algorithm that selects the beam with the best quality (e.g., the largest SNR) to transmit the control information and improve the reliability of the control mode.
  A beam diversity code (such as an Alamouti-like code, e.g., STBC or SFBC) to transmit the control information and improve the reliability of the eDMG control mode.
    Note that for an eDMG Beam Refinement element, if the element is transmitted during a request or negotiation (capability request=1), the transmission may be in diversity mode. In other modes, the transmission may be in diversity, quasi-omni or beam-based mode.

An Enhanced Beam Refinement Protocol (eBRP) may be utilized to enable receive training for each beam in each dimension, while also enabling iterative refinement of the Antenna Weight Vectors (AWVs) of all the beams of both transmitter and receiver at both participating STAs.

In single beam MID, the requestor feeds back SNR and sector IDs of the last SLS phase to enable the initiator to identify the AWVs that are selected. For multi-dimensional transmission (e.g., multiple transmit-receive beam or multiple channel transmission), this information may be signaled in a dimension specific manner.

In various embodiments, the eBRP procedure may be executed independently for each beam pair or may be executed jointly among all (or a subset) of beam pairs.

In embodiments having independent eBRP procedure execution, each dimension (e.g., a transmit-receive beam pair) performs the eBRP procedure as a separate procedure. This is a simple backwards compatible extension of the current 802.11ad procedure with additional signaling indicating the desired beam pair or dimension.

In independent eBRP signaling, each dimension (e.g., a transmit-receive beam pair) has its own independent signaling as illustrated in FIG. 14. Each dimension (e.g., a transmit-receive pair) may have its own independent BRP Request Field 1402 and DMG Beam Refinement element 1404 to enable feedback of the BS-FBCK field (the index of the TRN-T field that was received with the best quality in the last received BRP-TX). This is a backwards compatible extension of the current 802.11 ad procedure.

In one example, the additional dimensional signaling (which without loss of generality may be labelled as the Tx-Rx Beam ID), may be placed in the BRP Request field. In this case, the reserved bits (B27 to B31) in the existing BRP request field format may be used (see 1502 in FIG. 15). The frames may be transmitted sequentially. In scenarios where there may be multiple existing dimensions already available to transmit information, they may be transmitted independently on a per dimension basis (e.g., in the case of multiple transmit-receive beam pairs), where each dimension may transmit its information on its own beam.

In embodiments having joint/simultaneous eBRP procedure execution, multiple dimensions (e.g., multiple transmit-receive beam pairs) may perform the eBRP procedure simultaneously. The eBRP procedure can be implemented in a number of ways. For example, in one embodiment it may be based on an exhaustive search of all possible beam pairs. In another embodiment, it may be based on a search of the next best beam pair conditioned on the selection of the previously selected best beam pairs.

In another embodiment, the eBRP procedure may be based on a simultaneous search of all possible beam pairs. In this case, the 802.11ad BRP PPDU may be modified to support the simultaneous transmission of the CE, AGC 1802, and TRN-T/R 1804 signals as shown in FIG. 18, and discussed in U.S. Provisional Application for Patent Ser. No. 61/365,014, filed Jul. 21, 2016, which is incorporated herein by reference in its entirety.

Figure 16:
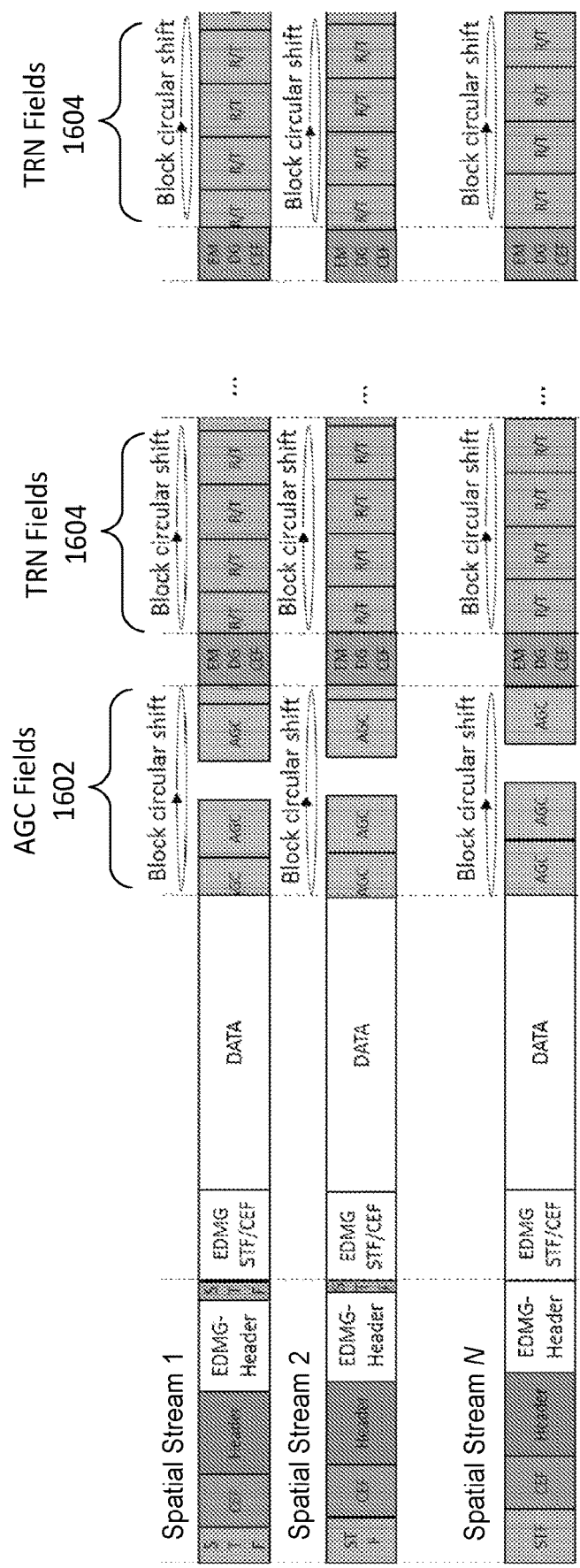
FIG. 16 illustrates one embodiment for CSD during simultaneous BRP, where AGC and TRN fields are circularly-shifted as blocks.
Figure 17:
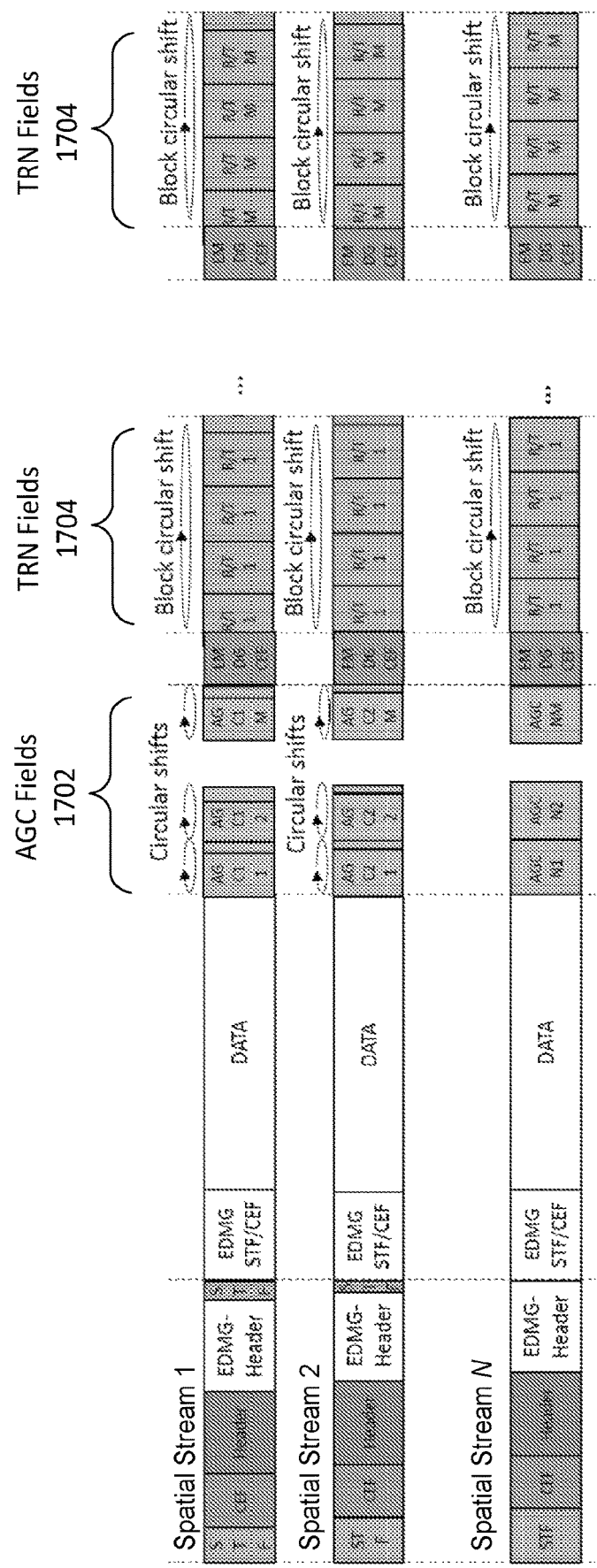
FIG. 17 illustrates one embodiment for CSD during simultaneous BRP, where individual AGC fields and TRN fields are circularly-shifted.

The CEF may by orthogonalized by sending orthogonal (using conjugation for example) or by masking the sequences from each spatial stream with an orthogonal matrix. The AGC may be sent on multiple streams using multiple techniques, e.g., using cyclic shift diversity (CSD), to decrease the correlation between the streams and allow the receiver to set the AGC settings properly during the simultaneous BRP. In various embodiments, CSD during the simultaneous BRP may follow two approaches: 1) the AGC fields 1602 and TRN fields 1604 are circularly-shifted as blocks as shown in FIG. 16; or 2) individual AGC fields 1702 and TRN fields 1704 are circularly-shifted as shown in FIG. 17. In 2), the sequences in AGC fields and TRN fields may be different on each time slot. CSD may also be applied to EDMG CEF field. In this case, the block-circular shift for TRN fields in 1) and 2) may also include EDMG CEF. The TRN-T/R sequences may be orthogonalized by sending orthogonal (using conjugation for example) or by masking the sequences from each spatial stream with an orthogonal matrix. Signaling to indicate the number of simultaneous streams is needed. This may be signaled in the BRP frame (in the MAC) or signaled implicitly by the AGC.

In embodiments having joint/simultaneous BRP signaling, each dimension (e.g., each transmit-receive pair) is assigned a BRP request field where the fields may be concatenated in a fixed or dynamic manner.

In embodiments having fixed concatenation, the number of BRP request fields are fixed based on the maximum number of transmit receive beams or dimensions required. In the case that a transmit receive beam does not need refinement, the MID-REQ, BC-REQ, MID-Grant, and BC-Grant fields may be set to zero (see FIG. 19). The number of dimensions to simultaneously refine (and the possible grouping) may also be signaled. In one method, the number of dimensions to be simultaneously processed may be agreed on during the BRP setup phase. In one method, the number of dimensions to be simultaneously processed may be explicitly signaled in the PHY header or MAC frame, e.g., BRP request field. In one method, the grouping of dimensions may be decided implicitly by the arrangement of the BRP request fields. In one method, the grouping may be decided by explicit signaling in the PHY header or MAC frame, e.g., the BRP request fields.

Figure 20:
FIG. 20 illustrates one embodiment of a joint BRP request field with a dynamic number of BRP requests.

In embodiments having dynamic concatenation, the number of eBRP request fields are changed based on the number of transmit receive beams that may need refinement. A parameter that indicates the number of eBRP requests maybe placed in the BRP frame (for example in the PHY or MAC header) or somewhere in the MAC frame. The number of BRP requests may also be derived implicitly from the length of the BRP frame. This is illustrated in a BRP frame 2000 in FIG. 20.

Figure 21:
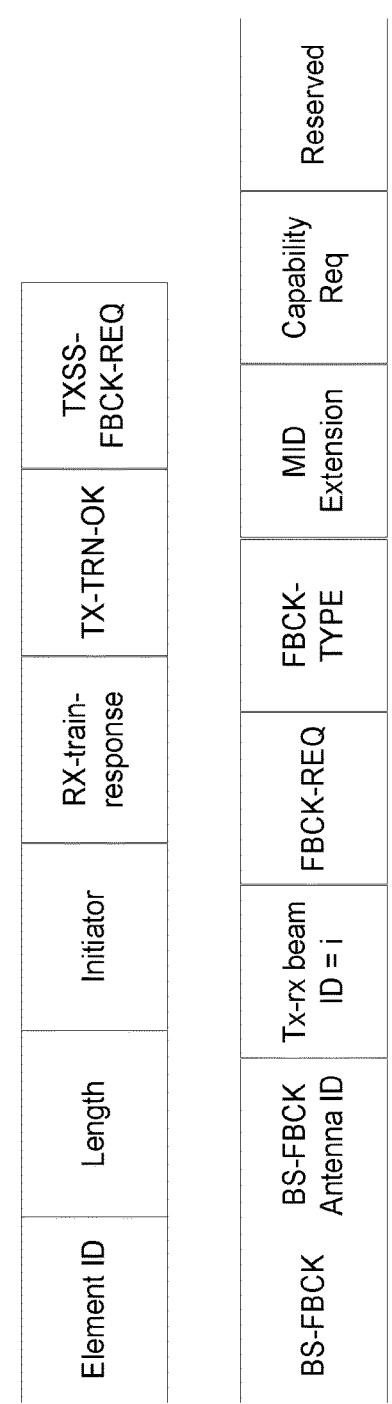
FIG. 21 illustrates one embodiment of an independent eDMG beam refinement element.

For joint eBRP procedure execution, the eDMG Beam Refinement element may be modified to allow for feedback of the desired number of BS-FBCK and BS-FBCK Antenna ID fields. An additional field indicating the corresponding dimension (e.g., a transmit-receive beam pair) may also be needed for some embodiments. In one method, each transmit-receive beam pair may feed back an independent element (see 2100 in FIG. 21).

This may result in unnecessary overhead due to the commonality of some of the parameters. In another method, a signal eDMG Beam Refinement element may be sent with multiple BS-FBCK, BS-FBCK Antenna ID, and dimension (e.g., transmit-receive beam) fields (see 2200 in FIG. 22). In the BRP procedure, the transmitter/receiver may in some embodiments need to obtain the IDs and SNRs of the Tx sectors received during the SLS phase for the use of the L-RX field in the BRP sub-phases. In the eBRP procedure, the feedback may be identified based on the transmitter-receiver beam pair.

If detailed channel measurement feedback is desired, then the detailed measurement may also be per dimension. Alternatively, the detailed channel measurement feedback may be a composite of all the different dimensions, e.g., an effective MIMO channel.

Figure 23:
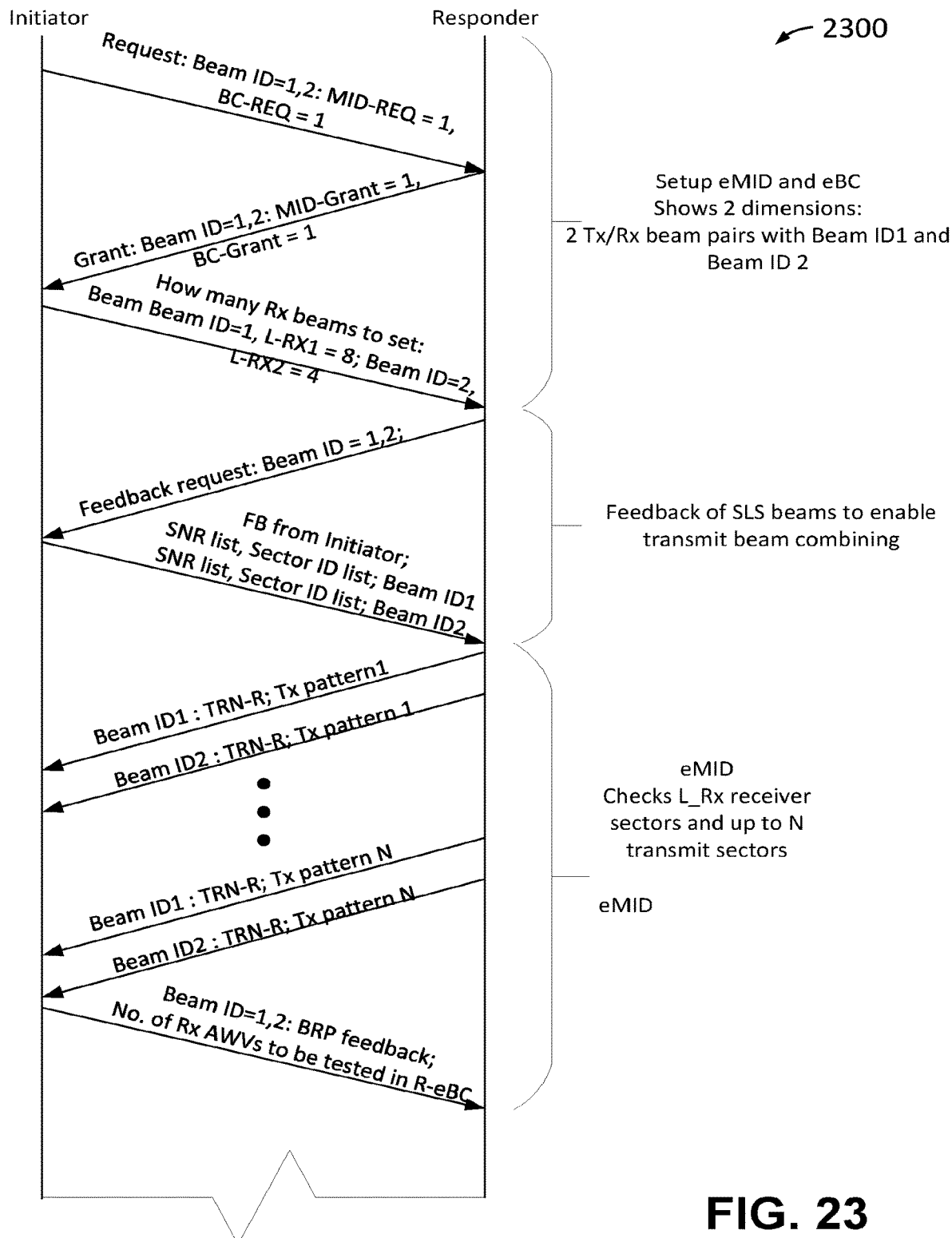
FIG. 23 illustrates an exemplary multi-dimensional eBRP procedure having an eMIDC sub-phase for a multiple beam transmission.
Figure 23:
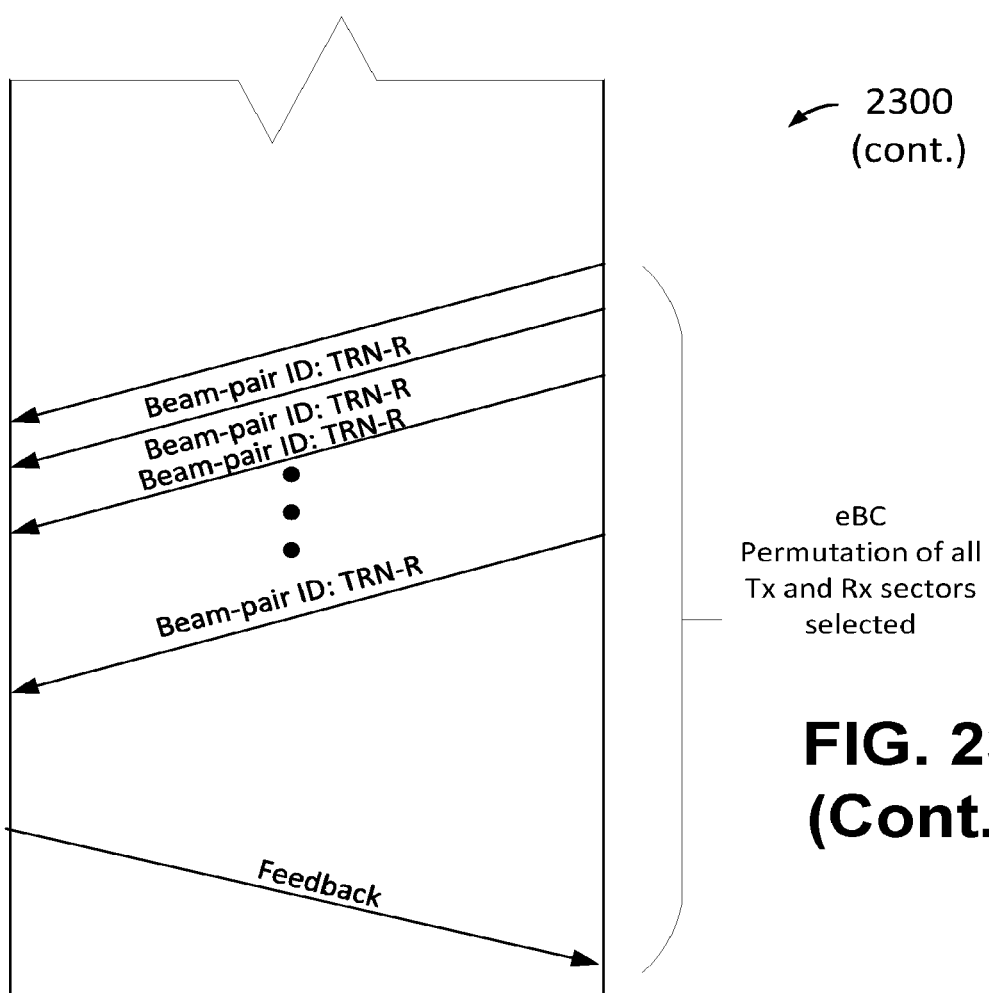
Figure 25:
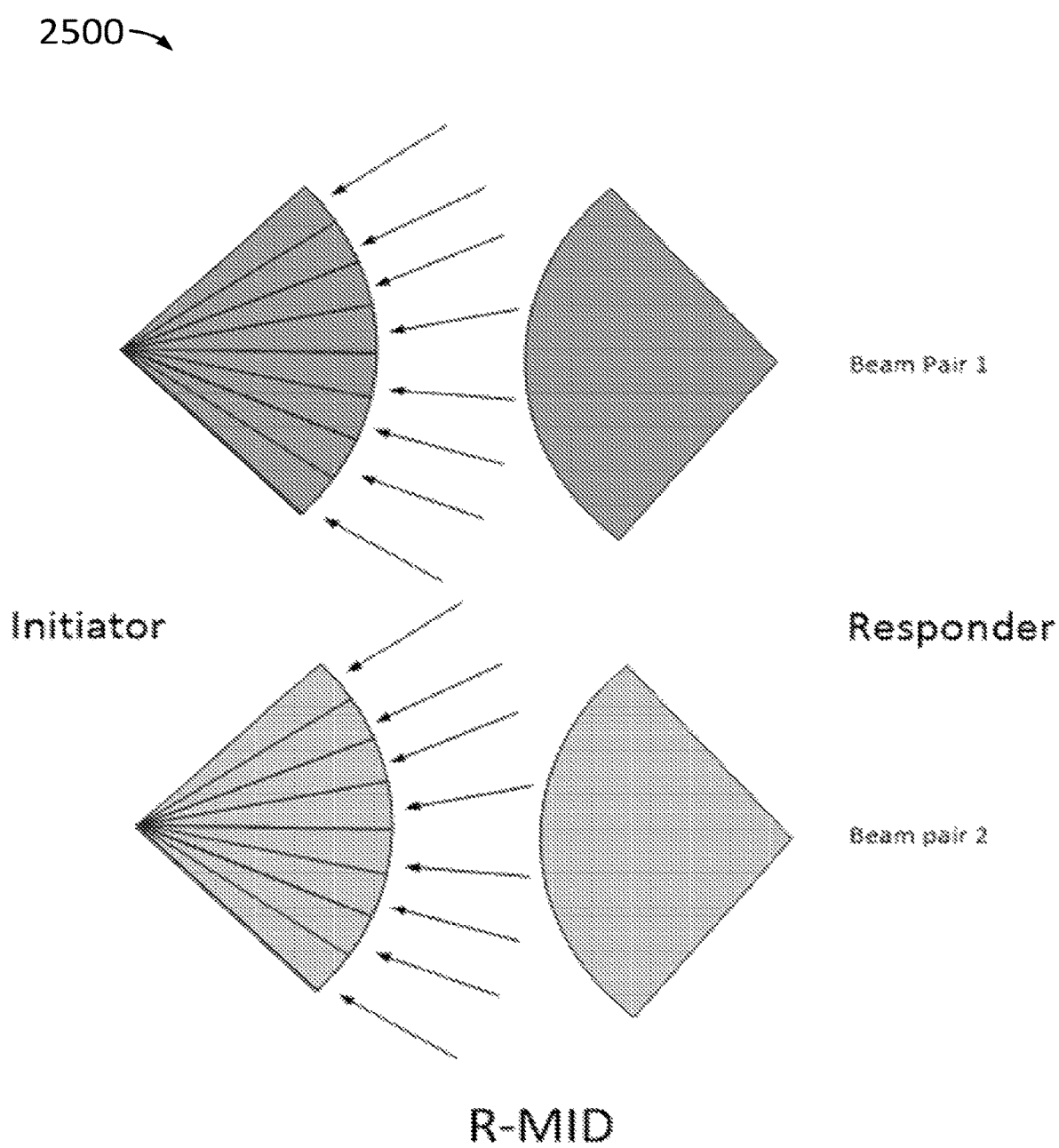
FIG. 25 illustrates an exemplary R-eMID subphase of the multi-beam eBRP.
Figure 26:
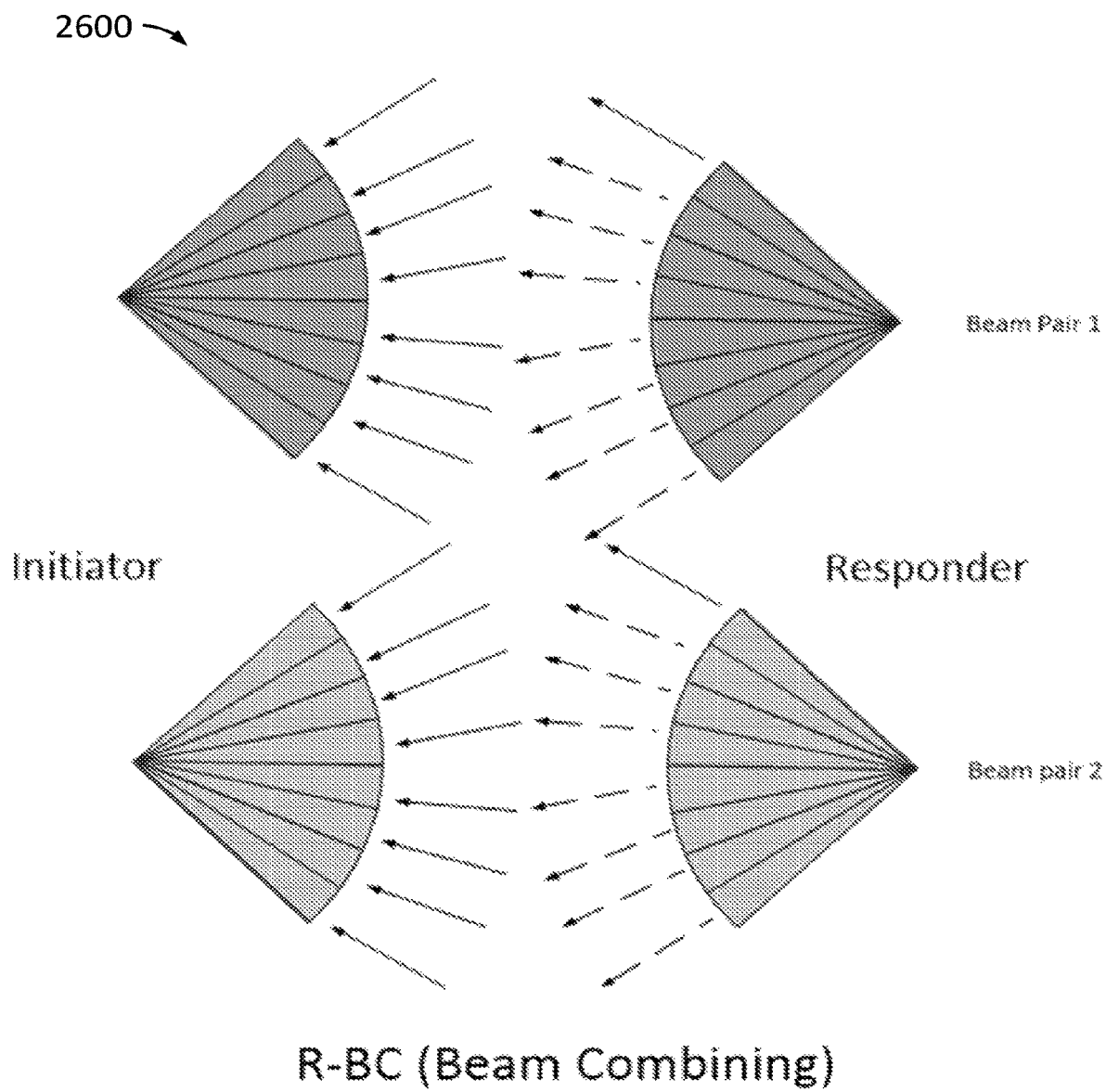
FIG. 26 illustrates an exemplary R-eBC subphase of the multi-beam eBRP.

In this case, a simple extension of the 802.11ad BRP feedback may be used in which each channel tap is reported as an $Nr \times Nt \times x$-bits with the in-phase and quadrature component pairs of the responses estimated relative to the amplitude of the strongest I/Q element measured with each component value represented as a two's complement number. An exemplary multi-dimensional eBRP procedure 2300 illustrating an eMIDC sub-phase for a multiple beam transmission is shown in FIG. 23 with FIG. 25 and FIG. 26 illustrating the R-eMID and R-eBC subphases 2500 and 2600, respectively, of the multi-beam eBRP. In this example, the dimensions are transmit receive beam pairs.

Figure 24:
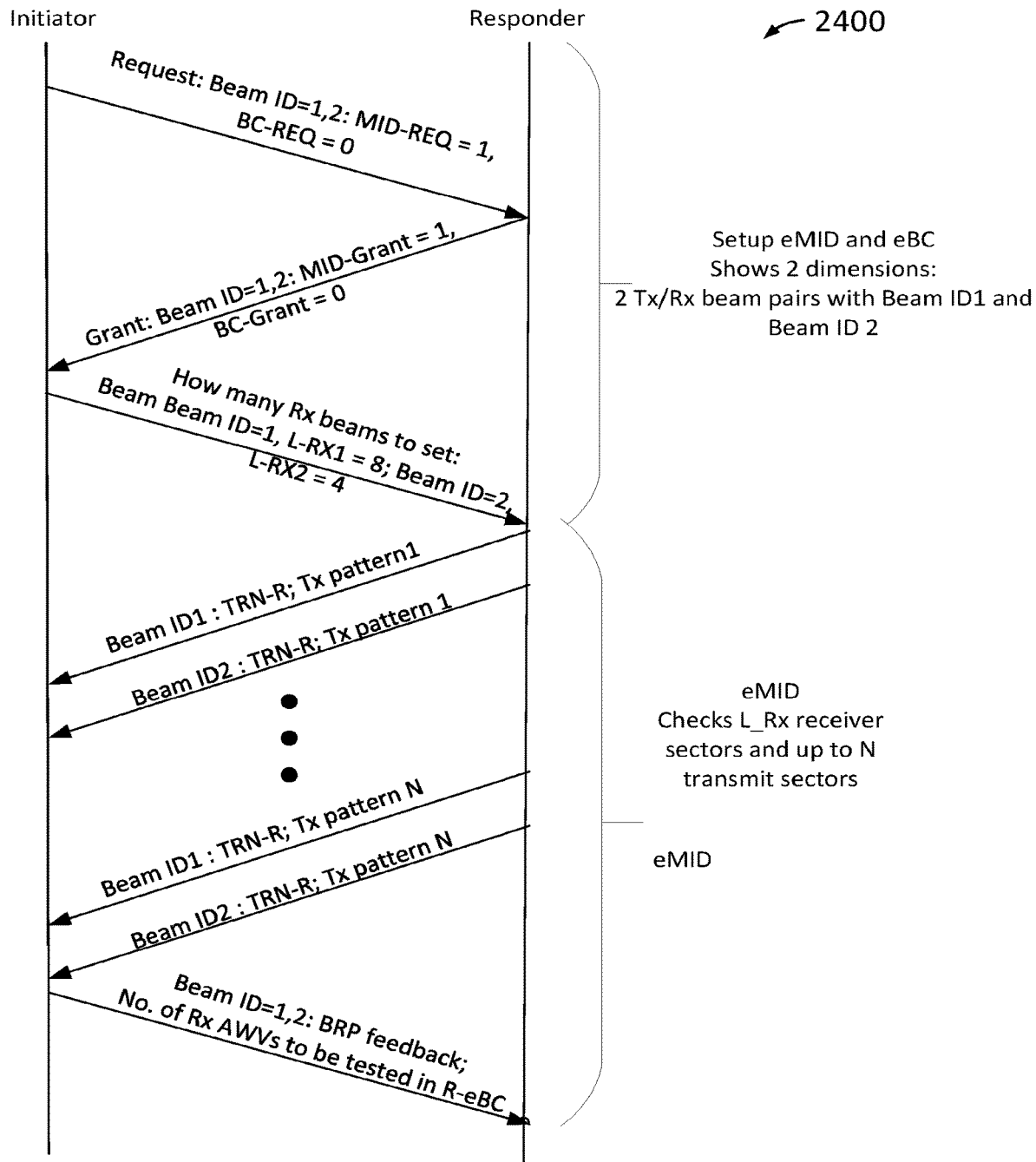
FIG. 24 illustrates an exemplary multi-dimensional eBRP procedure having an eBRP eMID sub-phase only for a multiple beam transmission.

An exemplary multi-dimensional eBRP procedure 2400 illustrating an eBRP eMID sub-phase only for a multiple beam transmission is shown in FIG. 24. In that example, the dimensions are transmit receive beam pairs.

As further examples, a method may include conducting an enhanced beam refinement protocol (eBRP) between an initiator device and at least one responder device for at least one transmit-receive beam pair, where the at least one transmit-receive beam pair has a plurality of dimensions.

The eBRP may include receive training for each of the at least one beam pair and enables iterative refinement of antenna weight vectors (AWVs) of all beams of both transmitter and receiver at the initiator device and the at least one responder device.

The AWVs may be identified in a dimension specific manner.

The eBRP procedure may be conducted independently for each of the at least one beam pairs.

Each of the at least one beam pairs may perform the eBRP procedure as a separate procedure.

Each dimension of the at least one transmit-receive beam pair may include its own independent BRP Request Field and DMG Beam Refinement element to enable feedback of a BS-FBCK field.

The eBRP may be backward compatible with 802.11ad and, and may signal dimension identification information in the BRP request field.

Each of the at least one beam pairs may transmit its information on its own beam.

The eBRP procedure may be conducted jointly among all of the at least one beam pairs.

The eBRP procedure may be based on an exhaustive search of all possible beam pairs.

The eBRP procedure may be based on a search of a next best beam pair conditioned on selection of a previously selected best beam pair.

The eBRP procedure may be based on a simultaneous search of all possible beam pairs.

The BRP PPDU may be modified to support simultaneous transmission of CE, AGC, and TRN-T/R signals.

CEF may be orthogonalized by sending orthogonal or masking sequences from each spatial stream with an orthogonal matrix.

The AGC may be sent using cyclic shift diversity.

AGC and TRN fields may be circularly shifted as blocks.

Individual AGC fields and TRN fields may be circularly shifted.

Cyclic shift diversity may be applied to the EDMG CEF field.

TRN-T/R sequences may be orthogonalized by sending orthogonal or masking sequences from each spatial stream with an orthogonal matrix.

The number of simultaneous streams may be signaled in the BRP frame.

The number of simultaneous streams may be signaled implicitly by the AGC.

Each dimension may be assigned a BRP request field with the fields concatenated in a fixed concatenation.

The number of BRP request fields may be fixed based on a maximum number of dimensions required.

Each dimension may be assigned a BRP request field with the fields concatenated in a dynamic concatenation.

The number of eBRP request fields may change based on the number of transmit receive beams requesting refinement.

A parameter indicating the number of eBRP requests may be placed in the BRP frame.

A parameter indicating the number of eBRP requests may be placed in the MAC frame.

The number of BRP requests may be derived implicitly from a length of the BRP frame.

An eDMG beam refinement element may be modified to permit feedback of a desired number of BS-FBCK and BS-FBCk Antenna ID fields.

An additional field may be provided to indicate a corresponding dimension.

Each of the at least one beam pair may feed back an independent element.

A single eDMG beam refinement element may be sent with multiple BS-FBCK, BS-FBCK Antenna ID, and dimension fields.

The eBRP procedure may be conducted jointly for at least a subset of the at least one beam pairs.

In another example, a method includes: conducting an enhanced beam refinement protocol (eBRP) between an initiator device and at least one responder device for at least two transmit-receive beam pairs, the at least two transmit-receive beam pairs each having at least one dimension. The eBRP may include receive training for each of the at least two beam pairs and enables iterative refinement of antenna weight vectors (AWVs) of all beams of both transmitter and receiver at the initiator device and the at least one responder device.

Another example is a system that includes a processor and a non-transitory storage medium storing instructions operative, when executed on the processor, to perform functions including conducting an enhanced beam refinement protocol (eBRP) between an initiator device and at least one responder device for at least one transmit-receive beam pair, the at least one transmit-receive beam pair having a plurality of dimensions.

Another example is a system that includes a processor and a non-transitory storage medium storing instructions operative, when executed on the processor, to perform functions including: conducting an enhanced beam refinement protocol (eBRP) between an initiator device and at least one responder device for at least two transmit-receive beam pairs, the at least two transmit-receive beam pairs each having at least one dimension.

Short BRP Frame

BRP MAC Packet Overhead

With the increase in the amount of data to be signaled in the BRP MAC packet due to an increase in the number of antennas and beams for the M-dimensional transmissions described above, a more efficient BRP packet is set forth herein to reduce the overhead. Embodiments set forth below relate to reducing the size of the BRP frame to increase the efficiency of the BRP procedure, in view of the multi-dimensionality described above.

Training Type Dependent BRP Minimum Duration Selection Procedure

In some embodiments, the minimum duration of data field of a BRP packet may be varied depending on the purpose of the BRP training. For example, multiple BRP Minimum Durations may be defined. When certain conditions have been met, a particular BRP Minimum Duration of the multiple available may be chosen.

In one example, two BRP Minimum Durations may be defined for different BRP frames. BRP Minimum Duration 1 (short duration) may be used for: BRP-TX packet; BRP-RX packet where the receiver training request may be sent in previous frame exchange; and/or BRP packet which may carry BRP MAC frame but no TRN field appended. BRP Minimum Duration 2 (long duration) may be used for BRP-RX packet where the receiver training request may be sent in MAC body of current frame.

Here, BRP-RX packet may refer to a packet with TRN-R training field appended which enable receiver antenna weight vector training. BRP-TX packet may refer to a packet with TRN-T training field appended which enable transmitter antenna weight vector training.

In another example, two BRP Minimum Durations may be defined for BRP-RX and BRP-TX packets respectively.

BRP Minimum Durations may be a set of values greater than or equal to 0. The shortest BRP Minimum Duration may be set to 0.

An exemplary transmitter procedure may be as given below.
1) The transmitter may acquire the media through contention or scheduling. It may prepare a BRP packet transmission
2) According to the type of the BRP training packet, or the usage of the BRP frame, or other criteria, the transmitter may choose a particular BRP Minimum Duration.
3) The transmitter may implicitly or explicitly signal the choice of the BRP Minimum Duration in PLCP Header and/or MAC Header and/or MAC frame body. In the case of implicit signaling, the signal may be the type of the BRP training packet, or the usage of the BRP frame or other type of criteria by which the transmitter and receiver may determine a particular BRP Minimum Duration.
4) The transmitter may prepare the PPDU for the BRP packet. If needed, the data field of the packet may be extended by extra zero padding to meet the BRP Minimum Duration requirement.

Figure 27:
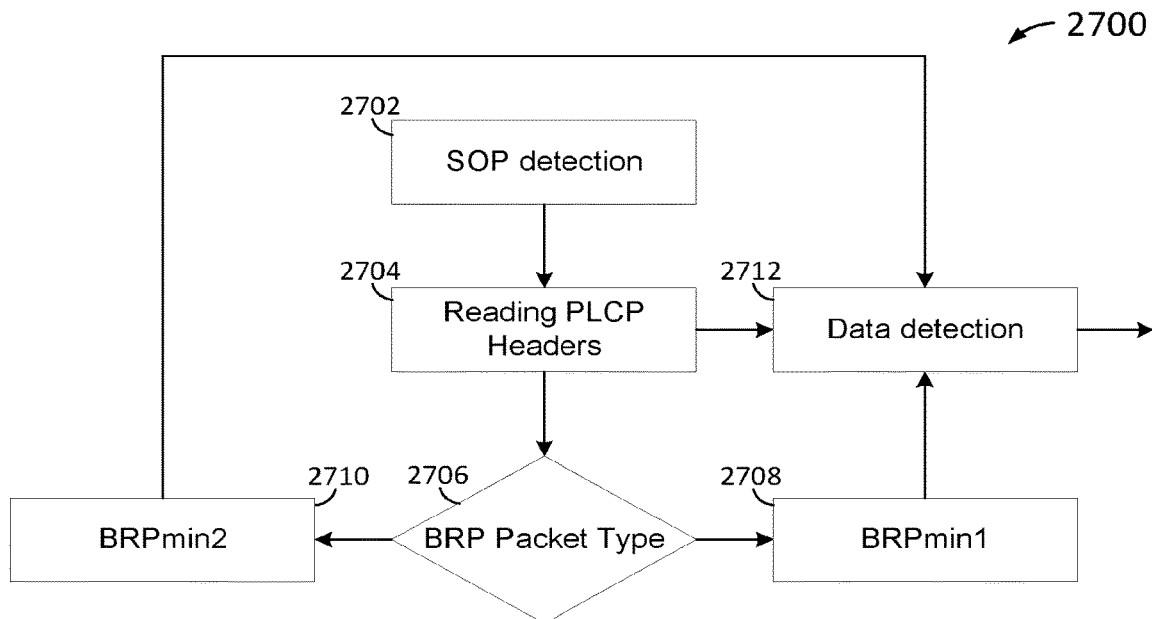
FIG. 27 illustrates an exemplary minimum duration determination procedure at the receiver side.

An exemplary receiver procedure may be as given below (also shown as method 2700 in FIG. 27):
1) At 2702, the receiver may detect a packet.
2) AT 2704, by reading the PLCP header and/or MAC header and/or MAC frame body, the receiver may notice this is a BRP packet.
3) At 2706, according to the explicit or implicit signaling, the receiver may determine a particular BRP Minimum Duration used for this packet.
4) At 2712, the receiver may perform data detection using the BRP Minimum Duration determined at 2706 (e.g., BRPmin1 at 2708 or BRPmin2 at 2710).

Generalized Training Type Dependent BRP Minimum Duration Selection Procedure

The above mentioned methods and procedures may be extended to a general case. In one such embodiment, a set of BRP Minimum Durations may be pre-defined or pre-determined. In one example, the set of BRP Minimum Durations may be discrete integer numbers between 0 and aBRPmin-Limit. For example, the aBRPminLimit may be set to a value 18 in unit of SC blocks or OFDM symbols. The set of BRP Minimum Duration may be defined as {6, 12, 18} in unit of SC blocks or OFDM symbols. Alternatively, the set of BRP Minimum Duration may have finer granularity, such as {0, 1, 2, . . . , 18}. STAs including PCP/AP STAs and non-PCP/AP STAs may negotiate the use of a BRP Minimum Duration. The STA capability of supporting a set or a subset of the pre-defined or pre-determined BRP Minimum Durations may be exchanged through Association Request/Response, Re-association Request/Response, Probe Request/Response, Beacon frames, or other type of management frames. The negotiation may be explicitly performed through packet exchanges between STAs.

Figure 33:
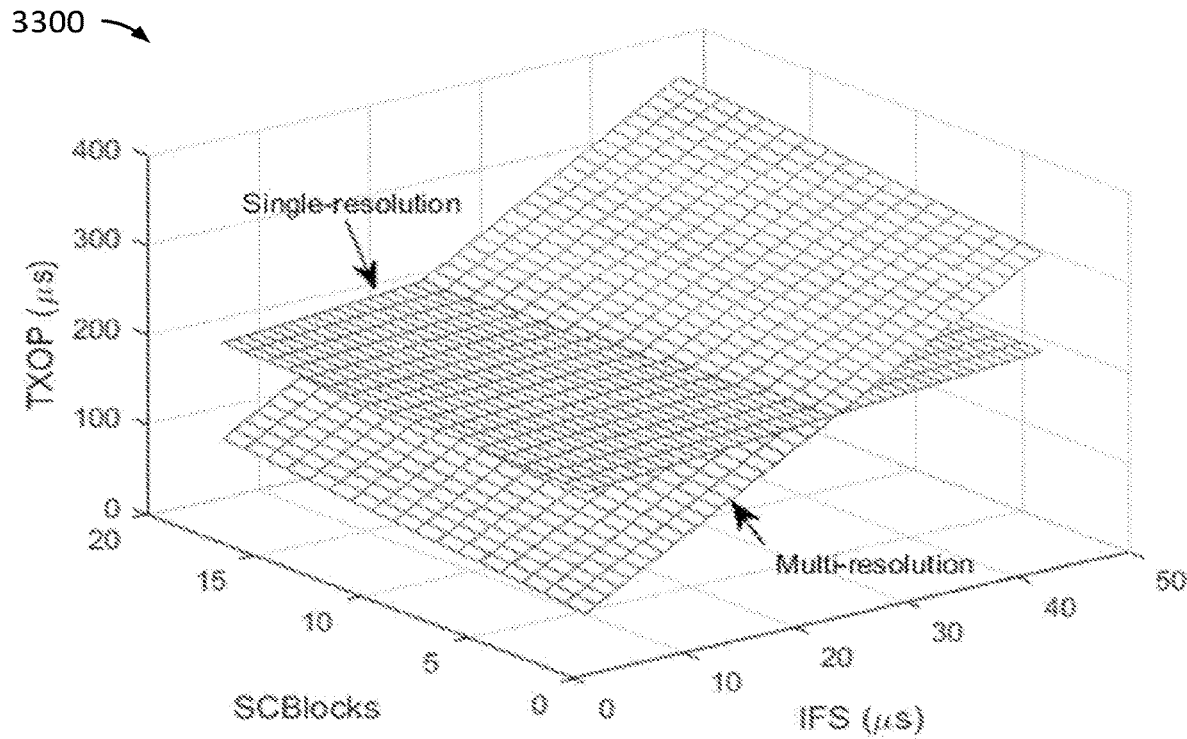
FIG. 33 is a graph illustrating the effect of SCblocks and IFS on the TxOP duration of a BRP procedure.

FIG. 33 is a graph 3300 illustrating the effect of SCblocks and IFS on the TxOP duration of a BRP procedure.

In one example, the duration negotiation may be initiated by a PCP/AP as follows. A PCP/AP may transmit a BRP Minimum Duration request frame, which may request a STA to report the preferred BRP Minimum Duration. The STA addressed by the BRP Minimum Duration request frame may then send a BRP Minimum Duration response/report frame, which may indicate the preferred BRP Minimum Duration used by the STA. Optionally, the PCP/AP may confirm the BRP Minimum Duration for the STA. After negotiation, the BRP Minimum Duration may be used by the PCP/AP and STA, until it is updated through another BRP Minimum Duration request/response frame exchange.

In a second example, the duration negotiation may be initiated by a non PCP/AP STA using a method such as the following. A non PCP/AP STA may transmit a BRP Minimum Duration request frame, which may ask a PCP/AP STA to select or adjust BRP Minimum Duration for the STA. In this frame, one or more BRP Minimum Durations supported by the STA may be included. Alternatively, a minimum number of supported BRP Minimum Durations may be included. The PCP/AP STA addressed by the BRP Minimum Duration request frame may then send a BRP Minimum Duration response/report frame, which may indicate a BRP Minimum Duration for the STA. After negotiation, the BRP Minimum Duration may be used by the PCP/AP and STA, until it is updated through another BRP Minimum Duration request/response frame exchange.

In a third example, a PCP/AP may acquire the BRP Minimum Duration for each associated STA through STA capability exchanges. Then the PCP/AP may determine the BRP Minimum Duration for each STA.

In an exemplary procedure for BRP Minimum Duration selection in DL MU-MIMO BRP training, a PCP/AP may use DL MU-MIMO like scheme to train two or more STAs concurrently using the entire bandwidth. In such an embodiment, the PCP/AP may check the BRP Minimum Durations for all the potential receive STAs, and use the maximum value among them to set as the BRP Minimum Duration for the DL MU-MIMO transmission.

In some embodiments, procedures are provided for MCS selection due to BRP Minimum Duration. Due to the BRP Minimum Duration requirement, a guaranteed number of resources may be required for the MAC body transmission. Thus, a MCS may be selected to fully use those resources.

Null Data Packet BRP Frame.

In 802.11, Null Data Packet (NDP) may refer to a PPDU which contains PLCP header but no MAC packet. The Signaling field in PLCP header may be overwritten to carry BRP information. In general, one reserved bit in the PLCP header, including legacy Header field and/or enhanced Header field, may indicate this is a NDP MAC frame, and the rest of bits in the field may be overwritten. A field in the overwritten DNP MAC frame may be used to indicate the MAC frame type. For example, it may indicate this may be a NDP BRP frame.

In one method, a unified NDP BRP frame may be defined to carry information for simplified BRP frame exchanges.

Figure 28:
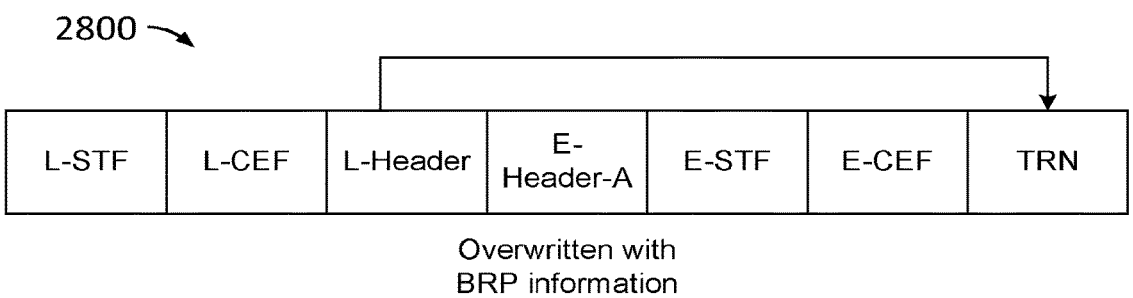
FIG. 28 illustrates a first embodiment of an exemplary NDP BRP frame format.

In another method, a set of NDP BRP frames may be defined for different purpose. In this way, each NDP BRP frame may need to carry limited information. For example, the NDP BRP frames may include but are not limited to the following:
NDP BRP receiver training request frame
NDP BRP receiver training response frame
NDP BRP MIMO training request frame
NDP BRP MIMO training response frame
NDP BRP Setup frame
NDP BRP MID frame
NDP BRP BC frame A NDP BRP frame 2800 may be defined as shown in FIG. 28. With this exemplary design, legacy fields, including L-STF, L-CEF and L-Header fields may be the same as defined in 802.11ad. Fields in L-Header may indicate the presence and length of TRN field. Enhanced Header A field may be overwritten to carry BRP information. Enhanced STF and CEF field may be optional. TRN field may be used for BRP training, which may support MIMO and multi-channel transmission.

Figure 29:
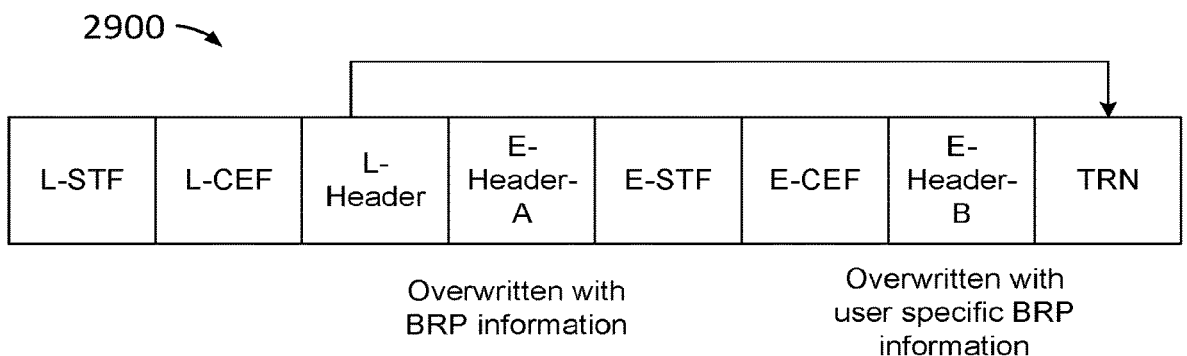
FIG. 29 illustrates a second embodiment of an exemplary NDP BRP frame format.

Another NDP BRP frame 2900 may be defined as shown in FIG. 29. With this exemplary design, multi-user BRP training may be performed. Legacy fields, including L-STF, L-CEF and L-Header may be the same as defined in 802.11ad. Fields in L-Header may indicate the presence and length of TRN field. Enhanced Header A field may be overwritten to carry common BRP information. Enhanced STF and CEF field may be used for MU AGC and channel estimation. Enhanced Header B field may be overwritten to carry user specific BRP information. TRN field may be used for BRP training, which may support MIMO and multi-channel transmission.

As further examples, a method may include acquiring media at a transmitter; preparing a BRP packet transmission from the transmitter; selecting, at the transmitter, a particular BRP minimum duration from a set of at least two BRP minimum durations; signaling the choice of the BRP minimum duration; preparing a PPDU for the BRP packet; and transmitting the prepared BRP packet transmission from the transmitter to at least one receiver.

The particular BRP minimum duration may be selected based at least in part on a type of a BRP training packet.

The particular BRP minimum duration may be selected based at least in part on a usage of the BRP frame.

The choice of the BRP minimum duration may be explicitly signaled in one of a PLCP header, a MAC header, or a MAC frame body.

The choice of the BRP minimum duration may be implicitly signaled based at least in part on one of a type of the BRP training packet or a usage of the BRP frame.

Detecting a packet transmission at a receiver; determining that the detected packet is a BRP packet; determining a particular BRP minimum duration, from a set of at least two BRP minimum durations, used for the detected BRP packet; and performing data detection at the receiver using the determined BRP minimum duration.

The determining that the detected packet is a BRP packet may include reading at least one of a PLCP header, a MAC header, or a MAC frame body.

The determining the particular BRP minimum duration may be based at least in part on implicit signaling.

The determining the particular BRP minimum duration may be based at least in part on explicit signaling.

As another example, a method may in utilizing null data packets to overwrite PLCP header information to carry BRP information.

A unified NDP BRP frame may be defined to carry information for simplified BRP frame exchanges.

A set of NDP BRP frames may be defined for different purposes.

The set of NDP BRP frames may include: an NDP BRP receiver training request frame; an NDP BRP receiver training response frame; an NDP BRP MIMO training request frame; an NDP BRP MIMO training response frame; an NDP BRP Setup frame; an NDP BRP MID frame; and an NDP BRP BC frame.

An enhanced header A field may be overwritten to carry common BRP information, and an enhanced header B field may be overwritten to carry user specific BRP information.

Another example is a system that includes a processor and a non-transitory storage medium storing instructions operative, when executed on the processor, to perform functions including: acquiring media at a transmitter; preparing a BRP packet transmission from the transmitter; selecting, at the transmitter, a particular BRP minimum duration from a set of at least two BRP minimum durations; signaling the choice of the BRP minimum duration; preparing a PPDU for the BRP packet; and transmitting the prepared BRP packet transmission from the transmitter to at least one receiver.

Another example is a system that includes a processor and a non-transitory storage medium storing instructions operative, when executed on the processor, to perform functions including: detecting a packet transmission at a receiver; determining that the detected packet is a BRP packet; determining a particular BRP minimum duration, from a set of at least two BRP minimum durations, used for the detected BRP packet; and performing data detection at the receiver using the determined BRP minimum duration.

Another example is a method that includes, at a STA: receiving a BRP minimum duration request from an AP; responding to the request by identifying a preferred BRP minimum duration; and conducting beam refinement with the AP using the identified BRP minimum duration.

Another example is a method that includes, at an AP: sending a BRP minimum duration request to a STA; receiving a response to the request identifying a preferred BRP minimum duration; and conducting beam refinement with the STA using the identified BRP minimum duration.

Another example is a method performed by a non-PCP/AP requesting STA, where the method includes: transmitting to a responding STA a BRP minimum duration request identifying at least one BRP minimum duration supported by the requesting STA; receiving from the responding STA a response indicating a BRP minimum duration; and conducting beam refinement with the using the identified BRP minimum duration.

Another example is a method performed by an AP, where the method includes: communicating with a plurality of STAs to obtain a respective BRP minimum duration for each of the STAs; selecting a maximum value among the obtained BRP minimum durations; and using the selected maximum value among them as the BRP minimum duration for DL MU-MIMO transmission to the STAs.

BRP InterFrame Spacing Negotiation

BRP IFS. For improved feedback in view of the multi-dimensionality described above, some embodiments make use of multiple BRP frame exchanges for optimized operation. Methods to improve the efficiency of the BRP operation and to enable the signaling of and/or reduction in the BRPIFS duration are set forth below.

In some embodiments, the maximum duration of the interframe spacing between BPR packets may be varied depending on the efficiency of the implementation. In some embodiments, the IFS spacing may be quantized to one of a set of possible IFS spacing lengths.

Signaling may be added to enable the transmitter and receiver negotiate the values used for the beam based interframe spacing parameters such as one or more of the following:

SBIFS: short Beamforming Interframe Spacing
BRPIFS: Beam Refinement Protocol Interframe Spacing
MBIFS: Medium Beamforming Interframe Spacing
LBIFS: Long Beamforming Interframe Spacing When certain conditions have been met, a particular IFS spacing may be chosen.

In one embodiment, the IFS is dynamically selected from any value (i.e. unquantized). In this case, the AP and STA may signal the actual IFS value to be used to the network to enable STAs identify the actual IFS value to use.

In an exemplary embodiment, the AP and STA may assign a specific IFS to a specific BRP scenario. The scenario may be a function of one of the following:

The type of feedback used, e.g. SNR only feedback vs SNR+relative channel estimates feedback.

The antenna architecture, e.g. the IFS used may be different in cases where the beam switch requires a switch between beams of the same DMG antenna vs. a switch between different DMG antennas. Note that the actual value may be negotiated and signaled during the DMG setup procedure e.g. L_rx=10, L_rx_dmg=1,2, etc.

If STA fails to feedback information within the requested timing, the AP may override the requested IFS time by bumping STA IFS up to next IFS duration in the case of quantized IFS space or by adding a predetermined value to IFS value for the system.

In this case, the AP may need to signal the change in IFS value.

In one embodiment, the IFS used may be set based on a reference scenario (or set of reference scenarios). In this case, the Tx/Rx pair switch to the reference scenario, measure the IFS and use the IFS in the BRP transmission procedure.

An example of a scenario may be based on the following:
A specific initiator/responder reference configuration e.g. the receive beams are set within a specific DMG antenna only.
The specific type of feedback e.g. SNR only feedback.
A time interval e.g. the time interval between reception of the BRP measurement frame and transmission of the response or the receive beams can be switched between each other within a specified number of microseconds.

Note that the AP and STA(s) may negotiate parameters for each reference scenario.

In an exemplary embodiment, an IFS negotiation procedure operates as follows. An AP sends an IFS measurement setup frame to one or more STAs. The AP may specify a specific configuration or scenario for the measurement. The AP may indicate that the measurement is for one or more specific STAs. Alternatively, the AP may assume that all STAs in PBSS will be measured. The AP sends out a channel measurement frame to the STA(s).

The STAs receive the measurement frame and estimate the duration of IFS needed for transmission. The STAs feed back the IFS measurements to the AP. In one embodiment, the AP solicits the information, e.g. the STA(s) may be polled by the AP for the information. In another embodiment, the STA(s) may pro-actively send the information to the AP e.g. by contending for the channel.

The AP starts a BRP procedure. The AP sends a BRP frame with the IFS value to be used in the BRP setup frame. This allows all other STAs in the network to know the IFS value to be used. STA processes information and feeds back information with the desired IFS between frames. In one embodiment, the STA may start sending information any time between SIFS and the IFS value set.

If the STA fails to reply with the IFS set, the AP may increase the IFS estimate for the desired scenario.

802.11ay BRP with SIFS Only.

The IFS may vary between SIFS and BRPIFS, as illustrated at 3002 in FIG. 30A. With the possibility of the interframe spacing being set to BRPIFS=44 usec, STAs that are in sleep mode or that miss the TxOP reservation frame may assume that the channel is unoccupied and may interrupt the TxOP. To address this issue, the interframe spacing for the BRP may be set to SIFS. However, feedback that needs additional processing time that is greater than a SIFS may benefit from an efficient way to access the network. To enable this one of the following methods may be used.

Figure 30B:
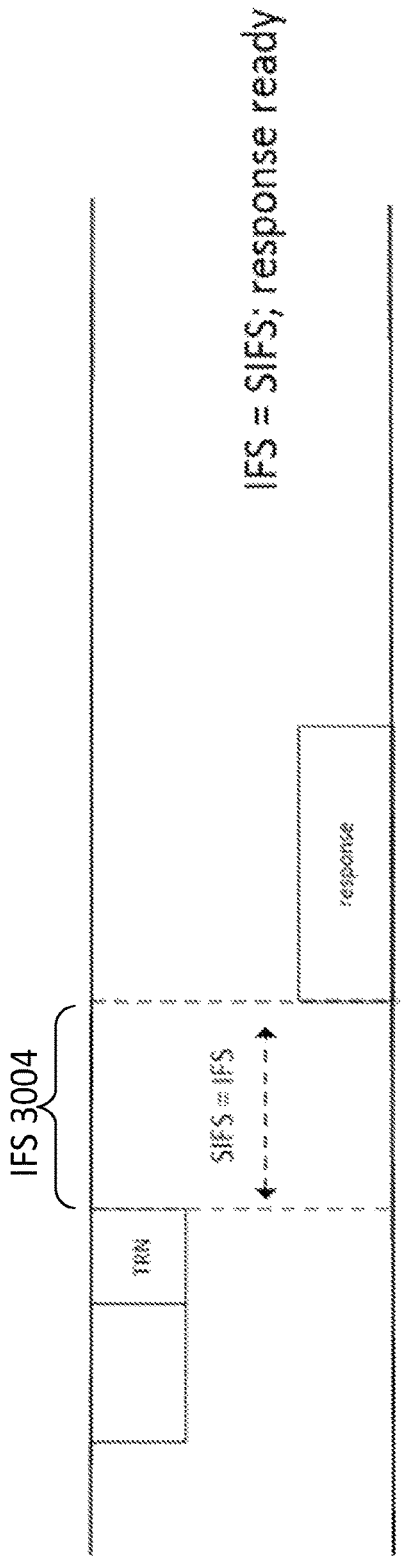
FIGS. 30B-30C illustrate embodiments in which a response is available and is transmitted with IFS equal to SIFS.
Figure 30C:
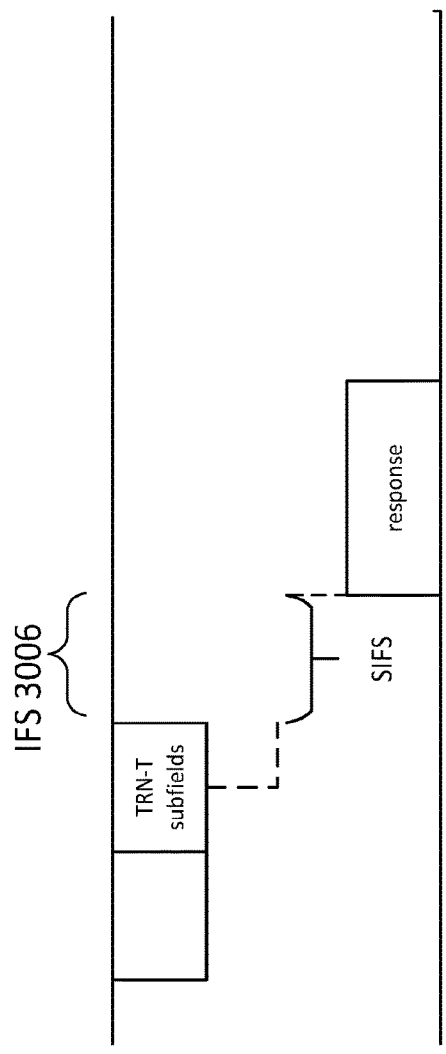

If the response is available within SIFS of the reception BRP measurement frame, the response may be transmitted. Such an embodiment is illustrated in FIGS. 30B (IFS 3004) and 30C (IFS 3006).

If the response is not available within SIFS of the reception of the BRP measurement frame, one or more of the following methods may be employed.

Figure 31A:
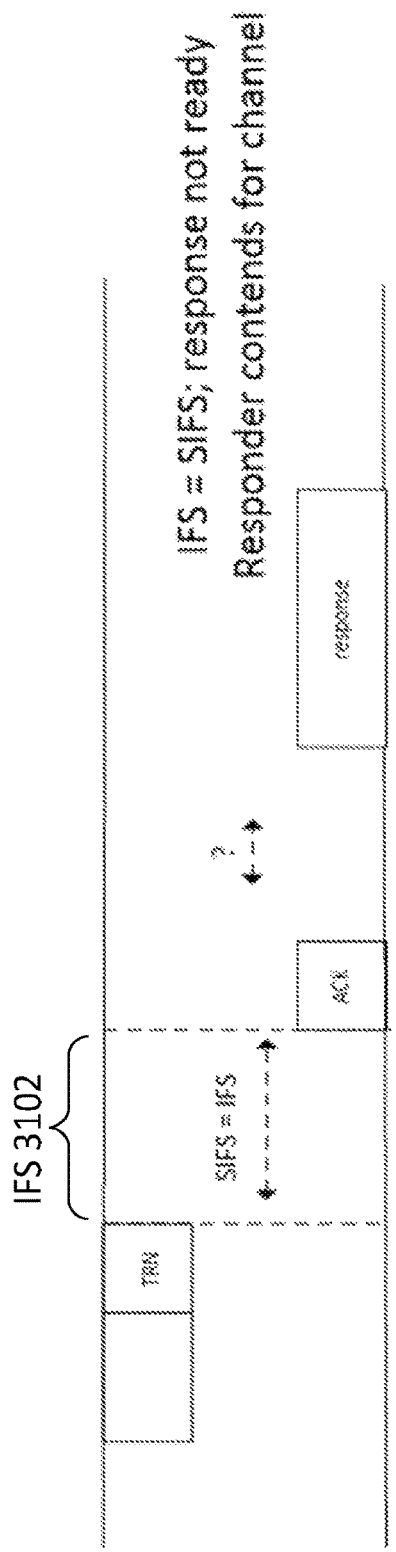
FIGS. 31A-31B illustrate embodiments in which a response is not ready for transmission at the SIFS and the responder contends for the channel.
Figure 31B:
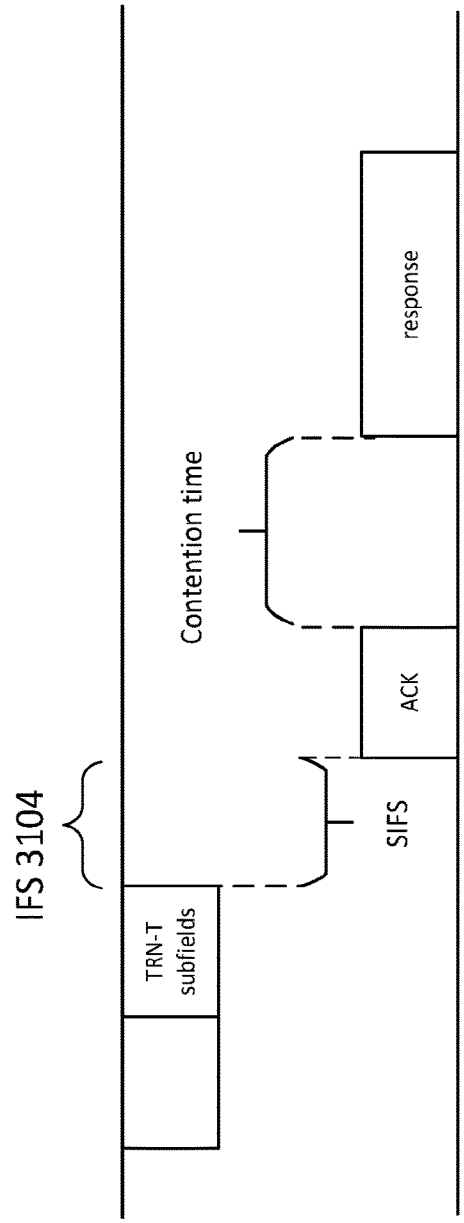

In one method, an ACK may be transmitted by the responder, and it is the responder's responsibility to access the channel to feed back the required information. This may be done by (a) contending for the channel, (b) sending a traffic available frame to the initiator to request for channel access or (c) waiting for the initiator to poll it for feedback. This method is illustrated in FIGS. 31A and 31B, which illustrate IFS 3102 and 3104, respectively.

Figure 31C:
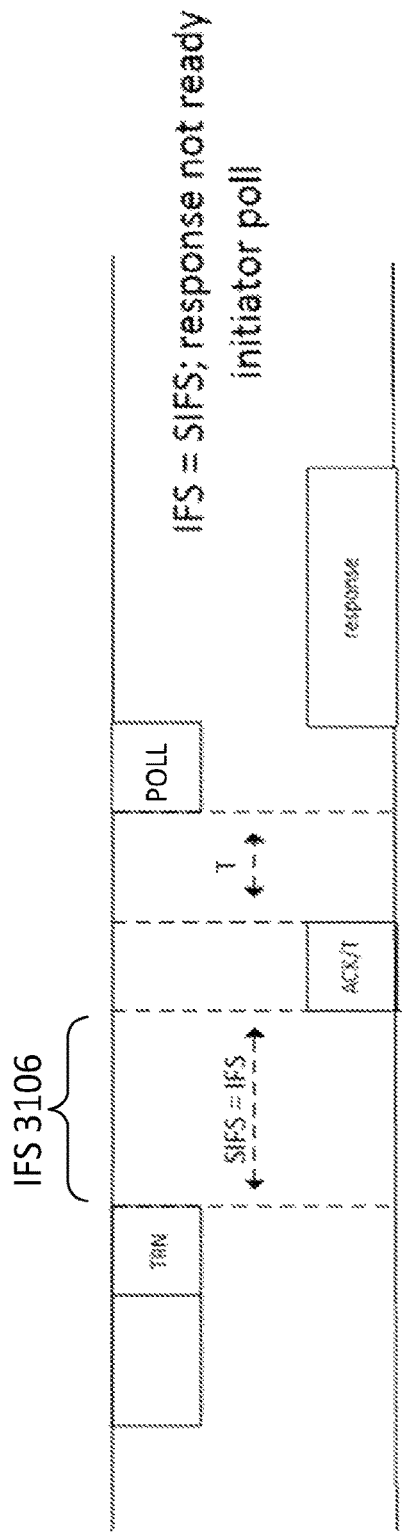
FIGS. 31C-31D illustrate embodiments in which a response is not ready for transmission at the SIFS and the initiator polls for the response.
Figure 31D:
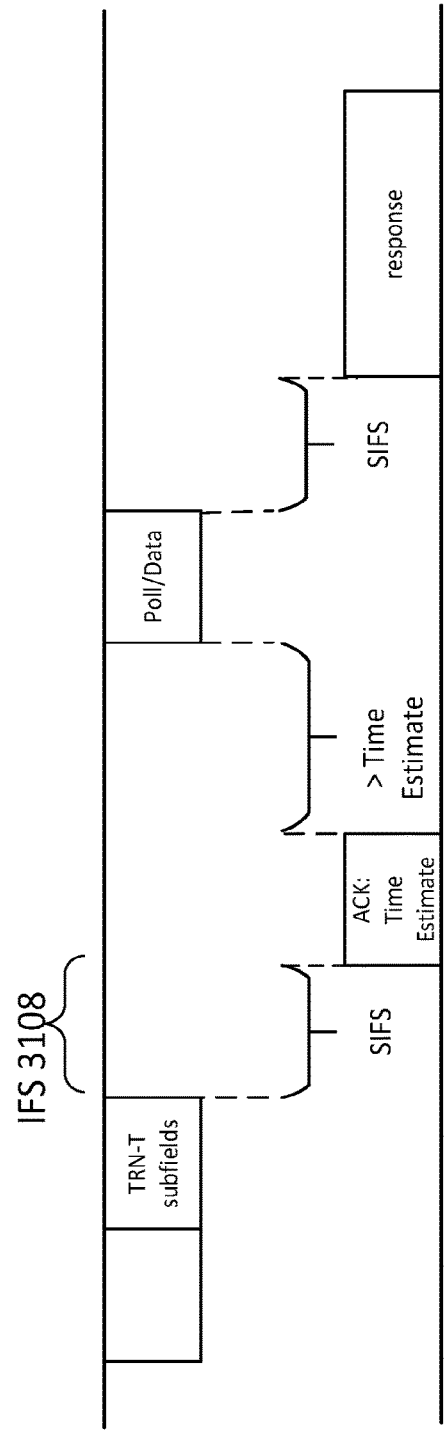

In another method, an ACK may be transmitted by the responder with the minimum time needed for access. The initiator may request the information (e.g. by polling) at a time interval greater than the time indicated in the ACK. Note that this may be an absolute time interval or may be a value indicating a quantized time interval. This method is illustrated in FIGS. 31C and 31D, which illustrate IFS 3106 and 3108, respectively.

Figure 31E:
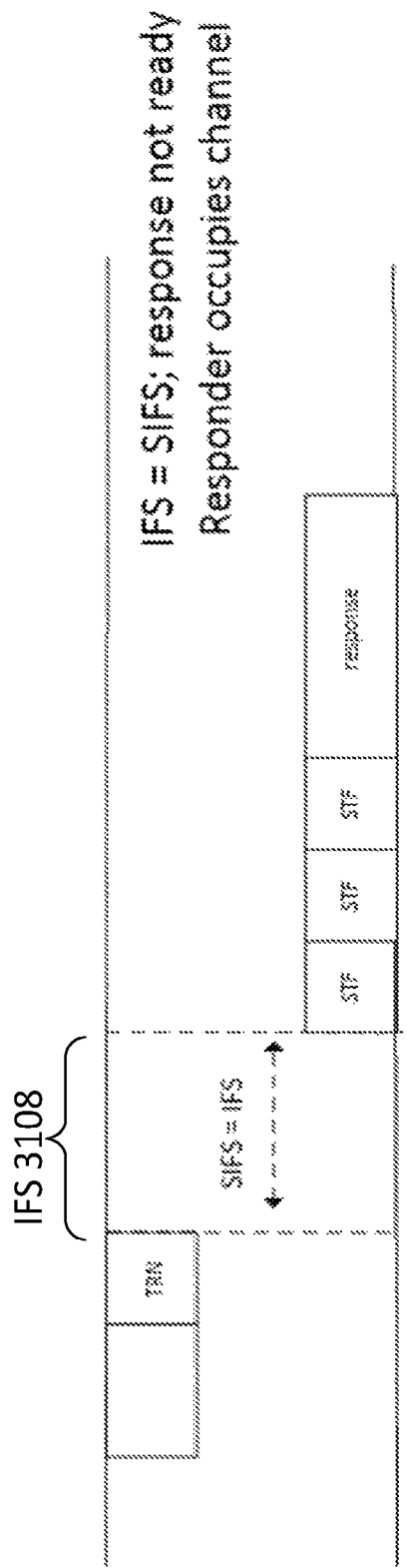
FIG. 31E illustrates an embodiment in which a response is not ready for transmission at the SIFS and the responder occupies the channel until the response is sent.

In a further method, the responder may transmit dummy information in the interval before information is ready to be transmitted. In one example, the responder may transmit repeated STF and/or LTF sequences for the duration of the wait interval. This method is illustrated in FIG. 31E, which illustrates IFS 3110.

Minimum Duration and IFS Negotiation.

Minimum Duration (aBRPminSCblocks) Negotiation

In an exemplary embodiment, an 11ay BRP protocol allows negotiation of the value of aBRPminSCblocks<=18. Minimum duration negotiation calls for selection and signaling of the aBRPminSCblocks values. In an embodiment, the PCP/AP and STA may select the minimum duration values from a set of the duration values, e.g. as follows:

aBRPminSCblocks={6 12 18}, {1, 2, . . . , 18}

Signaling used for negotiation may be based on the capability of the AP/PCP and the STA. In some embodiments, this may be communicated in a capability exchange procedure, e.g. in a transmission using Association Request/Response, Re-association Request/Response, Probe Request/Response, Beacon frames, or other type of management frame. In some embodiments, this may be communicated as a capability during the BRP setup procedure IFS Optimization.

IFS has a significant effect on the efficiency of BRP feedback. As such, it is beneficial to optimize IFS to improve efficiency of BRP. Various embodiments may use different techniques to optimize the IFS for the BRP. In some embodiments, the values of the IFS are negotiated. In other embodiments, the IFS is restricted to the SIFS only.

IFS Negotiation.

In embodiments using IFS negotiation, the IFS may be selected as one of a discrete set values. In such embodiments, the IFS may be selected from a set of pre-determined values. In some embodiments, the PCP/AP and STA may negotiate a set of discrete resolutions such that SIFS<=IFS<=BRPIFS.

In an exemplary embodiment, a negotiation procedure may proceed as follows. The BRPIFS may be communicated in a capability exchange, e.g. a transmission using Association Request/Response, Re-association Request/Response, Probe Request/Response, Beacon frames, or other type of management frame. BRPIFS may be negotiated as part of the BRP setup negotiation, at which time the antenna configuration is expected to have been communicated. If the negotiated value fails, the responder may respond by transmitting one or more PPDUs to the requesting STA e.g. an ACK. The initiator may increment the IFS value for subsequent refinements. The initiator may announce the IFS value to allow other STAs to know the IFS value for channel access.

Restrict the IFS to SIFS Only.

In an exemplary embodiment, the responder transmits a response to the initiator after a SIFS duration on reception of the BRP measurement frame. If the response is available, the STA sends the response at a SIFS duration after the frame is received. If the response is not available, different options are available. In a first option, the responder may respond by transmitting one or more PPDUs to the requesting STA (e.g. ACK) at a SIFS duration after the frame is received. An STA may contend for the channel at a later time and/or the AP may poll the STA at a later time. In a second option, the STA may transmit dummy information until information is ready e.g L-STF.

As further examples, a method may include varying a maximum duration of an interframe spacing between a plurality of BPR packets.

The method may further include signaling from a transmitter to a receiver to enable negotiation of values used for beam-based interframe spacing parameters.

The parameters may include: short Beamforming Interframe Spacing; Beam Refinement Protocol Interframe Spacing; Medium Beamforming Interframe Spacing; and Long Beamforming Interframe Spacing.

A particular interframe spacing may be chosen based on particular conditions.

In an embodiment, a performed by an AP may include communicating with a plurality of STAs to obtain a respective BRP minimum duration for each of the STAs; selecting a maximum value among the obtained BRP minimum durations; and using the selected maximum value among them as the BRP minimum duration for DL MU-MIMO transmission to the STAs.

In an embodiment, a method of IFS negotiation may include, at an AP: sending an IFS measurement frame to at least one STA; sending a channel measurement frame to the at least one STA; receiving, from the at least one STA, a respective estimated IFS duration; and performing a BRP procedure using the received estimated IFS duration.

The AP may poll the at least one STA for the respective estimated IFS duration.

The BRP procedure may include sending a BRP setup frame identifying the IFS value to be used.

In an embodiment, a method includes negotiating an interframe spacing (IFS) between a PCP/AP and a STA. The IFS may be selected from a predetermined set of values.

Another example is a method of IFS negotiation that includes, at an AP: sending an IFS measurement frame to at least one STA; sending a channel measurement frame to the at least one STA; receiving, from the at least one STA, a respective estimated IFS duration; and performing a BRP procedure using the received estimated IFS duration. The AP may poll the at least one STA for the respective estimated IFS duration. Performing the BRP procedure may include sending a BRP setup frame identifying the IFS value to be used.

Detailed Procedures with Fixed IFS.

To restrict the IFS to SIFS only, in the 11ay BRP protocol there shall be an option in some embodiments for the BRP frame to function as an action ACK frame.

Capability Exchange

In some embodiments, the capability of the STA may be signaled by in the Beamforming capability field format as shown below. The Beamforming Capability field may be implemented as show below:

TABLE 1

| Beamforming Capability Field | | | | | | | | |
|---|---|---|---|---|---|---|---|---|
| B0 B4 | B5 | B6 | B7 | B8 | B9 | B10 | B11 | B12 B15 |
| Requested BRP SC Blocks | MU-MIMO Supported | SU-MIMO Supported | Grant Required | NoRSS Supported | BRP Action ACK supported | ACK with contention supported | ACK with polling supported | Reserved |
| 5 | 1 | 1 | 1 | 1 | 1 | 1 | 1 | 5 |

The BRP Action ACK Supported field is set to one to indicate that the BRP request frame shall be responded to within a SIFS duration of reception. If the information is ready the STA shall respond with the information required. If the information is not ready, the STA shall respond with an ACK.

The ACK with contention Supported field is set to one if the STA may contend for the channel when the information is ready to be fed back to the requester and set to zero otherwise.

The ACK with polling Supported field is set to one if the STA may be polled before feeding back the information to the requester and set to zero otherwise.

Note that the initiator may set the parameter to contend only, poll only or both.

These fields may be placed in separate capability fields or added to different frames such as the EDMG BRP Request field.

In another embodiment, the Beamforming capability field may be defined according to the following Beamforming Capability field format.

| B0 B4 | B5 | B6 | B7 | B8 | B10 B11 | B12 B15 |
|---|---|---|---|---|---|---|
| Requested BRP SC Blocks | MU-MIMO Supported | SU-MIMO Supported | Grant Required | NoRSS Supported | BRP Action ACK response | Reserved |
| 5 | 1 | 1 | 1 | 1 | 2 | 5 |

The BRP Action ACK response subfield indicates if the responding STA should contend to feed back the information or the requesting STA should poll the responding STA for the BRP information.

| Action ACK response | B10 | B11 |
|---|---|---|
| Reserved | 0 | 0 |
| Contention only | 0 | 1 |
| Polling only | 1 | 0 |
| Contention or Polling | 1 | 1 |

Signaling Immediate Response Request: Method 1

In one method, the existing DMG action no ACK BRP frame may be modified to signal the need for an immediate acknowledgement in the BRP setup frame indicating that an ACK response is needed at a SIFS duration after the packet is received. The current 802.11 standard has a category of Unprotected DMG frame with Type value 00 (management frame), and Subtype value 1110 (Action No ACK). The existing BRP frame is defined under the Unprotected DMG frame as an Action No Ack frame. The detailed frame format of the BRP frame is given below:

| Order | Information |
|---|---|
| 1 | Category |
| 2 | DMG Action |
| 3 | Dialog Token |
| 4 | BRP Request Field |
| 5 | DMG Beam Refinement Element |
| 6 | Zero or more Channel Measurement Feedback |
| 7 | EDMG BRP Request element (optional) |
| 8 | Zero or more EDMG Channel Measurement Feedback Elements |
| 9 | EDMG BRP Request Field |

In exemplary embodiments, various different schemes may be used to signal the immediate acknowledgement required in current BRP frame, including the following techniques.
1. Modifying the BRP Request Field (described below in the section "Modified DMG BRP Request field")
2. Modifying the EDMG BRP Request element (described below in the section "Modified EDMG BRP Request element")
3. Adding an EDMG BRP Request Field (described below in the section "EDMG BRP Request field")

Signaling Immediate Response Request: Method 2

In one method, an EDMG BRP frame is introduced and may be defined as a DMG action frame, which may be used to indicate an acknowledgement is needed.

A new EDMG BRP frame may be introduced with Type value 00 (management frame), and Subtype value 1101 (Action frame) under the category DMG frame. In order to do so, one entry may be inserted to DMG Action field. For example, DMG Action field value=23 may be used to indicate that the frame is an EDMG BRP frame.

| DMG Action Field | |
|---|---|
| DMG Action field Value: | Meaning: |
| 23 | EDMG BRP Frame |

The detailed EDMG BRP frame format may be as disclosed below:

| EDMG Action ACK BRP Frame | |
|---|---|
| Order | Information |
| 1 | Category |
| 2 | DMG Action |
| 3 | Dialog Token |
| 4 | BRP Request Field |
| 5 | DMG Beam Refinement Element |
| 6 | Zero or more Channel Measurement Feedback |
| 7 | EDMG BRP Request element (optional) |
| 8 | Zero or more EDMG Channel Measurement Feedback Elements |
| 9 | EDMG BRP Request Field |

In an exemplary embodiment, the Category field is defined as DMG. The DMG Action field is defined as EDMG BRP frame. The Dialog Token field is set to a value chosen by the STA sending the frame to uniquely identify the transaction. The BRP Request field may be defined as existing in standard. Alternatively, this field may be updated, as described in the section "Modified DMG BRP Request field." The DMG Beam Refinement element is defined in 9.4.2.130 of 802.11-2016. The Channel Measurement Feedback element is defined in 9.4.2.136.

The BRP frame contains more than one Channel Measurement Feedback element if the measurement information exceeds 255 octets. The content of each Channel Measurement Feedback element that follows the first one in a single BRP frame is a continuation of the content in the previous element. The Channel Measurement, Tap Delay, and Sector ID Order subfields can be split between several elements. Each Channel Measurement Feedback element that is not the last Channel Measurement Feedback element in the frame is 257 octets long. Channel measurement information for a single channel measurement is always contained within a single BRP frame.

It may be noted that the length of a BRP frame can limit the choice of channel measurement parameters such as the number of measurements and the number of taps.

EDMG BRP Request element may be defined as it is. Alternatively, this field may be modified as described in the section "Modified EDMG BRP Request element." In some embodiments, the EDMG BRP Request Field may be a newly inserted field, as described in the section "EDMG BRP Request field."

Signaling Immediate Response Request: Method 3

In one exemplary method, the existing DMG action no ACK BRP frame may be modified to signal the need for an immediate acknowledgement in the BRP setup frame indicating that an ACK response is needed at a SIFS duration after the packet is received. The current 802.11 standard has a category of Unprotected DMG frame with Type value 00 (management frame), and Subtype value 1110 (Action No ACK). The existing BRP frame is defined under the Unprotected DMG category as an Action No Ack frame. The BRP frame in this case is an Action or Action no ACK frame of category Unprotected DMG. In some embodiments, the existing BRP frame setting is modified from Subtype value=1110 (Action No ACK) to Subtype value=1101 (Action), and the rest of the parameter settings are kept to create a new EDMG Action ACK frame.

When performing BRP, if the BRP frame is a Management frame of subtype Action and if a responding STA requires longer than SIFS to transmit a BRP frame as a response for beam refinement training request from a requesting STA, the STA transmits an ACK frame or an EDMG BRP ACK frame in response to the beam refinement training request.

To send the BRP response to the requesting STA:

The requesting STA may send a feedback poll to request for the response.

The responding STA may contend for the medium and send back the response.

The requesting STA may allocate time for the feedback through a reverse direction grant, provided the reverse direction protocol is supported by both the requesting and responding STAs.

The BRP response method maybe selected during the BRP setup phase. The STA may indicate the additional time needed in the EDMG BRP ACK.

The BRP setup subphase may start with the initiator sending a BRP packet with the Capability Request subfield in the DMG Refinement field set to 1 and with the remaining subfields within the BRP Request field/EDMG Request field set according to the initiator's desired response method. Upon receiving a BRP packet with the Capability Request subfield set to 1, the responder shall respond with a BRP packet with the subfields within the BRP Request field set to indicate the desired BRP response method. This process is repeated until the responder transmits to the initiator a BRP packet with the Capability Request subfield set to 0 and the initiator sends as a response a BRP packet with the Capability Request subfield also set to 0.

A detailed frame format of an exemplary BRP frame is given below:

| Order | Information |
| --- | --- |
| 1 | Category |
| 2 | DMG Action |
| 3 | Dialog Token |
| 4 | BRP Request Field |
| 5 | DMG Beam Refinement Element |
| 6 | Zero or more Channel Measurement Feedback |
| 7 | EDMG BRP Request element (optional) |
| 8 | Zero or more EDMG Channel Measurement Feedback Elements |
| 9 | EDMG BRP Request Field |

In an exemplary method, different techniques may be used to signal the immediate acknowledgement required in current BRP frame, including the following:

1. Modifying BRP Request Field (as described in the section "Modified DMG BRP Request field")
2. Modifying EDMG BRP Request element (as described in the section "Modified EDMG BRP Request element")
3. Add EDMG BRP Request Field (as described in the section "EDMG BRP Request field")

Modified EDMG BRP Request Element

In some embodiments, in both the Action and no Action BRP frame, the EDMG BRP request element may be updated as follows:

| B0 B7 | B8 B15 | B16 B23 | B24 B31 | B32 B39 | B40 B50 | B51 B52 | B53 B56 | B57 B58 | B59 | B60 B61 | B62 | B63 |
| --- | --- | --- | --- | --- | --- | --- | --- | --- | --- | --- | --- | --- |
| Element ID | Length | Element ID Extension | IL-RX | L-TX-RX | TX Sector ID | EDMG TRN-Unit P | EDMG TRN-Unit M | EDMG TRN-Unit N | Action ACK | Action ACK response | BF Poll | Reserved |

The Action ACK subfield indicates if an acknowledgement is required a SIFS duration after the transmission of the request. When this field is set to 0, a response is not required a SIFS duration after the reception of the request. Instead, a response is required within a BRPIFS duration after the reception of the request. When the field is set to 1, a response is required a SIFS duration after the reception of the request.

In the case that the response is ready, the response serves as an acknowledgement. In the case that the response is not ready, an ACK may be sent as a response. Alternatively, this field may not present. Note that this field is best suited for method 1 that uses a single DMG action No ACK frame to signal the need for an ACK or not. For method 2 and 3 that define specific Action ACK frames, this field may be optional.

The Action ACK response subfield may be used to indicate if the responder should contend to feed back the information or the responder should be polled.

| Action ACK response | B60 B61 |
| --- | --- |
| Reserved | 0 0 |
| Contend for channel only | 0 1 |
| Polling only | 1 0 |
| Contend and Poll | 1 1 |

The BF Poll field indicates that there are no additional TRN fields sent but that this is a request for feedback for a previously transmitted BRP request with exactly the same parameters. In another embodiment, the TX Sector ID may be used as an identifier in the feedback to indicate the specific BRP transmission the feedback is for (for example, in contention based transmission).

Given that a reasonable estimate of the time duration required before the feedback is ready depends on the information requested and the EDMG antenna configuration, a timing estimate may be sent back with the acknowledgement frame. In one method, the ACK may include a control trailer to indicate the length of time needed before the information is ready. In this case, for the transmitted ACK frame, the TXVECTOR parameter CONTROL_TRAILER shall be set to Present and the parameter CT_TYPE shall be set to ACK. The control trailer in this case may be a single data octet. Alternatively, an EDMG BRP ACK may be sent that includes the time needed.

EDMG BRP Request Field

Alternatively, in some embodiments, an EDMG BRP Request field may be defined to carry acknowledgement related information. In both the Action and no Action BRP frame, the EDMG BRP Request field may be updated as follows:

| B0 | B1 B2 | B3 | B4 B7 |
|---|---|---|---|
| Action ACK 1 | Action ACK response 2 | BF Poll 1 | Reserved 4 |

The Action ACK subfield indicates if an acknowledgement is required a SIFS duration after the reception of the request. When this field is set to 0, a response is not required a SIFS duration after the reception of the request. Instead, a response is required within a BRPIFS duration after the reception of the request. When the field is set to 1, a response is required a SIFS duration after the reception of the request. In the case that the response is ready, the response serves as an acknowledgement. In the case that the response is not ready, an ACK may be sent as a response. Alternatively, this field may not present.

The Action ACK response subfield indicates if the responder should contend to feed back the information or the responder should be polled.

| Action ACK response | B60 B61 |
|---|---|
| Reserved | 0 0 |
| Contend for channel only | 0 1 |
| Polling only | 1 0 |
| Contend and Poll | 1 1 |

The BF Poll field indicates that there is no additional TRN fields sent but that this is a request for feedback for a previously transmitted BRP request with exactly the same parameters. In another embodiment, the TX Sector ID may be used as an identifier in the feedback to indicate the specific BRP transmission the feedback is for (for example, in contention based transmission).

Modified DMG BRP Request Field

Alternatively, the existing DMG BRP Request field may be modified to carry acknowledgement related information.

| B0 | | | | | | | B11 | B17 | B25 | | | B29 | |
| B4 | B5 | B6 | B7 | B8 | B9 | B10 | B16 | B24 | B26 | B27 | B28 | B30 | B31 |
|---|---|---|---|---|---|---|---|---|---|---|---|---|---|
| L-RX | TX-TRN-REQ | MID-REQ | BC-REQ | MID-Grant | BC-Grant | Chan-FDCK-CAP | TX Sector ID | Other_AID | TX antenna ID | Additional Feedback Requested | Action ACK | Action ACK response | BF Poll |

The Action ACK subfield indicates if an acknowledgement is required a SIFS duration after the reception of the request. When this field is set to 0, a response is not required a SIFS duration after the reception of the request. Instead, a response is required within a BRPIFS duration after the reception of the request. When the field is set to 1, a response is required a SIFS duration after the reception of the request. In the case that the response is ready, the response serves as an acknowledgement. In the case that the response is not ready, an ACK may be sent as a response. Alternatively, this field may not present.

The Action ACK response subfield indicates if the responder should contend to feed back the information or the responder should be polled.

| Action ACK response | B60 B61 |
|---|---|
| Reserved | 0 0 |
| Contend for channel only | 0 1 |
| Polling only | 1 0 |
| Contend and Poll | 1 1 |

The BF Poll field indicates that there is no additional TRN fields sent but that this is a request for feedback for a previously transmitted BRP request with exactly the same parameters. In another embodiment, the TX Sector ID may be used as an identifier in the feedback to indicate the specific BRP transmission the feedback is for (for example, in contention based transmission).

In one embodiment, the requesting and responding STAs may decide on a default method of feedback e.g. Contention or polling. The Action ACK response may then be a single bit indicating if the non-default method is supported. This may be signaled in the Modified EDMG BRP Request element, the EDMG BRP request field or the beamforming capability field.

| Action ACK response | B60 |
|---|---|
| Non-default method NOT supported | 0 |
| Non-default method supported | 1 |

EDMG BRP ACK Frame Format

A normal ACK frame may be used when the BRP response may not be ready in a SIFS duration after the reception of the BRP frame.

Alternatively, a newly defined EDMG BRP ACK frame may be used to carry additional information, such as estimated time to prepare the required BRP feedback. The EDMG BRP ACK frame may be defined below:

TABLE 2

| | | | | |
|---|---|---|---|---|
| EDMG BRP ACK | | | | |
| Octets: 2 | 2 | 6 | 1 | 4 |
| Frame Control | Duration | RA | Time Estimate | FCS |

In a third method, a normal ACK frame may be carried in a control mode PPDU where a control trailer may be appended as shown below:

TABLE 3

| | | | | |
|---|---|---|---|---|
| ACK for BRP with Control Trailer | | | | |
| Octets: 2 | 2 | 6 | 4 | 1 (Trailer) |
| Frame Control | Duration | RA | FCS | Timing Estimate |

The Duration field is set as defined in 9.2.5 of 802.11-2016.

The RA is set to the recipient STA that requested the BRP transmission. The Time estimate is the minimum time duration that the recipient STA shall delay before:
- The requesting STA may poll for the BRP response
- The requesting STA may set up a reverse direction protocol link
- The requesting STA may set a CBAP to allow the transmitter to contend for the channel The Time estimate may indicate the number of SIFS that the recipient STA should wait. Note that as the upper bound may be set as the legacy BRPIFS value (44 usecs) or approximately 15 SIFS durations (of 3 usecs each) or may be set to an arbitrary value. In one solution, the time duration may be set to 2*SIFS (6 usec)<interval<15*SIFS (45 usec) and the specific value signaled with 4-bits as shown in the figure below. Note that 15*SIFS entry defaults to a wait time of BRPIFS as in DMG behavior.

TABLE 4

| | |
|---|---|
| ACK Delay | |
| Representation | Duration |
| 0000 | Reserved |
| 0001 | 2*SIFS |
| 0010 | 3*SIFS |
| 0011 | 4*SIFS |
| 0100 | 5*SIFS |
| 0101 | 6*SIFS |
| 0110 | 7*SIFS |
| 0111 | 8*SIFS |
| 1000 | 9*SIFS |
| 1001 | 10*SIFS |
| 1010 | 11*SIFS |
| 1011 | 12*SIFS |
| 1100 | 13*SIFS |
| 1101 | 14*SIFS |
| 1110 | 15*SIFS = BRPIFS |
| 1111 | Reserved |

In one exemplary embodiment, the entire 8 bits may be used to quantize the 44 usec interval. Alternatively, the duration may be represented in usecs as in the duration field (e.g. 256 usecs).

In order to define an EDMG BRP ACK frame, a control frame extension value may be set to indicate the newly defined frame. For example, in the proposed EDMG BRP ACK frame, Type value in Frame Control field may be set to 01 to indicate a control frame. Subtype value in Frame Control field may be set to 0110 to indicate control frame extension. With a Control Frame Extension subtype, bit 8 to bit 11 may be set to certain value to indicate the EDMG BRP ACK frame. For example, the following setting may be utilized:

| Type value B3 B2 | Subtype value B7 B6 B5 B4 | Control Frame Extension value B11 B10 B9 B8 | Description |
|---|---|---|---|
| 01 | 0110 | 1011 | EDMG BRP ACK |

Procedures and Signaling for Polling Based BRP Feedback

In the case an ACK frame may be transmitted a SIFS duration after the reception of the BRP request frame, the BRP feedback frame which may carry the information requested by the previous BRP request frame may be transmitted through a polling based procedure. In this procedure, a frame may be used to poll the BRP feedback frame.

For polling based feedback, the following techniques may be used.

In some embodiments for polling based feedback, BF poll is used. To enable this, a unique BF identifier may be generated from the fields of the BF request. The BF poll and BF feedback response may use this unique identifier to identify the specific feedback. The identifier may be placed in the BRP Feedback

| Order | Information |
|---|---|
| 1 | Category |
| 2 | DMG Action |
| 3 | Dialog Token |
| 4 | BRP Feedback Poll Request |

| Order | Information |
|---|---|
| 1 | Category |
| 2 | DMG Action |
| 3 | Dialog Token |
| 4 | BRP Feedback Poll Response |
| 5 | Zero or more Channel Measurement Feedback |
| 6 | Zero or more EDMG Channel Measurement Feedback Elements |

In other embodiments, for polling based feedback, an updated BR request frame may be used with a parameter added to indicate that the request is for a previously sent BRP request as discussed above. The BF poll response may use a unique identifier. Alternatively, the EDMG BRP request may be transmitted with the response. In this case, all or some of the fields of the BRP frames are transmitted. The scenario is which a subset of the frames are transmitted is illustrated below.

| Order | Information |
|---|---|
| 1 | Category |
| 2 | DMG Action |
| 3 | Dialog Token |
| 5 | DMG Beam Refinement Element |
| 7 | EDMG BRP Request element (optional) |
| 8 | Zero or more EDMG Channel Measurement Feedback Elements |

For contention based feedback, the PCP/AP may set up a general CBAP during the DTI for feedback. Alternatively, the PCP/AP may set up a dedicated CBAP for feedback during the DTI that is restricted to the STAs that have sent an ACK. The PCP/AP may transmit the addresses of the STAs that may be allowed to contend during this period.

Procedures and Signaling for BRP Feedback without Polling

In the case an ACK frame may be transmitted a SIFS duration after the reception of the BRP request frame, the BRP feedback frame which may carry the information requested by the previous BRP request frame may be transmitted through a BRP feedback procedure without polling.

The BRP initiator may transmit a BRP frame requesting a BRP training. In the BRP frame, the initiator may indicate a response a SIFS duration after the reception of the BRP frame may be requested.

On reception of the BRP frame, the responder may not have enough time to prepare the requested BRP response frame.

The responder may transmit an ACK frame a SIFS duration after the reception of the BRP frame transmitted by the initiator.

The responder may transmit a response frame which carry the requested information a BRFIFS duration after the reception of the BRP frame transmitted by the initiator.

Before transmitting the BRP response frame, the responder may operate to sense the channel. If the channel is free in a predefined/predetermined period, the BRP response frame may be transmitted. In one method, the STA may not need to defer additional backoff period set by an EDMA backoff timer.

In the case the STA may not be able to successfully transmit the BRP response frame within a BRPIFS duration from the end of BRP request frame transmitted by the initiator, the STA may (i) wait for a SP assigned to the STA to transmit; (ii) wait for next CBAP to content to transmit; or (iii) aggregate the BRP response frame with other data, control or management frames and transmit them to the initiator.

Alternatively, the responder may transmit a response frame which carry the requested information a T duration after the reception of the BRP frame transmitted by the initiator. Here SIFS<=T<+BRPIFS.

Before transmitting the BRP response frame, the responder may need to sense the channel. If the channel is free in a predefined/predetermined period, the BRP response frame may be transmitted. In one method, the STA may not need to defer additional backoff period set by an EDMA backoff timer.

In the case the STA may not be able to successfully transmit the BRP response frame within a BRPIFS duration from the end of BRP request frame transmitted by the initiator, the STA may (i) wait for a SP assigned to the STA to transmit; (ii) wait for next CBAP to content to transmit; or (iii) aggregate the BRP response frame with other data, control or management frames and transmit them to the initiator.

Figure 34:
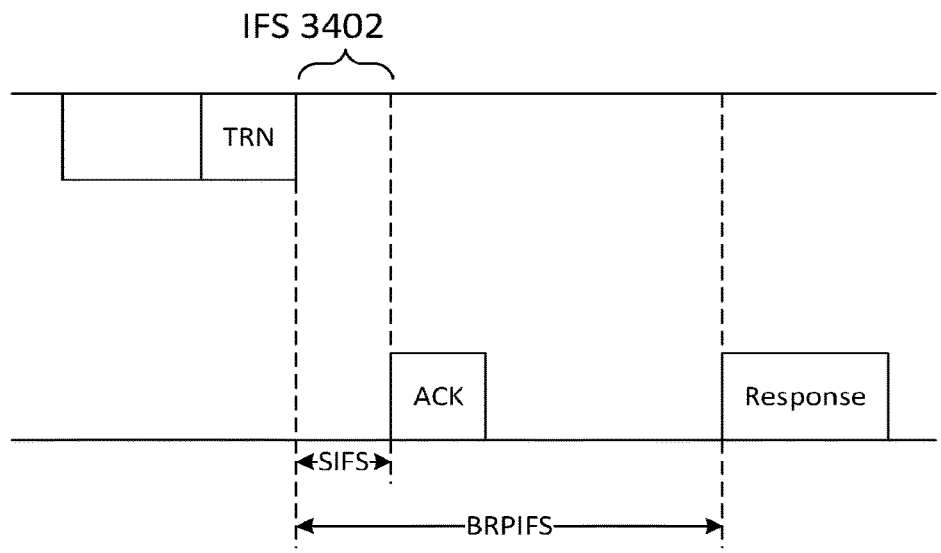
FIG. 34 illustrates an exemplary procedure and signaling for BRP feedback without polling.

An exemplary embodiment of a procedure and signaling for BRP feedback without polling is illustrated in FIG. 34, which illustrates IFS 3402.

Procedures and Signaling with BRP Response Time Capability Exchanges

Alternatively or additionally, the beamforming field may contain an indication of a STA's capabilities in providing feedback after receiving a BRP frame. For example, a STA may indicate its capabilities of expected time to transmit a response frame after receiving a BRP frame. One or more bits in the EDMG Capability field, e.g., in the beamforming field, may be used to indicate the expected BRP response time. In one embodiment, a bit may be used to indicate the presence of expected BRP response time. The Expected BRP response time may be indicated by one or more bits, and may be indicated in the terms of us, in terms of SIFS, and in terms of any other time units. In one embodiment, a STA may indicate multiple Expected BRP response time, e.g., in the EDMG Capability field, e.g., in the Beamforming field. For example, a STA may indicate Expected BRP response time for SU and/or MU MIMO training, a STA may indicate Expected BRP response time for one or more spatial streams.

A STA may exchange its capability of or one or more of its Expected BRP Response Times during the association process with an AP, for example, in the Probe Request, (Re)Association frames. An AP/PCP may announce its own capability of or one or more its Expected BRP Response Times in its beacon, and/or in a Probe Response, (Re) Association Response frames. Additionally, an AP/PCP may announce the one or more largest Expected BRP Response Time(s) for all STAs that are associated with it. For example, an AP/PCP may announce the largest Expected BRP Response time for all STAs associated with it; in another example, an AP/PCP may announce the largest Expected BRP Response time SU and/or MU MIMO for all STAs that are associated with it; in another example, an AP/PCP may announce the largest Expected BRP Response time for one or more spatial streams for all STAs that are associated with it. A STA, after receiving from its AP/PCP, for example, in a beacon, Probe Response, (Re)Association Response frame, may adapt the one or more largest BRP Response Times in its BRP protocols.

Additionally and/or alternatively, a STA may indicate in a frame setting up the BRP exchange sequence that the appropriate BRP Response time should be applied. For example, an AP/PCP may indicate the appropriate BRP Response time to be used for the BRP exchange sequence, e.g., in the Extended Schedule element or Grant frame. The AP/PCP may derive the largest BRP Response time needed by all STAs that will provide feedback. The AP/PCP may derive the largest BRP Response time needed by all STAs that will provide feedback for SU, MU training, one or more SS feedback etc., e.g., based on the information that the AP/PCP has obtained earlier, e.g., during the association process, or during the BRP request or Service Period Request time. For example, if 4 STAs are providing feedback in a MU MIMO training, the largest expected BRP response time will be the largest expected BRP response time among all 4 STAs. If both the initiator and the responders may provide feedback, then the largest Expected BRP response time may be the largest Expected BRP Response time among the initiator and the responder STAs.

If a responder STA indicates a need for training as a response to an SSW-Feedback, it may indicate its one or more expected BRP Response time(s) in the BRP Request field in, e.g., the SSW-ACK frame. The initiator may use the indicated most appropriate BRP Response times in the BRP execution that it will initiate subsequently.

The AP/PCP and/or the initiator may announce the applied BRP response time to be used in the upcoming BRP sequence exchanges. If the responder has not been capable to provide a feedback, it may respond by an ACK frame. It may also adding an expected BRP response time in the ACK. If the expected BRP response time in the ACK sent by the responder is longer than the announced BRP response time by the AP/PCP or the initiator, the initiator may adjust the BRP response time in subsequent BRP frames.

In one embodiment, if the responding STA is not ready to send the BRP response at the expiration of the SIFS duration, the STA sends an ACK to the requesting STA. The requesting STA may request for the information at or greater than a BRPIFS duration after the reception of the ACK. Alternatively, the requesting STA may request for the information at or greater than a BRPIFS duration after the reception it estimates that the transmitted packet arrived at the responding STA. This eliminates the need for any additional timing information.

Defining BRP Action ACK Frame

In an exemplary embodiment, if the BRP frame is a Management frame of subtype Action, a beam refinement response shall be separated from a preceding beam refinement request by a SIFS interval provided sufficient time is available for the complete transmission of those frames within the SP allocation or TXOP. The response serves as an implicit ACK.

When performing BRP, if the BRP frame is a Management frame of subtype Action and if a responding STA requires longer than SIFS to transmit a BRP frame as a response for beam refinement training request from a requesting STA, the STA shall transmit an ACK frame (9.3.1.4) or an EDMG BRP ACK frame (9.3.1.22) in response to the beam refinement training request.

To send the BRP response to the requesting STA:
  The requesting STA may send a feedback poll to request for the response.
  The responding STA may contend for the medium and send back the response.
  The requesting STA may allocate time for the feedback through a reverse direction grant, provided the reverse direction protocol is supported by both the requesting and responding STAs.
  The BRP response method maybe selected during the BRP setup phase.
  The STA may indicate the additional time needed in the EDMG BRP ACK.

As further examples, a method performed by a BRP responder may include: receiving a BRP measurement frame from an initiator; determining whether a response to the BRP measurement frame is available within a SIFS of the reception of the BRP measurement frame; in response to a determination that the response is not available within a SIFS of the reception of the BRP measurement frame; transmitting an ACK at the end of the SIFS; and subsequently transmitting a response to the BRP measurement frame. The subsequent transmitting may be performed using channel contention. The subsequent transmitting may be performed by using a traffic available frame to request channel access. The subsequent transmitting may be performed in response to being polled by the initiator.

As another example, a method performed by a BRP responder may include: receiving a BRP measurement frame from an initiator; determining whether a response to the BRP measurement frame is available within a SIFS of the reception of the BRP measurement frame; in response to a determination that the response is not available within a SIFS of the reception of the BRP measurement frame; transmitting an ACK at the end of the SIFS, wherein the ACK identifies a time interval; receiving a polling frame from the initiator after passage of the identified time interval; and transmitting a response to the BRP measurement frame in response to the polling.

As another example, a method performed by a BRP responder may include: receiving a BRP measurement frame from an initiator; determining whether a response to the BRP measurement frame is available within a SIFS of the reception of the BRP measurement frame; in response to a determination that the response is not available within a SIFS of the reception of the BRP measurement frame; initiating a transmission to the initiator using dummy data; and subsequently continuing the transmission to the initiator including a response to the BRP measurement frame.

As another example, a method may include negotiating a minimum duration (aBRPminSCblocks) between a PCP/AP and a STA. The minimum duration may be selected from a predetermined set of values.

Notes on Embodiments.

Although the features and elements of the present disclosure are described in the preferred embodiments in particular combinations, each feature or element can be used alone without the other features and elements of the preferred embodiments or in various combinations with or without other features and elements of the present disclosure.

Although the solutions described herein consider 802.11 specific protocols, it is understood that the solutions described herein are not restricted to this scenario and are applicable to other wireless systems as well.

Throughout the solutions and provided examples, any blank areas in the figures, e.g., white space, etc., implies that there is no restriction for this area and any solution can be employed.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method, performed by a first wireless transmit/receive unit (WTRU), the method comprising:
receiving a signal comprising an indication of a minimum duration of data of a packet from a second WTRU, wherein the minimum duration of data indicates a minimum amount of data that is supportable by the second WTRU;
generating feedback associated with the packet; and
transmitting, to the second WTRU, the feedback in the packet using at least the minimum duration of data.

2. The method of claim 1, wherein the packet is a beam refinement protocol (BRP) packet, and wherein the method further comprises extending the BRP packet by extra zero padding to generate at least the minimum duration of data.

3. The method of claim 1, wherein the indication of the minimum duration of data is included in a beamforming capability field,
wherein the minimum duration of data is indicated as a number of single carrier (SC) blocks,
wherein the minimum duration of data is indicated as a value of a beam refinement protocol (BRP) minimum single carrier (SC) blocks (BRPminSCblocks) parameter,
wherein the minimum duration of data indicates a largest value of minimum amount of data that is supportable by the second WTRU and a third WTRU, or
wherein the feedback comprises an explicit acknowledgement (ACK).

4. The method of claim 3, wherein the beamforming capability field comprises a requested BRP single carrier (SC) blocks field of 5 bits.

5. The method of claim 1, further comprising transmitting a response to the message indicating a time at which the feedback will be available;
wherein the time at which the feedback will be available includes a given number of bits that are indicative of the time; or
wherein the feedback is sent to the second WTRU at the time indicated.

6. The method of claim 5, further comprising:
receiving a polling frame from the second WTRU after a passage of the indication of the time at which the feedback will be available, wherein the feedback is transmitted in response to the polling frame.

7. The method of claim 1, wherein the signal is a beam refinement protocol (BRP) measurement frame that comprises a plurality of BRP measurement frames from the second WTRU; and wherein
transmitting the feedback comprises transmitting a response to each of the plurality of BRP measurement frames.

8. A first wireless transmit/receive unit (WTRU) comprising:
a processor and a transceiver, wherein the processor is configured to:
receive, via the transceiver, a signal comprising an indication of a minimum duration of data of a packet from a second WTRU, wherein the minimum duration of data indicates a minimum amount of data that is supportable by the second WTRU;
generate feedback associated with the packet; and
transmit, to the second WTRU, via the transceiver, the feedback in the packet using at least the minimum duration of data.

9. The first WTRU of claim 8, wherein the packet is a beam refinement protocol (BRP) packet, and wherein the processor is further configured to extend the BRP packet by extra zero padding to generate at least the minimum duration of data.

10. The first WTRU of claim 8, wherein the indication of the minimum duration of data is included in a beamforming capability field,
wherein the minimum duration of data is indicated as a number of single carrier (SC) blocks,
wherein the minimum duration of data is indicated as a value of a beam refinement protocol (BRP) minimum SC blocks (BRPminSCblocks) parameter, or
wherein the feedback comprises an explicit acknowledgement (ACK).

11. The first WTRU of claim 10, wherein the beamforming capability field comprises a requested BRP SC blocks field of 5 bits.

12. The first WTRU of claim 8, wherein the processor is further configured to transmit a response to the message indicating a time at which the feedback will be available,
wherein the time at which the feedback will be available includes a given number of bits that are indicative of the time,
wherein the minimum duration of data indicates a largest value of minimum amount of data that is supportable by the second WTRU and a third WTRU, or
wherein the feedback is sent to the second WTRU at the time indicated.

13. The first WTRU of claim 12, wherein the processor is further configured to:
  receive, via the processor, a polling frame from the second WTRU after a passage of the time at which the feedback will be available; and
  transmit, via the processor, the feedback in response to the polling frame.

14. The first WTRU of claim 8, wherein the signal comprises a beam refinement protocol (BRP) measurement frame that comprises a plurality of BRP measurement frames from the second WTRU; and
  wherein the processor being configured to transmit the feedback comprises being configured to transmit a response to each of the plurality of BRP measurement frames.

15. A method performed by a first wireless transmit/receive unit (WTRU), the method comprising:
  sending a signal comprising an indication of a minimum duration of data of a packet to a second WTRU, wherein the minimum duration of data indicates a minimum amount of data that is supportable by the first WTRU; and
  receiving, from the second WTRU, feedback in the packet using at least the minimum duration of data.

16. The method of claim 15, wherein the packet is a beam refinement protocol (BRP) packet, and wherein the method further comprises extending the BRP packet by extra zero padding to generate at least the minimum duration of data.

17. The method of claim 15, wherein the indication of the minimum duration of data is included in a beamforming capability field,
  wherein the minimum duration of data is indicated as a number of single carrier (SC) blocks,
  wherein the minimum duration of data is indicated as a value of a beam refinement protocol (BRP) minimum single carrier (SC) blocks (BRPminSCblocks) parameter,
  wherein the minimum duration of data indicates a largest value of minimum amount of data that is supportable by the second WTRU and a third WTRU, or
  wherein the feedback comprises an explicit acknowledgement (ACK).

18. The method of claim 17, wherein the beamforming capability field comprises a requested BRP single carrier (SC) blocks field of 5 bits.

19. The method of claim 15, further comprising sending a response to the signal indicating a time at which the feedback will be available;
  wherein the time at which the feedback will be available includes a given number of bits that are indicative of the time, or
  wherein the feedback is sent to the second WTRU at the time indicated.

20. The method of claim 15, further comprising:
  sending a polling frame to the second WTRU after a passage of the indication of the time at which the feedback will be available, wherein the feedback is received in response to the polling frame.

21. The method of claim 15, wherein the signal is a beam refinement protocol (BRP) measurement frame that comprises a plurality of BRP measurement frames from the second WTRU, and
  wherein receiving the feedback comprises receiving a response from each of the plurality of BRP measurement frames.

22. A first wireless transmit/receive unit (WTRU) comprising:
  a processor and a transceiver, wherein the processor is configured to:
  send, via the transceiver, a signal comprising an indication of a minimum duration of data of a packet to a second WTRU, wherein the minimum duration of data indicates a minimum amount of data that is supportable by the first WTRU; and
  receive, from the second WTRU, via the transceiver, feedback in the packet using at least the minimum duration of data.

23. The first WTRU of claim 22, wherein the packet is a beam refinement protocol (BRP) packet, and wherein the processor is further configured to extend the BRP packet by extra zero padding to generate at least the minimum duration of data.

24. The first WTRU of claim 22, wherein the indication of the minimum duration of data is included in a beamforming capability field,
  wherein the minimum duration of data is indicated as a number of single carrier (SC) blocks,
  wherein the minimum duration of data is indicated as a value of a beam refinement protocol (BRP) minimum single carrier (SC) blocks (BRPminSCblocks) parameter,
  wherein the minimum duration of data indicates a largest value of minimum amount of data that is supportable by the second WTRU and a third WTRU, or wherein the feedback comprises an explicit acknowledgement (ACK).

25. The first WTRU of claim 24, wherein the beamforming capability field comprises a requested BRP single carrier (SC) blocks field of 5 bits.

26. The first WTRU of claim 22, wherein the processor is further configured to send a response to the signal indicating a time at which the feedback will be available;
  wherein the time at which the feedback will be available includes a given number of bits that are indicative of the time, or
  wherein the feedback is sent to the second WTRU at the time indicated.

27. The first WTRU of claim 26, wherein the processor is further configured to:
  send a polling frame to the second WTRU after a passage of the indication of the time at which the feedback will be available, wherein the feedback is received in response to the polling frame.

28. The first WTRU of claim 22, wherein the signal is a beam refinement protocol (BRP) measurement frame that comprises a plurality of BRP measurement frames from the second WTRU, and
  wherein receiving the feedback comprises receiving a response from each of the plurality of BRP measurement frames.

* * * * *